United States Patent
Smith et al.

(10) Patent No.: US 10,771,263 B2
(45) Date of Patent: *Sep. 8, 2020

(54) SYSTEM AND METHOD FOR AUTHENTICATING AND AUTHORIZING DEVICES

(71) Applicant: DENSO CORPORATION, Kariya (JP)

(72) Inventors: Eric John Smith, Holland, MI (US); Raymond Michael Stitt, Ada, MI (US); David Stuckless Meyer, Hudsonville, MI (US); Brian Ensink, Holland, MI (US)

(73) Assignee: DENSO CORPORATION, Showa-cho, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,736

(22) Filed: Apr. 26, 2019

(65) Prior Publication Data

US 2019/0253262 A1    Aug. 15, 2019

Related U.S. Application Data

(63) Continuation of application No. 15/796,180, filed on Oct. 27, 2017, now Pat. No. 10,313,134.

(Continued)

(51) Int. Cl.
*H04L 9/32* (2006.01)
*H04L 9/08* (2006.01)
(Continued)

(52) U.S. Cl.
CPC ........... *H04L 9/3263* (2013.01); *G06F 21/33* (2013.01); *G06F 21/44* (2013.01); *H04L 9/0825* (2013.01);
(Continued)

(58) Field of Classification Search
CPC ... H04L 9/3263; H04L 9/3213; H04L 9/3271; H04L 9/0825; H04L 9/0861; H04L 9/30; H04L 63/0869; H04W 76/10; G06F 21/44
See application file for complete search history.

(56) References Cited

U.S. PATENT DOCUMENTS

2003/0041244 A1* 2/2003 Buttyan ................. G06Q 20/20
                                                                    713/172
2004/0172396 A1* 9/2004 Vanska ............... H04N 21/4126
2013/0160083 A1* 6/2013 Schrix ................ G07C 9/00309
                                                                    726/3

FOREIGN PATENT DOCUMENTS

EP    1 596 529          11/2005
EP    1 325 476 B1    11/2008
(Continued)

OTHER PUBLICATIONS

Kindervag, J., "No More Chewy Centers: The Zero Trust Model of Information Security", Forrester Research, Inc., dated Mar. 23, 2016.
(Continued)

*Primary Examiner* — Khoi V Le
(74) *Attorney, Agent, or Firm* — Warner Norcross + Judd LLP

(57) ABSTRACT

A system and method for a distributed security model that may be used to achieve one or more of the following: authenticate system components; securely transport messages between system components; establish a secure communications channel over a constrained link; authenticate message content; authorize actions; and distribute authorizations and configuration data amongst users' system components in a device-as-a-key system.

31 Claims, 17 Drawing Sheets

Related U.S. Application Data

(60) Provisional application No. 62/413,778, filed on Oct. 27, 2016, provisional application No. 62/413,966, filed on Oct. 27, 2016.

(51) Int. Cl.
| | |
|---|---|
| *H04L 9/30* | (2006.01) |
| *G06F 21/44* | (2013.01) |
| *H04L 29/06* | (2006.01) |
| *H04W 76/10* | (2018.01) |
| *H04W 12/06* | (2009.01) |
| *H04W 4/80* | (2018.01) |
| *G06F 21/33* | (2013.01) |
| *H04W 12/08* | (2009.01) |

(52) U.S. Cl.
CPC .............. *H04L 9/0861* (2013.01); *H04L 9/30* (2013.01); *H04L 9/3213* (2013.01); *H04L 9/3234* (2013.01); *H04L 9/3247* (2013.01); *H04L 9/3271* (2013.01); *H04L 63/0428* (2013.01); *H04L 63/062* (2013.01); *H04L 63/0823* (2013.01); *H04L 63/0869* (2013.01); *H04W 4/80* (2018.02); *H04W 12/06* (2013.01); *H04W 12/08* (2013.01); *H04W 76/10* (2018.02); *H04L 2209/80* (2013.01)

(56) References Cited

FOREIGN PATENT DOCUMENTS

| EP | 2 377 267 B1 | 6/2018 |
|---|---|---|
| JP | 2011-12511 | 1/2011 |
| WO | 2005/034424 | 4/2005 |
| WO | 2011/109460 | 9/2011 |
| WO | 2016/089846 | 6/2016 |

OTHER PUBLICATIONS

Hazlewood, L., "What is an X.509 Certificate?", Stormpath Blog, available at https://stormpath.com/blog/what-x509-certificate, dated Nov. 16, 2011.
Church, Z., "Blockchain, Explained", MIT Management Sloan School, dated May 25, 2017.
Ross, R. et al., "Systems Security Engineering Considerations for a Multidisciplinary Approach in the Engineering of Trustworthy Secure Systems", Draft NIST Special Publication 800-160, National Institute of Standards and Technology, U.S. Department of Commerce, published Sep. 2016.
Temoshok, D. et al., "Developing Trust Frameworks to Support Identity Federations", Draft NISTIR 8149, National Institute of Standards and Technology, U.S. Department of Commerce, published Oct. 2016.
Chia, T., "Confidentiality, Integrity, Availability: The three components of the CIA Triad", IT Security Community Blog, dated Aug. 20, 2012.
Stoneburner, G. et al., "Engineering Principles for Information Technology Security (A Baseline for Achieving Security), Revision A", NIST Special Publication 800-27 Rev A, National Institute of Standards and Technology, U.S. Department of Commerce, published Jun. 2004.
Handshake with two way authentication diagram at https://upload.wikimedia.org/wikipedia/commons/4/42/Ssl_handshake_with_two_way_authentication_with_certificates.svg, available at least as of Jun. 11, 2015.
"Should we sign-then-encrypt, or encrypt-then-sign?", available at https://crypto.stackexchange.com/questions/5458/should-we-sign-then-encrypt-or-encrypt-then-sign, available at least from Aug. 1, 2016.
"Privacy vs. Confidentiality: What is the Difference?", UCI Researchers, available at https://research.uci.edu/cascade/compliance/human-research-protections/docs/privacy-confidentiality-hrp.pdf, dated 2011.
Ioannidis, J. et al., "Distributed Trust", Columbia University, dated 2004.
"Public-key cryptography", at https://en.wikipedia.org/wiki/Public-key_cryptography, available at least from Oct. 18, 2016.
RSA Laboratories, "2.2.4 What is a Digital Envelope?", at http://www.emc.com/emc-plus/rsa-labs/standards-initiatives/what-is-a-digital-envelope.htm, available at least from Jun. 22, 2016.
"When using symmetric key encryption, do we need to sign?", Information Security Stack Exchange, at http://security.stackexchange.com/questions/23565/when-using-symmetric-key-encryption-do-we-need-to-sign, available at least from Oct. 1, 2016.
"What are the differences between a digital signature, a MAC and a hash?", Information Security Stack Exchange, at http://crypto.stackexchange.com/questions/5646/what-are-the-differences-between-a-digital-signature-a-mac-and-a-hash\, available at least from Oct. 19, 2016.
Davis, D., "Defective Sign & Encrypt in S/MIME, PKCS#7, MOSS, PEM, PGP, and XML", published on World.std.com, available at least as of Oct. 22, 2016.
"What is the difference between encrypting and signing in asymmetric encryption?" , Information Security Stack Exchange, at http://stackoverflow.com/questions/454048/what-is-the-difference-between-encrypting-and-signing-in-asymmetric-encryption available at least as of Mar. 4, 2016.
"Does encryption guarantee integrity?", Information Security Stack Exchange, at http://stackoverflow.com/questions/3655516/does-encryption-guarantee-integrity, available at least as of Oct. 18, 2016.
Cherdantseva, Y. et al., "A Reference Model of Information Assurance & Security", Cardiff School of Computer Science & Informatics, presented at 2013 International Conference on Availability, Reliability and Security held Sep. 2-6, 2013 and published in IEEE Xplor, Nov. 7, 2013.
"Reference Model of Information Assurance and Security" published at https://ipfs.io/ipfs/QmXoypizjW3WknFiJnKLwHCnL72vedxjQkDDP1mXWo6uco/wiki/Reference_Model_of_Information_Assurance_and_Security.html dated Nov. 18, 2016.
International Search Report and the Written Opinion of the International Searching Authority for International Application No. PCT/US2017/058792 dated Jan. 29, 2018.

\* cited by examiner

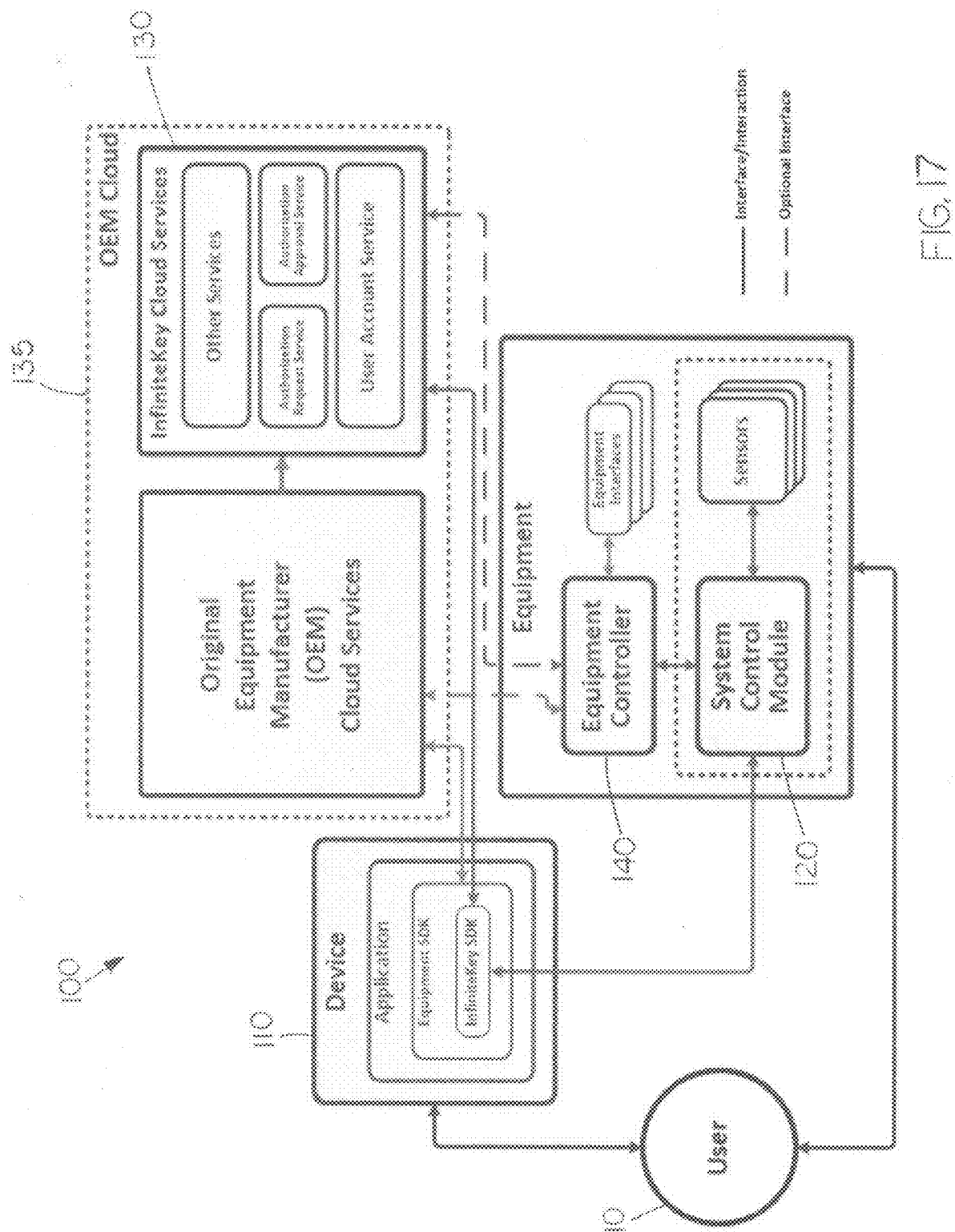

SYSTEM AND METHOD FOR AUTHENTICATING AND AUTHORIZING DEVICES

TECHNICAL FIELD

The present application relates to systems and methods for authenticating and authorizing devices and/or distributing keys.

BACKGROUND

Significant efforts have been made toward enabling utilizing smartphones as keys for enabling access or commanding operation of an equipment device, such as a door or a vehicle. However, these conventional systems rely on what is considered a simplistic form of security that relies on the equipment device having network access to authenticate whether the smartphone has authority to direct operation of the equipment device. Such a conventional equipment device is unable to authenticate and/or authorize at least one of keys, devices, and users when an authority device has not previously communicated with the equipment device to identify authority for the key, device or user. In other words, in the absence of a communications link or lack of connectivity between the authority device and the equipment device, the equipment device in this conventional system is unable to determine if a smartphone attempting to communicate with the equipment device has been authorized by the authority device.

In a conventional key fob system utilized by vehicle manufacturers, the keys and/or authentication information for the key fob is distributed to an authority device before the keyfob is authenticated and/or authorized, and the authority device is able to communicate authority information to the equipment device.

Similar conventional systems may be unable to authenticate and/or authorize any key, device, or user during the absence of a communications link, because, for example, the system may rely on the equipment device being able to communicate with a cloud system (or other system component that is unreachable due to the lack of connectivity) during an authentication and/or authorization process. This scenario (lack of connectivity) may seem like a corner-case; however, it is actually very common—consider a car in a parking garage or a remote area, or a cottage in the woods, without cellular connectivity. Lack of connectivity in this circumstance may prevent enabling granting a smartphone or other device with rights to operate a vehicle or gain access to the cottage.

SUMMARY OF THE DESCRIPTION

The present disclosure is directed in large part toward a system and method for a distributed security model that may be used to achieve one or more of the following: authenticate system components, securely transport messages between system components, establish a secure communications channel over a constrained link, authenticate message content, authorize actions, and distribute authorizations and configuration data, amongst users' system components in a device-as-a-key system.

A system in accordance with one embodiment may facilitate authentication, with a potentially unique identifier for one or more of the following: a portable device, a cloud or network server or system, hardware, changes, and revocations.

In one embodiment, the system may enable transportation of information in a secure and private manner between system components. There may be end-to-end encryption in one embodiment that is provided across all communications links. The system may form a distributed system where some data may be sent over an unencrypted channel, but the data itself is fully encrypted.

In one embodiment, the system may provide authorization based on a) one or more chains of signatures by authenticated entities, b) potentially independent clouds, and c) potential separation between roots of trust and roots of authentication. Authorization may be distinguished between an owner and a guest, and provide transference of ownership.

The system in accordance with one embodiment may facilitate distribution of authorization, as well as one or more related features including new key generation, changed key identification, blacklist/revocation notification, cycling of keys, transfer of ownership, resetting, roots of trust for configurations, keys, and other data.

The system in accordance with one embodiment may provide one or more security checks, including, for example, configuration sequencing, time deltas, and jailbreak detection.

In one embodiment, the system may provide a key attribute authorization model, in which each authorization may have one or more attributes that are considered necessary to identify the authorization as active. Examples of such one or more attributes include time, number of uses, location, and custom attributes.

The system in one embodiment may facilitate a sharing model, in which authorization may be dedicated or granted per device, per device+account, and/or per account (e.g., even at an organizational level).

In one embodiment, the system may provide time synchronization at a trusted device level and/or a cloud level.

The system in accordance with one embodiment may enable authentication and authorization to be granted between devices without a working Internet connection, even at first sight.

The system may provide a mobile software trusted execution environment, hardware TEE, or secure elements (secure storage) to facilitate secure operation.

In one embodiment, a system for communicating a command from a first device to a second device is provided. The first device may be configured to communicate wirelessly in an online mode with a network server, and to obtain authorization configuration information from the network server. The authorization configuration information may pertain to authorization for the first device to issue the command to the second device, and the authorization configuration information may include data encrypted by a first key associated with the second device.

The second device may be to an equipment component, and may be configured to direct the equipment control to perform the command.

The second device may be configured to communicate wirelessly with the first device in an offline mode in which neither the first device nor the second device is able to communicate effectively with the network server. The first device and the second device may be configured to establish a communication link for exchanging communications, where prior to establishing the communication link, the second device has received no information indicating the first device has obtained the authorization configuration information pertaining to authorization for the first device to issue the command to the second device.

The first device may communicate, via the communication link, the authorization configuration information to the second device. The first device may also communicate, via the communication link, command information relating to a request to execute the command. The second device, based on the authorization configuration information, may authenticate an identity of the first device and determine authority for the first device to issue the command to the second device.

In one embodiment, a control unit for controlling operation of an equipment component includes a communication interface, memory, an equipment interface, and a controller. The communication interface may be operable to communicate wirelessly with a remote device, and the memory may be configured to store one or more encryption keys pertaining to authentication and authorization of the remote device. The equipment interface may be operable to direct operation of the equipment control in response to a command received from the remote device.

The controller of the control unit may be configured to establish a communication link with the remote device via the communication interface, and to receive authorization configuration information from the remote device. The authorization configuration information may include authorization data that is encrypted, where only the controller is capable of decrypting the authorization data from the authorization configuration information.

Based at least in part on the authorization data, the controller may authenticate an identity of the remote device and determine authority of the remote device to issue the command to the remote device.

A method of communicating between a first device and a second device in accordance with one embodiment is provided. The method may include obtaining, in the first device, authorization configuration information from a network server, where the authorization configuration information includes data encrypted by a first key associated with the second device. The method may include establishing a communication link for exchanging communications between the first device and the second device, where prior to establishing the communication link, the second device has received no information indicating the first device has obtained the authorization configuration information.

The method may include receiving the authorization configuration information in the second device, and decrypting, in the second device, the authorization configuration information to obtain a device key and authorization data pertaining to one or more authorizations for the first device to direct operation of the second device.

The second device may authenticate an identity of the first device based on the device key obtained from the authorization configuration information, and receive a command from the first device.

The method may include determining if the first device is authorized to issue the command, and in response to determining the first device is authorized to issue the command, directing the equipment component to perform the command.

In one embodiment, a system is provided that differs from a conventional key distribution system that relies on a centralized cloud and connectivity to the cloud. For instance, in one embodiment of the present disclosure, a key may be sent to a device, and that key may be verified by an authorizer (e.g., a lock).

In one embodiment, a security model may be provided where there are no high value targets, where components may not be compromised without knowledge (with no single component breach compromising the security of the system).

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 17 shows a representative view of the system in accordance with one embodiment.

DESCRIPTION

The present disclosure is directed to a system and method for a distributed security model that may be used to achieve one or more of the following: authenticate system components, securely transport messages between system components, establish a secure communications channel over a constrained link, authenticate message content, authorize actions, and distribute authorizations and configuration data, amongst users' system components in a device-as-a-key system. One or more aspects of the system may be implemented in conjunction with one or more aspects of the microlocation systems described in U.S. Nonprovisional application Ser. No. 14/620,959 to J. Michael Ellis et al., filed Feb. 12, 2015, issued as U.S. Pat. No. 9,666,005, and entitled SYSTEM AND METHOD FOR COMMUNICATING WITH A VEHICLE, and U.S. Nonprovisional application Ser. No. 15/488,136 to Raymond Michael Stitt, filed Apr. 14, 2017, issued as U.S. Pat. No. 9,794,753, and entitled SYSTEM AND METHOD FOR ESTABLISHING REAL-TIME LOCATION—the disclosures of which are incorporated herein in their entirety, and wherein the hardware may be monitor or master devices, resulting in authentication-verified, authorization-verified, and location-verified portable device interaction with other systems with end-to-end encryption (secure, trusted, and private).

I. System Architecture

Figure 1:
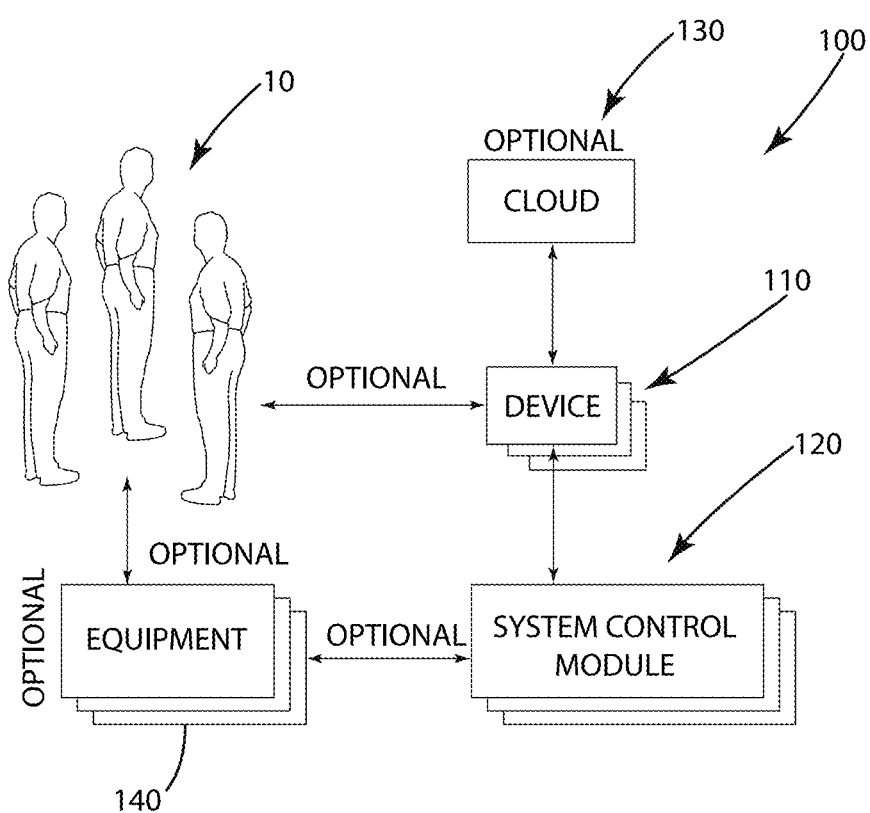
FIG. 1 is a representative view of a system in accordance with one embodiment.

A system according to one embodiment is shown in FIGS. 1 and 17 and generally designated 100. The system 100 may be compromised of the following system components: a) one or more users 10 (e.g., people); b) one or more devices 110, such as portable devices (e.g., smartphones, cards or fobs, or a combination thereof) and/or fixed devices (e.g., computers/servers, or wall-mounted panels/displays, or a combination thereof; c) one or more system control modules (SCM) 120, also described as hardware, d) a cloud 130, which may include a collection of one or more back-end servers or computers from one or more vendors (e.g., a collection of clouds); and e) one or more equipment components 140, which may be configured for controlling equipment operations, activating services thereon, relaying information to another aspect of the system 100, or retrieving information from another aspect of the system 100, or a combination thereof. The cloud 130 and/or the equipment 140 are optional in the illustrated embodiment.

The system 100 may allow the one or more users 10 to interact with or access the equipment 140 using the device 110. The devices 110 may communicate with the equipment 140 (such as a vehicle, a lock, or a table) by communicating with the SCM 120. The SCM 120 in one embodiment may authenticate the device 110, provide or receive configuration data, authorize actions (e.g., to connect or to send and/or receive a request, a command, an update, or a response, or a combination thereof), or communicate with the equipment component 140 to achieve a desired action, or a combination thereof. The device 110 may communicate with the cloud 130 to obtain, change, or distribute, or a combination thereof, authorizations (described herein), and other configuration data, amongst relevant devices and users. There are other system interactions that are not significantly relevant to the security model, and for purposes of disclosure, are not shown or described further in detail. For instance, there are factory tools that communicate with the SCM 120 and the cloud 130, which may interact with other systems' clouds.

A. Communications and Interaction Overview

The communications links between the one or more system components depicted in the illustrated embodiment of FIG. 1 may be wireless or wired, or both. One system component, such as the device 110, may be local or remote relative to another system component, such the SCM 120. The system 100 may include any number of each system component, including embodiments in which the number is zero such as where no cloud and/or equipment are present.

In one embodiment, the roles of a system component in the system 100 are not necessarily fixed as one type of component. For instance, a system component may change roles dynamically during operation, or a system component may take on the role of two or more components of the system 100. For instance, the SCM 120 may be the equipment component 140 for another SCM 120. In a more specific form of this example, the SCM 120 may be the equipment component 140 communicating with the other SCM 120. For purposes of disclosure, the remaining discussion focuses upon a system 100 wherein the one or more equipment components 140 and the cloud 130 exist—although it should be understood that one or more of these system components may be absent.

B. Component Overview

The system 100 in the illustrated embodiment may include one or more system components as outlined herein. A system component may be a user or an electronic system component, which may be the device 110, the SCM 120, the equipment component 140, and the cloud 130, or a combination thereof. The electronic system component, as discussed herein, may be configured to operate as any one or more of these devices. In this sense, in one embodiment, there may be several aspects or features common among the device 110, the SCM 120, the equipment component 140, and the cloud 130. For purposes of disclosure, these features are described in connection with the electronic component depicted in FIG. 2 and generally designated 200.

The electronic system component 200 (e.g., all system components, except users) may include one or more processors 210 that execute one or more applications 232 (software and/or includes firmware), one or more memory units 212 (e.g., RAM and/or ROM), and one or more communications units 214, amongst other electronic hardware. The electronic system component 200 may or may not have an operating system 230 that controls access to lower-level devices/electronics via a communication unit 214. The electronic system component 200 may or may not have hardware-based cryptography units 222—in their absence, cryptographic functions may be performed in software. The electronic system component 200 may or may not have (or have access to) secure memory units 220 (e.g., a secure element or a hardware security module (HSM). Optional components and communication paths are shown in phantom lines in the illustrated embodiment.

The system 100 in the illustrated embodiment is not dependent upon the presence of a secure memory unit 220 in any component. In the optional absence of a secure memory unit 220, data that would be stored in the secure memory unit 220 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 214 may be any type of communication link, including any of the types of communication links describe herein, including wired or wireless. The communication interface 214 may facilitate external or internal, or both, communications. For instance, the communication interface 214 may provide a wireless communication link with another system electronic device 200 in the form of the device 110, such as wireless communications according to the Bluetooth LE standard, or the cloud 130 via WiFi Ethernet communication link. In another example, the communications interface 214 may be configured to communicate with the equipment component 140 (e.g., a vehicle component) via a wired link such as a CAN-based wired network that facilitates communication between a plurality of devices. The communication interface 214 in one embodiment may include a display and/or input interface for communicating information to and/or receiving information from the user 10.

Figure 2:
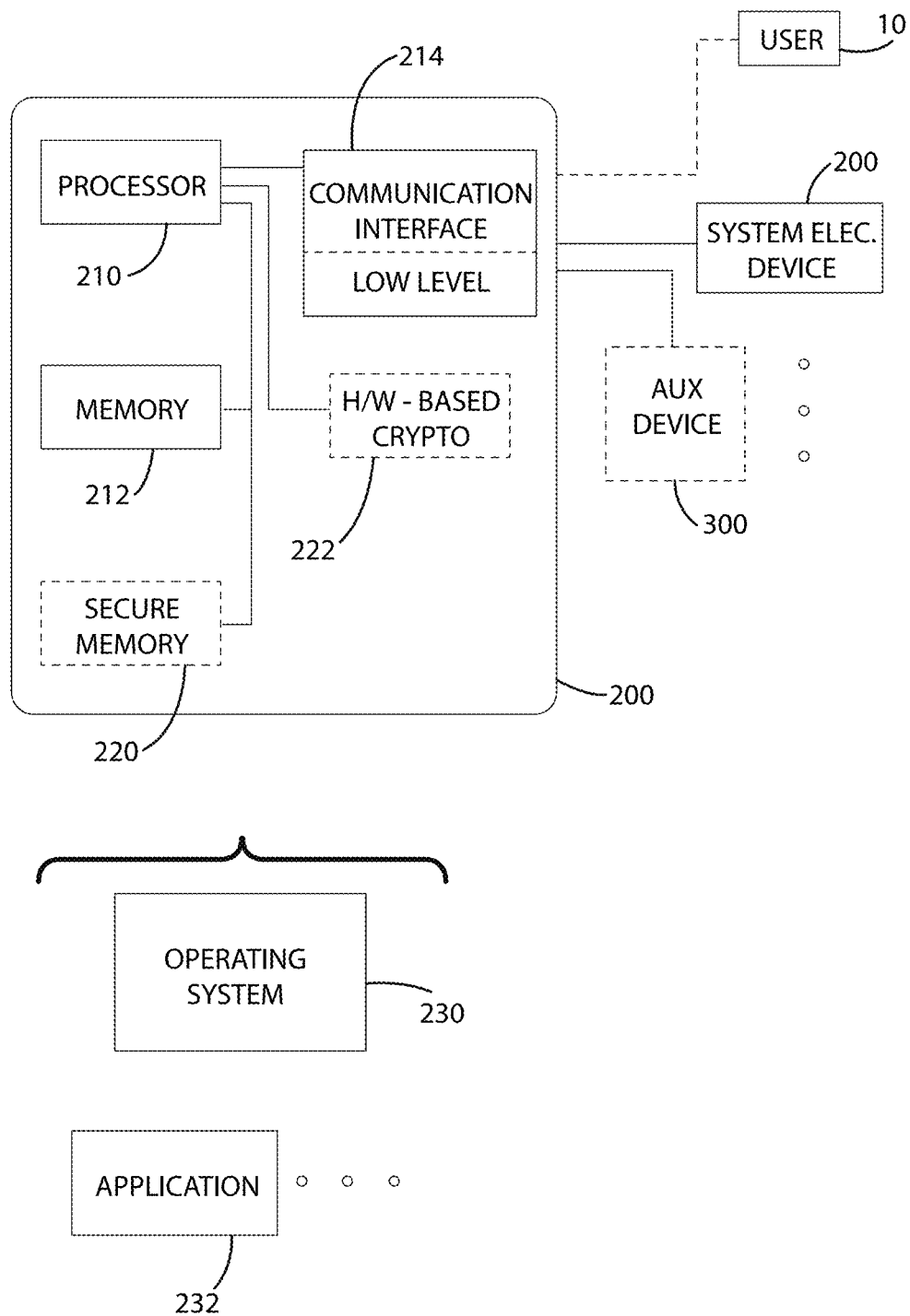
FIG. 2 is a representative view of a system component in one embodiment.

In one embodiment, shown in FIG. 2, the electronic system component 200 may be configured to communicate with one or more auxiliary devices 300 other than another electronic system component 200 or a user. The auxiliary device 300 may be configured differently from the electronic system component 200—e.g., the auxiliary device 300 may not include a processor 210, and instead, may include at least one direct connection and/or a communication interface for transmission or receipt, or both, of information with the electronic system component 200. For instance, the auxiliary device 300 may be a solenoid that accepts an input from the electronic system component 200, or the auxiliary device 300 may be a sensor (e.g., a proximity sensor) that provides analog and/or digital feedback to the electronic system component 200.

C. Micro-Location

The system 100 in the illustrated embodiment may be configured to determine location information in real-time with respect to the device 110. In the illustrated embodiment of FIG. 1, the user 10 may carry the device 110 (e.g., a smartphone). The system 100 may facilitate locating the device 110 with respect to the equipment 140 (e.g., a vehicle) in real-time with sufficient precision to determine whether the user is located at a position at which access to the equipment or permission for an equipment command should be granted.

For instance, in the realm of vehicles where the equipment 140 is a vehicle, the system 100 may facilitate determining whether the device 110 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the device 110 is outside the vehicle and not in close proximity to the driver-side door (e.g., outside the range of 2 feet, 3 feet, or 5 feet), the system 100 may determine to lock the driver-side door. As another example, if the system 100 determines the device 110 is in close proximity to the driver-side seat but not in proximity to the passenger seat or the rear seat, the system 100 may determine to enable mobilization of the vehicle. Conversely, if the device 110 is determined to be outside close proximity to the driver-side seat, the system 100 may determine to immobilize or maintain immobilization of the vehicle.

Figure 3:
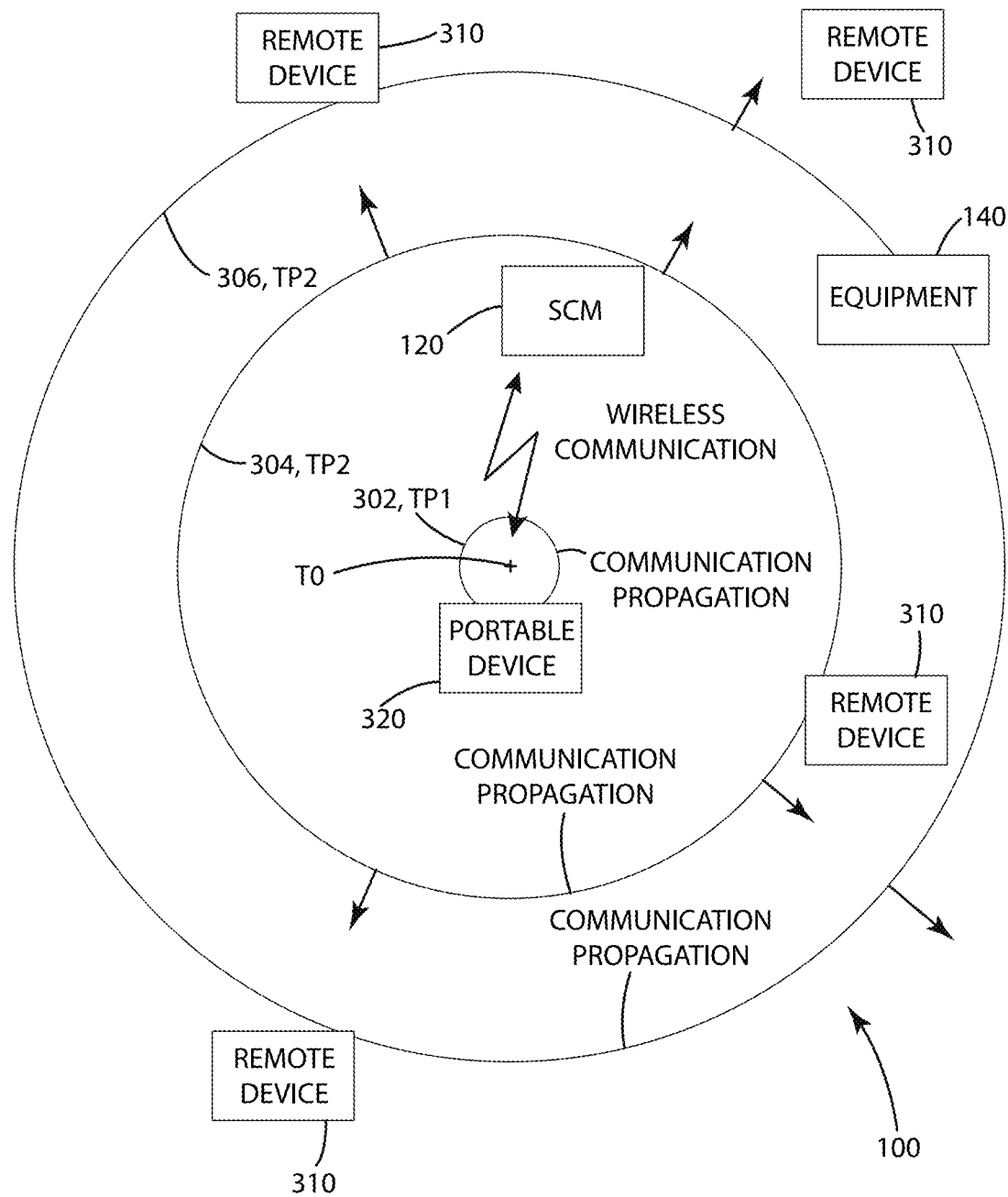
FIG. 3 shows a microlocation system according to one embodiment.
Figure 16:
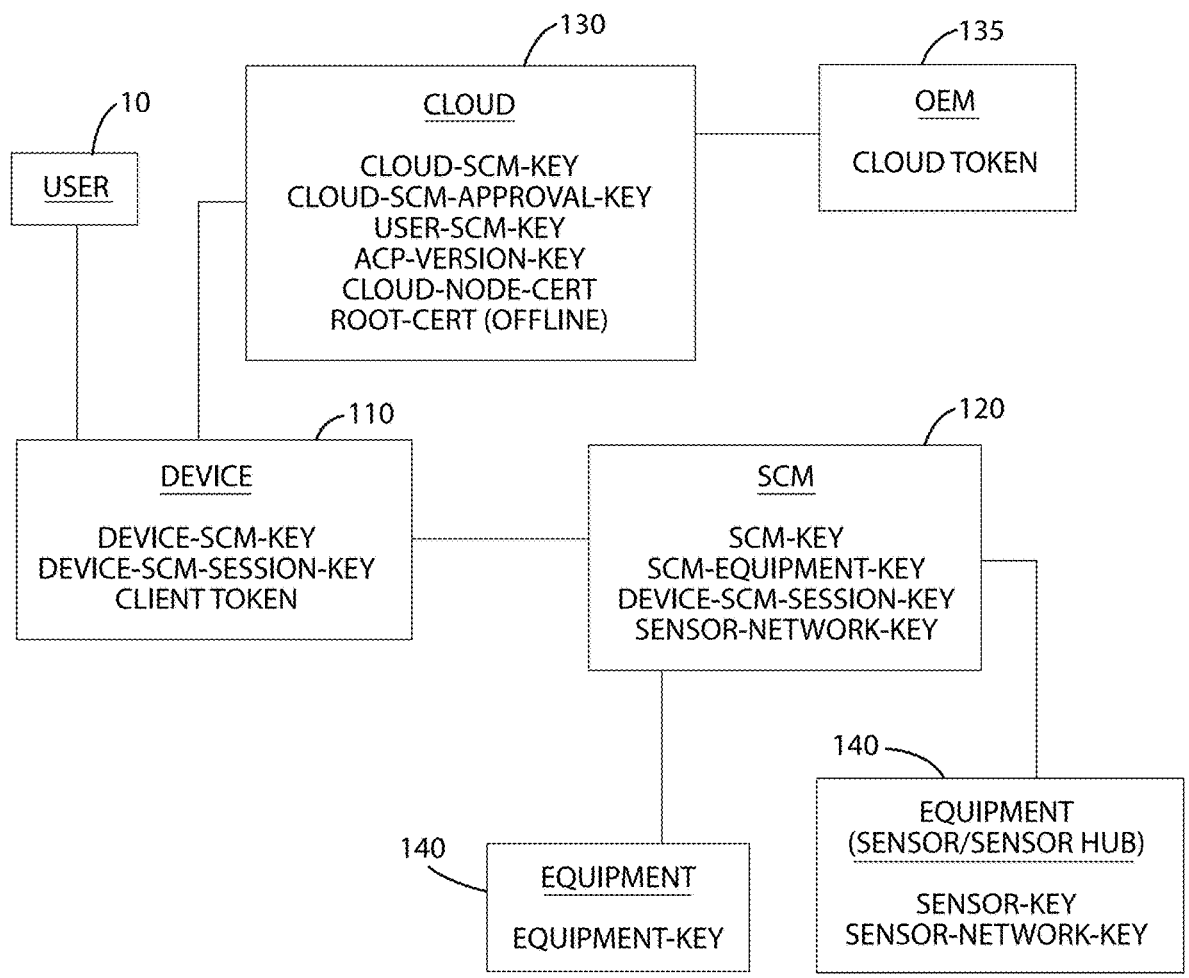
FIG. 16 shows a representative view of data distribution in accordance with one embodiment.

The vehicle in this context may also include other types of equipment 140, such as one or more sensors similar to the remote devices 310 described in connection with the illustrated embodiment of FIG. 3 and as shown in FIGS. 16 and 17 with the sensor and sensor hub configuration. The equipment 140 forming the sensor and sensor hub configuration in FIG. 16 may include one or more keys as discussed herein to facilitate authentication of information received from the sensor and sensor hub. It should be noted that one or more keys may be incorporated into the system 100 for use with a sensor or remote device 310 and/or the sensor hub. The one or more additional keys similar in structure to the equipment device or another component of the system 100 may reside on the SCM 120 and a sensor/sensor hub in the sensor network. Additionally, or alternatively, one or more of these keys and/or one or more other keys of the system 100 may be used to identify the authenticity of and authorize participation of a sensor/sensor hub in the sensor network.

Micro-location of the equipment 140 may be determined in a variety of ways, such as using information obtained from a global positioning system, one or more signal characteristics of communications from a device 110, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety. More particularly, in one example depicted in the illustrated embodiment of FIG. 3, the SCM 120 and a plurality of remote devices 310 (similar in some respects to the device 110) may be disposed on or in a fixed position relative to the equipment component 140. Example use cases of the equipment component 140 include the vehicle identified in the prior example, or a building for which access is controlled by the equipment component 140.

The device 110 may communicate wirelessly (e.g., via Bluetooth LE) with the SCM 120 via a communication link. The plurality of remote devices 310 may be configured to sniff the communications between the device 110 and the SCM 120 to determine one or more signal characteristics of the communications, such as signal strength. The determined signal characteristics may be communicated or analyzed and then communicated to the SCM 120 via a communication link separate from the communication link between the device 110 and the SCM 120. Additionally, or alternatively, the device 110 may establish a direct communication link with one or more of the remote devices 310, and the one or more signal characteristics may be determined based on this direct communication link.

As an example, as shown in the illustrated embodiment, the propagation waves of communications from the device 110 to the SCM 120 are shown and designated 302, 304, 306. The greater the distance from the device 110 (the source), the lesser the strength of the wireless communications. The strength of the communications about the propagation wave 306 is less than the strength of the propagation wave 302. Further, in the case of a communication being transmitted at time t0, the travel time ($tp1-t0$) for the communication at the propagation wave 302 is less than the travel time ($tp3-t0$) for the communication at propagation wave 306. As a result, if a remote device 320 receives the communication at the propagation wave 302, the time stamp for arrival of the communication would be earlier than if the communication were received at the propagation wave 306. One or more signal characteristics, such as signal strength and time of arrival, may be analyzed to determine location information about the device 110 relative to the SCM 120.

For instance, time difference of arrival among the remote devices 310 and the SCM 120 may be processed to determine a relative position of the device 110. The positions of the one or more remote devices 310 relative to the SCM 120 may be known so that the relative position of the device 110 can be translated to an absolute position with respect to the remote device 310 and the SCM 120. Additional or alternative examples of signal characteristics may be obtained to facilitate determining position according to one or more algorithms, including a distance function, trilateration function, a triangulation function, a multilateration function, a fingerprinting function, a differential function, a time of flight function, a time of arrival function, a time difference of arrival function, an angle of arrival function, an angle of departure function, a geometric function, etc., or any combination thereof.

It should be noted that for purposes of illustration, the propagation waves 302, 304, 306 are depicted as uniformly circular—however, the propagation waves may vary in shape depending on other factors such as interference or use of a directional antenna.

In one embodiment, information relating to the communications between the device 110 and the SCM 120 may be provided to the plurality of remote devices 320. For instance, connection parameters relating to a Bluetooth LE channel may be provided to the remote devices 320 so that the plurality of remote devices 320 can monitor the communications. For instance, the communication channel may vary one or more parameters during communications, such as the frequency of transmissions from packet to packet or among bits transmitted in the packet. These one or more variable parameters may be communicated to the remote devices 320 to enable receipt of packets or communications.

The system 100 may utilize a security model, as discussed herein, to facilitate one or more of the following: authenticate system components, securely transport messages between system components, establish a secure communications channel over a constrained link, authenticate message content, authorize actions, and distribute authorizations and configuration data amongst users' system components in a device-as-a-key system.

II. Authorizations

As described herein, the system 100 may associate one or more rights with a device 110, facilitating authorization to utilize the one or more rights within the system. As discussed herein, authorizations are access rights or rights in general that allow a device 110 (functioning as a proxy for a specific user 10) to interact with a SCM 120 (functioning as proxy for specific equipment) within one or more constraints (also described as access attributes), which may be specific to the SCM 120 and/or the device 110.

In one embodiment, a key (credentials or virtual/electronic/mobile keys) is distributed to a device 110, which is then passed to the SCM 120 at the time of use for verification (or some variation thereof).

In the illustrated embodiment of the system 100, the device 110 itself (its identity), may be the key, and the SCM 120 may authorize the desired action of the device 110 based upon the one or more authorizations with which the SCM 120 has been configured for the device 110. The "identity" of the device 110 may be (or may be based upon) one or more of a cryptographic identity or any other identifier unique to the device 110, or multiples of and/or any combination thereof. Examples of a cryptographic identifier include a unique public/private key such as a key pair generated in asymmetric cryptography, a shared secret key such as a key generated in symmetric cryptography. Examples of another identifier unique to the device 110 include a hardware serial number, a Hardware Security Module (HSM), and one or more application instance identifiers. Example combinations of one or more cryptographic identities and/or one or more other identifiers of the device 110 include multiple cryptographic identities and a cryptographic identity and a non-cryptographic identity.

The device 110 may have zero or more authorizations at any given time, including multiple authorizations for the same SCM 120, or different authorizations for another SCM 120. An authorization is a useful part of the security model described herein, as the authorization provides information that may facilitate one or more of the following: enabling a device 110 to communicate with the SCM 120, mutually authenticate more than one device 110 and more than one SCM 120, and identify the conditions upon which the device 110 may interact with the SCM 120. Authorizations may define, in addition to information useful for authentication, for each device 110 relative to the SCM 120, their access attributes. The access attributes according to one embodiment may including one or more of the following:

1) Type (e.g., owner, guest, valet, etc.)—Standard. The various authorization types may result in different authorization distribution/sharing rights (e.g., an owner may make another device an owner, but not a guest, etc.). There may also be commands or other system-level functions that are accessible only to users with owner (or other types of) authorizations. Refer to the Authorization Types Section VII for additional information.
2) Valid Timestamp Range Start—Standard
3) Valid Timestamp Range End—Optional. If present, the authorization may be automatically revoked at a particular date/time.
4) Valid Schedule—Optional. If present, the authorization may only be used per a defined schedule (e.g., a recurring weekly schedule that specifies during what times it may be utilized for each day of the week, a monthly schedule, or a custom schedule).
5) Valid Number of Uses—Optional. If present, the authorization may only be used up to a set number of times (e.g., a number of commands, a number of days/hours used).
6) Additional Authentication Types and Identifiers—Optional. If present, the authorization may utilize additional (active or passive) authentication beyond what the system already provides (e.g., require device unlock/login/button press/passcode entry/thumbprint/require presence of another device/etc. to issue a particular command).
7) Distribution Rights—Optional. If present, a reference to the rights of the authorization in a rights management service (see description herein) that identifies and/or describes the rights the device 110 has to issue new authorizations to another device 110 for the SCM 120. In other words, distribution rights relate to the rights of the device 110 to share the authorization with another device. If absent, this may be based fully or partially on authorization type, described at least at Sections 1) and VII. In an alternative embodiment, both authorization type and digital rights management service may be used together, such as by cross-checking one another.
8) Command Rights—Optional. If present, a reference to the rights of the authorization in the rights management service (see description herein) that identifies and/or describes the rights the device 110 has to issue or receive, or both, for particular commands or responses, or both. For instance, the device 110 may issue a command to open the door, but not shut it. Rights may be granted on a per-command basis or on a per-class basis. If absent, the Command Rights may be based fully or partially on authorization type, described at least at Sections 1) and VII. In an alternative embodiment, both authorization type and digital rights management service may be used together, such as by cross-checking one another. In another alternative embodiment, a list of authorized commands (and other possibly necessary meta-data) may be provided instead. In yet another alternative embodiment, a list of forbidden commands (and other possibly necessary meta-data) may be provided instead.

9) Other potential attributes upon which the SCM 120 may grant or deny interaction. In one embodiment, a device 110 may securely communicate with the SCM 120 only when the device 110 possesses an authorization for such secure communications—although it should be understood that there may be scenarios or circumstances where the device 110 may communicate unsecurely with the SCM 120.

It should be noted that not all attributes may need to be communicated to the SCM 120 or device 110. For instance, some attributes may exist only in the cloud 130.

The SCM 120 may authorize a device 110 to send or receive, or both, one or more of requests, commands, updates, and responses based on at least one of the following: 1) one or more authorizations have been authenticated (see e.g., ACP at least at Section III); 2) all or some potentially necessary conditions in one or more authenticated authorizations are satisfied; and 3) the device 110 has been authenticated. As such, in addition to the conditions identified above, each authorization may contain the encryption keys (e.g. Device-SCM-Key and/or User-SCM-Key) and data used for the device 110 to establish an encrypted communications link with a target SCM 120, for the device 110 to authenticate the target SCM 120, and for the target SCM 120 to authenticate the device 110. The data used for the device 110 in this context is described herein in further detail in the system key description section, which is also specified as the Key System at Section XII.

III. Authorizations Configuration Package

Figure 4:
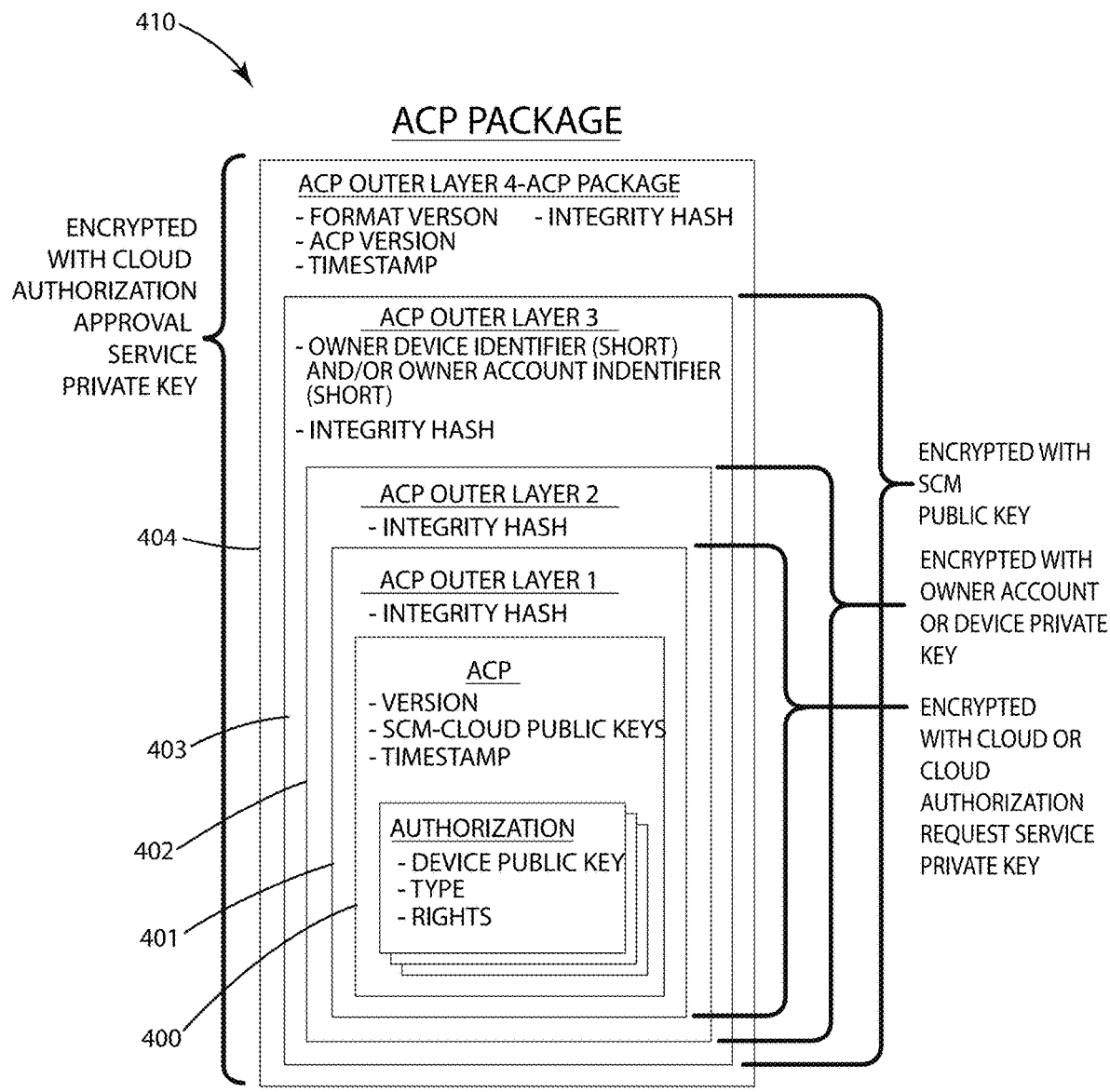
FIG. 4 shows an ACP Container in accordance with one embodiment.

In one embodiment, information may be communicated to the SCM 120 in a secure manner via an Authorizations Configuration Package (ACP) shown in accordance with one embodiment in FIG. 4 and designated 400. The ACP 400 may include authorizations or other configuration data, or both, that can be delivered to the SCM 120. One or more of the devices 110 may deliver the ACP 400 to the SCM 120—although it should be understood that the ACP 400 may be delivered to the SCM 120 via other devices and that the present disclosure is not limited to delivery via the device 110.

Figure 5:
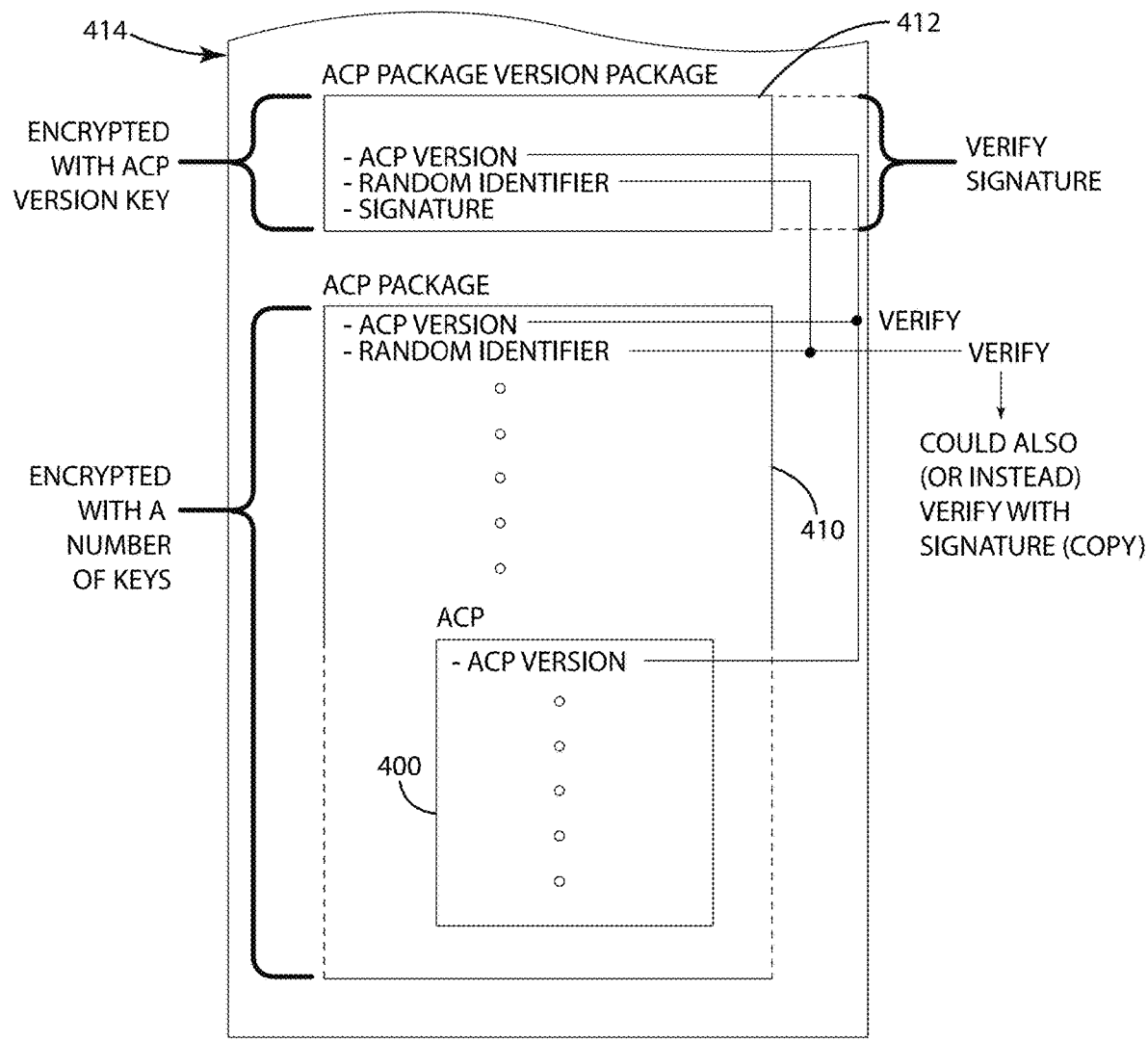
FIG. 5 depicts an ACP Container and an ACP Container Version Package in accordance with one embodiment.

The ACP 400 may be encapsulated in an ACP container 410, which may be encapsulated in an ACP Container Collection 414 as shown in accordance with one embodiment in FIG. 5. The ACP 400, the ACP Container 410 or the ACP Container Collection 414, or any combination thereof, may be based on sequenced multi-layer encryption. The ACP container 410 may include nested layers, each layer being encrypted in a different manner such as by encrypting each layer according to a different encryption key. In this way, the nested layers may be conceptualized as layers of an onion, where each inner layer cannot be accessed without decrypting the outer layer.

In one embodiment, the ACP container 410 may be a secure means to deliver configuration data to the SCM 120 across a distributed system. The ACP container 410 in the illustrated embodiment may be delivered to the device 110 by the cloud 130. The ACP container 410 may utilize the sequenced multi-layer encryption in a fashion that provides one or more of the following:

Substantially guaranteed confidentiality and integrity, regardless of device or communications security (e.g., insecure devices using insecure communications links)

Substantially guaranteed authenticity and that multiple authenticated system components have approved the contents of the ACP 400 (e.g., an owner device 110, its user, and one or more cloud services 130, including for instance two or more cloud services 130, when separate Cloud Authorization Request and Cloud Authorization Approval services are used, as described herein)

Substantial guarantee that the ACP 400 is intended for the target SCM 120, and that other system components may not decrypt unauthorized content of the ACP 400

Substantial guarantee of the state of the system 100 (e.g., that the appropriate system components have approved the configuration in a defined order)

Allow authentication and authorization to be performed using only a communications link between the device 110 and the target SCM 120, even when the target SCM 120 has not previously communicated with the device 110 (e.g., authentication may be performed when disconnected from the Internet, when neither the device 110 nor the SCM 120 have access to any cloud service 130—in other words, both the device 110 and the SCM 120 may be offline).

The structure of the ACP container 410, along with the authorization change process that may be enforced by the cloud 130 and the encryption sequencing of the package layers, may ensure that only the target SCM 120 is able to decrypt the ACP container 410 in its entirety and that multiple system components (e.g., the user 10, cloud 130, and owner device 110, or a combination thereof) have approved the ACP 400. The encryption sequence for the ACP container 410 is described in further detail below, from innermost layer (last decrypted) to outermost layer (first decrypted). The structure of the ACP container 410 may vary from application to application. However, in the illustrated embodiment, the ACP container 410 may include at least one of integrity hashes (e.g., cryptographic hashes and/or signatures), timestamps, versions, sender identities, receiver identities, and other data location and encapsulation attributes (not shown in FIG. 4 or FIG. 5).

The ACP container 410, or any of its layers (including ACP 400), may be processed and/or stored by the SCM 120 after all its necessary authorized layers have been decrypted, authenticated, integrity verified, and attributes checked across layers for consistency. In the illustrated embodiment, the SCM 120 is authorized to process and decrypt all layers of the ACP container 410—however, it should be understood that there may be further layers of the ACP container 410 for which the SCM 120 is not authorized or configured to process or decrypt. It should also be noted that the ACP container 410 is described herein having a number of layers; however, the number of layers and configuration or structure of the ACP container 410 may vary depending on the application. It should also be understood that while any portion of the ACP container 410 (including ACP 400) may be stored, such layers may be stored in an as-received format (encrypted), as-received-but-decrypted format, in an alternate format (e.g., optimized for storage efficiency or runtime retrieval), or any combination thereof.

A. ACP Outer Layer 1

In the illustrated embodiment of FIG. 4, the ACP 400 is contained within an ACP Outer Layer 1, designated 401. The ACP Outer Layer 1 may confirm that the ACP 400 originated from the cloud 130 and is destined for the target SCM 120. The cloud 130 may encrypt the ACP Outer Layer 1 with a key (such as the Cloud-SCM-Key key described in more detail herein at least at Section XII) which may be specific to the pair defined by the target SCM 120 and the cloud 130. In one embodiment, optionally, only the cloud 130, target SCM 120, and a device 110 with authorizations for that target SCM 120 may be able to decrypt this ACP Outer Layer 1.

In an alternative embodiment, the key utilized to encrypt the ACP Outer Layer 1 may be a Cloud-SCM-Key key that is not specific to the pair defined by the target SCM 120 and the cloud 130—e.g., a common key shared amongst all SCMs 120 in a system of SCMs 120 may be utilized. In one embodiment, where the Cloud-SCM-Key key is absent, verification that the ACP originated from the cloud 130 and is destined for the target SCM 120 may be accomplished in a different manner not limited to use of the Cloud-SCM-Key. In an alternative embodiment, the system 100 may not utilize verification of the ACP Outer Layer 1 based on the Cloud-SCM-Key, and instead may rely upon the encryption and sequencing of other layers or the authentication of the cloud 130 (described herein).

B. ACP Outer Layer 2

In the illustrated embodiment of FIG. 4, the ACP Outer Layer 1 is contained within an ACP Outer Layer 2, designated 402. The ACP Outer Layer 2 may confirm that the ACP 400 (originating from the cloud 130) for the target SCM 120 was viewed and approved by a user 10 on an owner device 110 for the target SCM 120. A User Account Service of the cloud 130 may encrypt the ACP Outer Layer 2 with a key, such as the User-SCM-Key key described in more detail herein at least at Section XII, and which may be specific to the pair defined by the target SCM 120 and the user account associated with the device 110. In one embodiment, authorizations may be issued for the target SCM 120 to a user account, by which all of the devices 110 associated with that user account are authorized.

In one embodiment, optionally, only the cloud 130, target SCM 120, and the devices 110 associated with the user account that approved the ACP 400 are able to decrypt the ACP Outer Layer 2.

In an alternative embodiment, the device 110 may encrypt the ACP Outer Layer 2 with a key, such as the Device-SCM-Key key described in more detail herein at least at Section XII, and which may be specific to the pair defined by the target SCM 120 and the device 110. In one embodiment, authorizations may be issued for the target SCM 120 to a particular device 110. In one embodiment, optionally, only the cloud 130, target SCM 120, and the particular owner device 110 for the target SCM 120 that approved the ACP 400 are able to decrypt the ACP Outer Layer 2.

In an alternative embodiment, the ACP Outer Layer 2 may be encrypted with a Device-SCM-Key or a User-SCM-Key key that is not specific to the pair defined by the target SCM 120 and the device 110 or user account—e.g., a common key shared amongst all SCMs 120 in a system of SCMs 120 may be utilized. In one embodiment, where the Device-SCM-Key or the User-SCM-Key key is not different from the Cloud-SCM-Key key, or where the Device-SCM-Key or the User-SCM-Key is absent, verification that the ACP 400 was viewed and approved by a user 10 on an owner device 110 for the target SCM 120 may be accomplished in a different manner not limited to use of the Cloud-SCM-Key. In an alternative embodiment, the system 100 may not utilize verification of the ACP Outer Layer 2 based on the Cloud-SCM-Key or the User-SCM-Key, and instead may rely on the encryption and sequencing of other layers or the authentication of the cloud (described herein).

C. ACP Outer Layer 3

In the illustrated embodiment of FIG. 4, the ACP Outer Layer 2 is contained within an ACP Outer Layer 3, designated 403. The ACP Outer Layer 3 may confirm that the ACP 400 (originating from the cloud 130) for the target SCM 120 was viewed and approved by a user 10 on an owner device 110 for the target SCM 120, was verified by the cloud 130 to have been approved, without change, by a user 10, via an out-of-band authentication mechanism (described herein), on an owner device 110 for the target SCM 120. The cloud 130 may encrypt this layer with a key, such as the SCM-Key key described in more detail herein at least at Section XII, and which may be specific to the target SCM 120. In one embodiment, only the target SCM 120 is able to decrypt the ACP Outer Layer 3. Because the ACP Outer Layer 2 may be encrypted by one of potentially multiple owner accounts (User-SCM-Key keys) and/or devices 110 (Device-SCM-Key keys), the meta-data for this layer includes an indication of which account and/or device 110 signed ACP Outer Layer 2 (e.g., a Device-SCM-ID or User-SCM-ID).

In an alternative embodiment, the ACP Outer Layer 3 may be encrypted with an SCM-Key key that is not specific to the target SCM 120—a common key shared amongst all SCMs 120 in a system of SCMs 120 may be utilized. In one embodiment, where the SCM-Key key is not different from the Device-SCM-Key key, or where the SCM-Key is absent, verification that the cloud 130 approved the ACP 400, without change, by a user 10, via an out-of-band authentication mechanism (described herein), on an owner device 110 for the target SCM 120 may be accomplished in a different manner not limited to use of the SCM-Key key. In an alternative embodiment, the system 100 may not utilize verification of the ACP Outer Layer 3 based on the SCM-Key, and instead may rely upon the encryption and sequencing of other layers or the authentication of the cloud (described herein). In all embodiments where out-of-band authentication is involved in this verification, there exists an alternate configuration in which the out-of-band authentication is removed completely or is only required for certain types of changes.

D. ACP Outer Layer 4

In the illustrated embodiment of FIG. 4, the ACP Outer Layer 3 is contained within an ACP Outer Layer 4, designated 404. The ACP Outer Layer 4 may confirm that the completed ACP Container 410 was approved by and originated from the cloud 130 and is destined for the target SCM 120. The cloud 130 may encrypt the ACP Outer Layer 4 with a key, such as the Cloud-SCM-Approval-Key key described in more detail herein at least at Section XII, and which may be specific to the pair defined by the target SCM 120 and the cloud 130. In one embodiment, optionally, only the cloud 130, target SCM 120, and devices 110 with authorizations for that target SCM 120 are able to decrypt the ACP Outer Layer 4.

In one embodiment, Cloud Authorization Request and Cloud Authorization Approval services may not be separated, and thus, the ACP Outer Layer 4 may be encrypted with a Cloud-SCM-Key key described in more detail herein at least at Section XII, and which may be specific to the pair defined by the target SCM 120 and the cloud 130.

In one embodiment, the ACP Outer Layer 4 may be encrypted with a Cloud-SCM-Approval-Key or a Cloud-SCM-Key key that is not specific to the pair defined by the target SCM 120 and cloud 130. For instance, a common key shared amongst all SCMs 120 in a system of SCMs 120 may be utilized. In one embodiment, where the Cloud-SCM-Approval-Key or the Cloud-SCM-Key key is not different from the SCM-Key key, or where the Cloud-SCM-Approval-Key or the Cloud-SCM-Key is absent, verification that the completed ACP Container 410 was approved by and originated from the cloud 130, and is destined for the target SCM 120, may be accomplished in a different manner. In an alternative embodiment, the system 100 may not utilize verification of the ACP Outer Layer 4 based on the Cloud-SCM-Approval-Key or the Cloud-SCM-Key, and instead may rely upon the encryption and sequencing of other layers or the authentication of the cloud (described herein).

The structure of the ACP Container 410 as utilized within the security model may achieve or substantially achieve separation of authentication and authorization. While the security model may separate these actions into different services and structures, the security model may not explicitly isolate authentication and authorization into two separate trees (i.e., separate roots of trust) that are separately authenticated. Instead, the authentication and authorization trees may be authenticated separately through distributed encryption and sequenced decryption. Separation of authentication and authorization can be approximated by requiring a hacker to obtain keys from multiple separate physical cloud servers 130 to generate and/or decrypt an ACP Container 410 (in addition to the device 110).

One example configuration to approximate separation of authentication and authorization is to separate a) a service that generates an initial ACP 400 and that requests a user 10 to approve the ACP 400 (the Cloud Authorization Request service) and b) a service that verifies a user 10 approved the initial ACP 400 and that generates the final ACP Container 410 (the Cloud Authorization Approval service). In one embodiment, the key used in the ACP Outer Layer 4 (e.g., the Cloud-SCM-Approval-Key used by the Cloud Authorization Approval service) may be different from the one used in the ACP Outer Layer 1 (e.g., the Cloud-SCM-Key used by the Cloud Authorization Request service). In one embodiment, the cloud service 130 that signs the ACP Outer Layer 4, such as the Cloud Authorization Approval service, is separated from the cloud service 130 that signs the ACP Outer Layer 1, such as the Cloud Authorization Request service. In one embodiment, the cloud service 130 that signs the ACP Outer Layer 4, such as the Cloud Authorization Approval service, is on a separate server from the cloud service 130 that signs the ACP Outer Layer 1, such as the Cloud Authorization Request service.

IV. Distribution of the ACP Container

In one embodiment, the ACP container 410 may contain all current authorizations for the target SCM 120. The cloud 130 may create and/or update and distribute a complete (i.e., no partial updates) ACP container 410 to all relevant devices 110 automatically whenever the data contained within the ACP 400 for an SCM 120 changes via a push mechanism. Example changes include a) the data in the ACP 400 and authorization being at least one of added, changed, and revoked for the SCM 120, b) the SCM 120 being instructed to factory-reset, c) the first owner device being authorized, and d) encryption keys being cycled.

A. Pushing the ACP Container

The push mechanism may be used for all ACP Container 410 distributions, or use of the push mechanism may be limited to distributions of ACP Containers 410 in response to certain changes and/or events. Relevant devices 110 may be considered devices 110 that have current authorizations, or that previously had one or more authorizations, but have not yet been delivered an updated ACP Container 410 (e.g., the SCM 120 has a more recent ACP 400), for the target SCM 120. Current authorizations are authorizations that have not been revoked (i.e., removed, disabled, deleted, etc.) and have not expired (i.e., authorizations that are active). The push mechanism used may vary based upon the type of device 110, including, but not limited to, any combination of mobile, web, or desktop platform push notification services (e.g., websockets, Apple Push Notification Services (APNS), Google Cloud Messaging (GCM), and Urban Airship); persistent-polling-based device-to-cloud connections or long-polling-based device-to-cloud connections or similar device-to-cloud connections; mesh, star, and/or other topology device-to-device messaging; and SMS.

The push mechanism may deliver the ACP Container 410 directly or it may inform the device 110 of the updated ACP Container 410 (allowing the device 110 to immediately, or at a later time, request the ACP Container 410). The device 110 may be configured to disallow certain types of push mechanisms (e.g., APNS), in which case the cloud 130 may use alternate push mechanisms (e.g., SMS) or not use a push mechanism (e.g., the device 110 may periodically poll for updated ACP Containers 410). In an alternative embodiment, the system 100 may always use a push mechanism for distributing the ACP Container 410. In an alternative embodiment, the system 100 may not use a push mechanism or not always use a push mechanism for distributing the ACP Container 410. In an alternate embodiment, the system 100 may use the push mechanism for distributing the ACP Container 410 to all devices 110 with authorizations (current or not) in relevant devices. In an alternative embodiment, the system 100 may distribute the ACP Container 410 to distribute only current authorizations in relevant devices. In an alternative embodiment, the scope of the current authorizations may be expanded to include authorizations that have expired within a fixed or configurable predetermined amount of time (e.g., per cloud, per device, per SCM, per equipment). For example, the current authorizations distributed may include authorizations that have expired in the last two days.

In the illustrated embodiment, the cloud 130 may distribute current ACP Containers 410 to relevant devices 110 without current authorizations. In an alternative embodiment, the cloud 130 may distribute to each relevant device 110 without current authorizations, the first version of the ACP Container 110 where that device 110 no longer has any current authorizations.

The devices 110 may request, from the cloud 130, the current approved ACP 400 for an SCM 120 (or for all SCMs 120 to which the device 110 has current authorizations) automatically when certain events occur. Example events include immediately following reset, when applications change execution states (e.g., started, paused, resumed, stopped, or terminated), or periodically, when a connection to an SCM 120 and/or the cloud 130 is established or when requested by the user. In one or more alternative embodiments, all permutations of the above distribution and/or request trigger combinations may be implemented.

One or more SCMs 120 or one or more devices 110, or any combination thereof, may be located in an environment in which a communications link to the cloud 130 is not available. For instance, the communications link may be nonexistent or unavailable by any means, including indirectly through other system components, such as routing a communications link through another device 110 or equipment component 140. The lack of such a communications link may be permanent or temporary.

In one embodiment, the security model of the system 100 does not suffer significantly from lack of communications primarily because it is not strictly necessary for the SCM 120 to have communicated with the cloud 130 prior to authorizing a device 110. The SCM 120 may only expect a device 110 to have communicated with the cloud 130 at some point before communicating with the SCM 120. One issue that may arise in this circumstance is that the SCM 120 may not be capable of establishing a secure communications link with a device 110, unless the SCM 120 has stored an ACP 400 that contains an authorization for the device 110. However, due at least in part to the encryption sequencing or layering, or both, of the ACP Container 410, and because the ACP Container 410 may only be decrypted by a target SCM 120, the ACP Container 410 may be delivered to the SCM 120 by an unsecure communications link. As such, an SCM 120 may receive an updated ACP 400 from any source, over any communications link, including from devices 110 with which the SCM 120 may have never communicated and from devices 110 (or other system components/sources) that do not possess authorizations. For instance, a device 110 whose authorizations were revoked may communicate an ACP Container 410 including an updated ACP 400.

In one embodiment, the device 110 may deliver an updated ACP 400 to the SCM 120, prior to establishing a secure communications link. The device 110 may also deliver an updated ACP 400 to the SCM 120 after a secure communications link has been established—such an existing secure communications link may be terminated, if the updated ACP 400 does not contain authorizations for the connected device 110. In one embodiment, the SCM 120 may refuse to establish a secure communications link with a system component that possesses a version of the ACP Container 410 that is newer than the version stored by the SCM 120. In one embodiment, the SCM 120 may refuse to establish a secure communications link with a system component that possesses a version of the ACP Container 410 that does not match a version stored by the SCM 120.

B. ACP Container Version Package

To facilitate eliminating the need for the SCM 120 to receive and process the ACP Container 410 with every connection from every device 110 to determine if the device 110 has a different ACP 400, the first N bytes of the ACP Container 410 (where N is the number of bytes necessary to obtain the required information, also known herein as the ACP Container Version Package 412) may be sent as part of the connection establishment process between the device 110 and the SCM 120 (described herein) for the SCM 120 to decrypt to obtain the required information, where the required information may include the ACP version and/or other attributes used for comparison, such as an integrity hash or signature, or both. In one embodiment, as described herein, the ACP Container Version Package 412 is delivered to the device 110 as the first N bytes of the ACP Container 410 (where N is the number of bytes considered necessary to obtain the required information). If the SCM 120 determines that the device 110 has a newer version of the ACP 400, the SCM 120 may utilize the device 110 to provide the updated ACP 400, before a secure connection may be established. In an alternative embodiment, the SCM 120 may determine to perform an ACP update process if the device 110 has a different ACP 400, which may not be newer than the ACP 400 stored in the SCM 120. If the SCM 120 is not in a factory-reset mode awaiting the first owner device 110 to be associated with the SCM 120, and the ACP Container Version Package 412 is not provided, a connection to a device 110 may be rejected or terminated, or both. This factory-reset mode of operation is described herein in additional detail at least at Section X.D.

If the device 110 has already established a secure connection with the SCM 120, the SCM 120 may periodically request the device 110 to send its ACP Container Version Package 412 and then, if an updated ACP 400 is present, either disconnect and require the device 110 to reconnect (and thus send the updated ACP 400), or request the device 110 to send the updated ACP 400 over the secure connection. Additionally, or alternatively, if the device 110 has already established a secure connection with the SCM 120, the device 110 may inform the SCM 120 of an updated ACP 400 (accompanied with the ACP Container Version Package 412), and, if the SCM 120 determines the update is appropriate (as described herein), either disconnect and expect the device 110 to reconnect (and thus send the updated ACP 400), or request the device 110 to send the updated ACP 400 over the secure connection. If the device 110 fails to respond to a request (e.g., within some period of time) to send its ACP Container Version Package 412, the SCM 120 may disconnect from it.

In one embodiment, the ACP Container Version Package 412 may be delivered to the sender, likely the device 110, by the cloud 130 as a separate encrypted package to deliver to the SCM as part of the connection establishment process described herein at least at Section XIV. The ACP Container Version Package 412 may be delivered in conjunction with the ACP Container 410, or as the first part of the ACP Container 410, as depicted in FIG. 5 by the ACP Container Collection 414. It should be noted that the ACP Container 410 and ACP Container Collection 414 may be used interchangeably throughout this disclosure. It should also be noted that where the delivery of the ACP 400 is described, such delivery may be accomplished via the ACP Container 410.

In one embodiment, shown in FIG. 5, the ACP Container Version Package 412 may include the ACP version, one or more embedded identifiers, such as a large random number or a sequence number, and a message authentication code or signature. One or more of the embedded identifiers, message authentication code, signature, and a portion or entirety of the ACP-Version-Key key may be stored within the ACP Container 410 for verification. The ACP Container Version Package 412 may be encrypted with a key such as an ACP-Version-Key key, which is generated by the cloud 130 and is specific to the target SCM 120 as described herein. In an alternative embodiment, the ACP Container Version Package 412 may be encrypted with the ACP-Version-Key key, and then additionally encrypted with one or more other keys, such as the Device-SCM-Key key, or the SCM-Key key, or both.

In an alternative embodiment, the ACP Container Version Package 412 is simply the ACP version of the ACP 400 that the device 110 possesses, previously generated or provided by the device 110, and without a corresponding encryption key in the ACP Container 410. As an example, in this embodiment, the SCM 120 may trust the version provided by the device 110 and use the version to determine whether or not to request the ACP Container 410. The ACP version may be defined by a number or string that may or may not be encrypted with a shared encryption key via the device 110.

It is recognized that this alternative embodiment is much less secure than the previously described embodiment, and has the potential vulnerability whereby the device 110 can say it has whatever version of the ACP 400 that the device 110 desires; however, in general, it is unlikely this would happen and the most likely downside may be that the device 110 would either (a) not send the ACP 400 for update (because the version would be older than the current one) or (b) send the ACP 400 for update (getting rejected after processing every time if the version number is very high). It is considered practically impossible for a device 110 to manufacture an ACP 400; therefore, the most likely downside is that the SCM 120 becomes saddled with lots of extra work—i.e., denial of service (DoS).

C. Verification

When the SCM 120 receives the ACP Container 410, it may verify the authenticity of the ACP Container 410 by decrypting its layers in sequence, ensuring that contents of the ACP Container 410 have not been altered and have been decrypted properly by computing and comparing the integrity hashes (signatures), verifying that the provided ACP Container Version Package 412 and its content is consistent with the corresponding content (e.g., ACP versions and any other applicable attributes) at the various layers of the ACP Container 410, and performing other consistency and data integrity/validation checks (not listed) as the ACP Container 410 is processed at each layer.

If at any point ACP Container 410 validation fails, the ACP Container 410 may be considered invalid and rejected (not stored). If the new ACP Container 410 is accepted (e.g., all validation is completed successfully and the new ACP 400 is considered different from the current ACP 400), it is stored in the SCM 120 and may be immediately activated or immediately become the current ACP 400.

The ACP Container 410 (or ACP 400) itself may or may not be stored in the memory 212 of the SCM 120 as received, as decrypting the ACP Container 410 is considered an intensive process and there may be more optimal data structures/organization for use in a real-time system. The ACP Container 410 or the ACP 400 may be stored in secure memory 220, or an equivalent hardware module such as a Secure Enclave or Hardware Security Module (HSM). The ACP Container 410 or the ACP 400 may be stored in its entirety or only portions of it. Alternatively, the ACP Container 410 or the ACP 400 may be encrypted with an alternate encryption key in ROM (and decrypted and stored in RAM during execution), or it may be stored unencrypted in protected ROM, or some combination of the above or other techniques. Examples of additional or other techniques include software-based mitigations or hardware-based mitigations that can prevent access to such data, provide hardware obstructions or shields, provide physical obstructions or shields, disable JTAG and other ports, harden software interfaces to eliminate attack vectors, establish trusted execution environments (hardware or software), and detect operating system root access or compromise.

In an alternative embodiment, the content of the ACP Container 410 and not the original form of the ACP Container 410 may be stored unencrypted in ROM. In another alternative embodiment, the ACP Container 410 may be stored in ROM as received (with all encryption layers) and is then decrypted and stored in RAM during operation.

D. Obtaining the ACP Container—Delivery Path

The ACP Container 410 and/or the ACP Container Version Package 412 in accordance with one embodiment of the present disclosure may be received or obtained by the device 110 or the SCM 120, or both, in a variety of ways.

In one embodiment, the ACP Container Version Package 412 is optionally provided by the device 110 to the SCM 120. If the ACP Container Version Package 412 is not provided to the SCM 120, the SCM 120 may be required to obtain and decrypt the first layer of the ACP Container 410 to determine the ACP version of the encapsulated ACP 400. In an alternative embodiment, the ACP Container Version Package 412 may not be provided by the device 110. This may require the device 110 or the SCM 120 to inform or request an update for the ACP Container 410 and process the ACP Container 410 in its entirety.

In another alternative embodiment, the device 110 may request, from the SCM 120, the ACP Container Version Package 412 that the SCM 120 currently possesses. The device 110 may then compare the version of the ACP 400 identified in the ACP Container Version Package 412 against the version of the ACP 400 stored in memory, and decide whether or not to send the ACP Container 410 to the SCM 120. In this embodiment, the request for the ACP Container Version Package 412 may not be sent as part of the connection establishment process for the device 110 and the SCM 120 as described herein at least at Section XIV.

In one embodiment, a device 110 may send a complete version of the ACP Container 410 in its entirety to the SCM 120. In one embodiment, the device 110 may send the ACP Container 410 to the SCM 120 at the discretion of the device 110, which may be based on a user request, a cloud request, or a device process, or any combination thereof. In one embodiment, the ACP Container 410 may be delivered to the SCM 120 by system components other than the device 110, such as the equipment component 140 or other accessories connected to devices 110, using an available communications link. The available communications link may vary from application to application or under different circumstances, and may be physical media, a wireless link, or a wired link, or any combination thereof.

In one embodiment, the ACP Container 410 may be delivered directly to the SCM 120 via the cloud 130. Additionally, or alternatively, the ACP Container 410 may be delivered to alternate and/or intermediate system components, such as the equipment component 140 or another device, and then delivered to the SCM 120 using an available communications link. The available communication link may vary depending on the circumstance, and may be at least one of physical media, a wireless link, and a wired link.

A complete form of the ACP Container 410 may be sent to the SCM 120 in the illustrated embodiment, because there is a potential risk of system state inconstancy with partial updates, including unintended behavior due to inconsistent Internet connections and the potential that a partial update is missed. Example risk scenarios include: if an owner adds device A and then removes device B, there exists a state where the resultant configuration at the SCM 120 could be that neither device A nor device B have access. In other words, the first update may have been missed. However, these risks may be overcome or diminished by adding attributes to track partial update versions and sequencing.

In one embodiment, a partial or incremental update to the ACP Container 410 may be obtained from the cloud 130. The update may include at least one of adding, removing, or changing, or a combination thereof, of an authorization and cycling an encryption key. In one embodiment, the partial or incremental update to the ACP Container 410 may be sent to the SCM 120. In an alternative embodiment, the ACP Container 410 may be split into smaller configuration packages, such as an SCM Identity Configuration Package and the ACP 400.

It may be necessary or desired in one embodiment to reduce the size of the transmitted ACP Container 410. One approach to do so is to use delta updates, where only the differences between two specific ACP Containers 410 may be transmitted. The delta update image (the image transmitted to the SCM 120 that accomplishes the update) may be generated by the system component (e.g., device 110) that transmits the delta update image to the SCM 120, given that a large number of version of the ACP Container 410 may exist and that the delta update image is specific to the before and after versions of the ACP Container 410. In one embodiment, the delta update image may be used to send the ACP Container 410 to the SCM 120, wherein the delta update image is created by the system component (e.g., the device 110) that transmits the delta update image to the SCM 120. In one embodiment, the delta update image may be used to send the ACP Container 410 to the SCM 120, wherein the delta update image is created by the cloud 130. In one embodiment, the delta update image may be used for other messages and configuration packages within the system 100.

Additionally, or alternatively, a reduction in the size of the transmitted ACP Container 410 may be achieved by compression. Compression may be performed by either the cloud 130 or by the system component (e.g., the device 110) that transmits the ACP Container 410. In one embodiment, compression may be used to send the ACP Container 410 to the SCM 120. In one embodiment, both compression and delta update images may be used to send the ACP Container 410 to the SCM in either order (compress first, then delta, or delta first, and then compress). In one embodiment, compression may be used for other messages and configuration packages within the system 100.

In one embodiment, the SCM 120 may connect to the cloud 130, and where the SCM 120 does not store authorizations in the ACP 400, instead requests the cloud 130 to determine whether or not a particular device 110 is authorized when appropriate or necessary. For instance, the cloud 130 may be requested to determine that the device 110 identity is authorized. If the device 110 does have an authorization, then the authorization may be cached on the SCM 120 for the duration of the connection of the device 110 to the SCM 120 (or longer, if memory permits). Additionally, or alternatively, authorization may be cached on a local server (or set of servers) to reduce network latency.

In one embodiment, the ACP 400 for a particular SCM 120 stored on the device 110 may contain only the authorizations for that device 110. Additionally, or alternatively, the SCM 120 may merge authorizations from multiple devices 110 into a consolidated ACP 400 stored in the SCM 120.

In one embodiment, each SCM 120 may receive and store multiple ACPs 400, where each ACP 400 contains a subset of the total set of authorizations issued for an SCM 120. This may prevent the ACP 400 from becoming too large in an environment where many devices 110 are authorized (e.g., a building access management system where hundreds or thousands of employees are authorized to unlock a particular lock, or a fleet environment). The content of each subset ACP 400 may contain only authorizations for a particular set of user accounts and/or devices 110. For example, in one embodiment, a subset ACP 400 may be created for each user account (wherein the ACP 400 contains only devices 110 associated with that user account). For example, in another embodiment, a subset ACP 400 may be created for each set of 10 user accounts. For example, in yet another embodiment, a subset ACP 400 may be created for each set of 100 devices 110. The subset ACPs 400 may be delivered as part of a combined ACP Container 410 that contains all subset ACPs, a combined ACP Container 410 that contains any number of subset ACPs 400 (e.g., changed subset ACPs 400), individual ACP Containers 410 (i.e., one for each subset ACP 400), or any combination thereof. In one embodiment, each ACP Container 410 may have one ACP Container Version Package 412 that contains the versioning information considered necessary for each subset ACP 400. In another embodiment, each ACP Container 410 may have multiple ACP Container Version Packages 412.

V. Alternative Package Management and Delivery

There may be other packages of data destined for the SCM 120 that may be structured and generated in accordance with one or more of the embodiments described herein with respect to the ACP Container 410, including similar semantics, operations, and encoding as the ACP Container 410. As a result, it should be understood that an alternate configuration (and other) packages may be utilized and may be managed and/or delivered in a similar manner. There may also be packages destined for other system components (e.g., the device 110 or equipment component 140). The following are example packages that may exist (some of which may be discussed in further detail herein):

10) Application Configuration
   11) Firmware Update Package
   12) Subcomponent Configuration
   13) Equipment Protocol Configuration
   14) Equipment Model
   15) Blacklist Package
   16) System Log Package In embodiments where the herein described security model/system is applied to microlocation systems, examples of which are described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE, and U.S. Nonprovisional application Ser. No. 15/488,136 to Raymond Michael Stitt, filed Apr. 14, 2017, and entitled SYSTEM AND METHOD FOR ESTABLISHING REAL-TIME LOCATION—the disclosures of which are incorporated herein by reference in their entirety. Examples of information that may be provided in accordance with one embodiment of the microlocation system include the following:

1) Zone Configuration or related data may identify one or more areas or spaces relative to the SCM 120 that are considered relevant to the user or owner's use of the equipment 140. For instance, an area or space within 5 feet of a door may be considered relevant to operation of the door—e.g., presence within this zone may trigger enablement of access through the door.

2) Monitor Configuration and Placement or related data may identify a configuration of the remote devices 310 described in connection with the illustrated embodiment of FIG. 3, such as connection parameters for communicating with the SCM 120 and positioning of the remote devices 310 relative to the SCM 120.

3) Algorithm Tuning Configuration or related data may be indicative of one or more compensation factors for the algorithm used in determining location of the device 110 relative to the SCM 120.

4) Algorithm Model or related data may be indicative of the algorithm utilized in determining location of the device 110 relative to the SCM 120.

VI. Candidate ACP

In the illustrated embodiment, the cloud 130 may maintain, for each SCM 120, a current working copy of the ACP 400 (the Candidate ACP). The Candidate ACP may be under version control, possibly identified by the version of the ACP 400, with the version changing each time a change is made. For instance, a new version may be created and the version of the ACP 400 may be incremented each time a change is made.

When a new Candidate ACP is created that is identified for approval from an owner account, each of the owner account devices 110 (and thus, the corresponding user 10) may be notified, such as via push notification or SMS, that a new ACP 400 has been created for approval. The user 10 may then obtain the most recent Candidate ACP on devices 110 for approval. A user 10 may approve a Candidate ACP from any of the devices 110 associated with an owner user account (i.e., a user account that has been authorized as an owner for the SCM 120).

In one embodiment, authorizations are issued to only to specific devices 110 (i.e., instead of to user accounts); as such, when a new Candidate ACP is created that is identified for approval from an owner device 110, the owner device 110 (and its corresponding user 10) may be notified, such as via push notification or SMS, that a new ACP 400 has been created for approval. The user 10 may then obtain the most recent Candidate ACP on that device 110 for approval.

In one embodiment, the Candidate ACP may include additional changes from other owners 10, some or all of which may be unwanted. As a result, the user 10 may either (a) reject the Candidate ACP by not approving the Candidate ACP, in which case nothing may happen, or (b) edit the Candidate ACP until it is acceptable, submit the changes to the cloud 130 (pushing another approval request to owner devices 10), and then approve the ACP. The steps of editing, submitting and approving may be combined in the user interface of the device 110. In the case of a rejected Candidate ACP, the Candidate ACP may remain and future changes may be built upon the rejected version.

If an edit to the Candidate ACP is submitted and the ACP version of the Candidate ACP is no longer the current ACP version, the cloud 130 may reject the submission and allow the device 110 to obtain a more recent Candidate ACP for evaluation. For instance, if the Candidate ACP has been updated by another device 110 during the approval process, edits on the device 110 may have been conducted on an older version of the ACP 400, and therefore the cloud 130 may reject any changes submitted by the device 110 and re-initiate the approval process for accepting and editing a Candidate ACP based on the current version of the ACP 400.

After or in response to approval of the Candidate ACP by the user 10 with the owner device 110, the Candidate ACP may be signed by the Device-SCM-Key (private) key of the approving device 110. In one embodiment, the Candidate ACP may be additionally signed by the User-SCM-Key key associated with the approving device 110. In another embodiment, the Candidate ACP may be alternately signed by the User-SCM-Key key associated with the approving device 110. The signed version of the Candidate ACP may be submitted to the cloud 130, which may determine if the signed version of the Candidate ACP matches the current version of the Candidate ACP stored in the cloud 130 and/or that an appropriate device 110 approved (signed) it. Optionally, the cloud 130 may determine if the user 10 of the owner device 110 has not disabled two-factor authentication (2FA), and if so the cloud 130 may send the user 10 a 2FA code (via one or more selected mediums, such as the device 110 of the user 10 or another device associated with the user 10).

If the signed version of the Candidate ACP submitted by the device 110 to the cloud 130 does not match the current version of the Candidate ACP stored in the cloud 130, or it was not approved by an appropriate device 110, the submission may be rejected (and the approval process may be repeated). If the signed version of the Candidate ACP submitted by the device 110 matches the current Candidate ACP in the cloud 130, the Candidate ACP is identified as having been approved by an appropriate device 110, and the user 10 does not have 2FA enabled, the submission is accepted. Optionally, if the user received a 2FA code, the user may enter the 2FA code on their owner device 110, which then submits to the cloud 130 the entered 2FA code. The cloud 130 may then verify that the submitted 2FA matches the 2FA code that was sent. If it does, the submission is considered accepted providing that the other criteria are also satisfied; if it does not, the submission is rejected (and the approval process may be repeated). In an alternative embodiment, the cloud 130 may base acceptance on receipt of one or more user-related keys, such as those described herein at least at Section XII.N (e.g., retina, face, and/or Touch-ID).

After the cloud 130 determines to accept a submission by the device 110 of the signed version of the Candidate ACP, the cloud 130 may mark the corresponding Candidate ACP as approved, generate the final ACP Container 410, and distribute the ACP Container 410 to the various devices associated with the SCM 120. In one embodiment, if the submitted ACP version is older than the Candidate ACP, the submission is rejected.

The Candidate ACP approach may provide the system 110 with both a blockchain-type ledger of the ACP 400 and an approach that may avoid possible concurrency or blocking issues that may arise in cases where multiple versions of the ACP 400 may be out for approval or where only one version of the ACP 400 may be out for approval at a time. The ledge of the ACP 400 may provide an audit history, where each edit results in a new version, and each version is associated with a particular device 110.

In an alternative embodiment, the Candidate ACP process of distributing and approving an ACP 400 may not be utilized. Instead, a new ACP 400 may be generated for approval each time a change that elicits approval is made. Additionally, or alternatively, a new ACP 400 may be generated for approval each time a change that elicits an approval is made where subsequent changes prior to approval of the new ACP 400 are rejected.

VII. Authorization Type

In one embodiment, the system 100 may utilize or associate one or more rights with a device 110 that are defined as one or more authorizations and discussed herein at least at Section II. An authorization may have a type associated with it (see e.g., Sections 1) and VII) known as the authorization type.

An authorization may be associated with a pairing defined between the device 110 and the SCM 120. It should be understood that, for purposes of disclosure, the authorization and authorization type are described in connection with one device 110 paired with one SCM 120. However, there are likely numerous combinations of pairings between devices 110 and SCMs 120, including multiple devices 110 being associated with one or more SCMs 120.

In one embodiment, an authorization type may be associated with the user account, for each SCM 120 to which the user account is authorized. The authorization type may then flow to authorizations created for each device 110 and associated with the user's account. For instance, a User Account Service may create authorizations for each of the user's devices 110, applying the user account authorization type for the particular SCM 120 to each of the created authorizations). In one embodiment, a user account may have, for each SCM 120 to which the user account is authorized, zero or more authorization types, each active at different times and/or under different conditions (e.g., guest-admin for the next week, then guest after), in accordance with the authorizations that have been associated with the user account.

In yet another embodiment, authorizations may only be associated with specific devices 110. For instance, one or more or all authorizations, may not be associated with user accounts and/or shared amongst a user account's associated devices 110.

The authorization type may ultimately indicate the type of role a particular device 110 has over a particular SCM 120. In the system 100, the authorization type may also determine the authorization rights associated with a particular authorization, including but not limited to the right to do one or more of the following: grant another right; transfer ownership; make someone an owner; add a guest; share with another; and/or issue a particular command. In an alternative embodiment, the authorization type and the authorization rights may be managed separately, such as in accordance with one or more embodiments described herein at least at Section XX for blockfan rights management. The authorization type may be a useful aspect of the security model, as the authorization type may control the various actions a particular device 110 (and by proxy, its user 10) is able to perform with regard to a particular SCM 120 (and by proxy, the equipment component in communication with the SCM 120). Example authorization types are listed below for purposes of disclosure, and include without limitation an owner authorization type, a guest-admin authorization type, a guest authorization type, a valet authorization type, and an organization authorization type.

A. Owner

The owner authorization type may be reserved for user accounts and/or devices 110 with full authority over a given SCM 120. A user account with an owner authorization type may be known as an owner account. A device 110 with an owner authorization may be known as an owner device 110. Each account and/or device 110 may be associated with up to one owner authorization for a given SCM 120; however, the SCM 120 may be associated with multiple owner accounts and/or devices 110. In one embodiment, an owner account and/or device 110 for a given SCM 120 may not have other active authorizations for the same SCM 120. If an account and/or device 110 is issued an owner authorization after other authorizations have been issued, all other authorizations may be revoked, such as in accordance with the authorization issuance method described herein at least at Section VIII.

In an alternative embodiment, the SCM 120 may have up to one owner account.

In an alternative embodiment, the SCM 120 may have up to one owner device.

In the illustrated embodiment of FIG. 1, owner accounts and/or devices 110 may view, issue (create), modify, and revoke (remove) any authorization for a given SCM 120. An owner account and/or device 110 may transfer an SCM 120 to a new account and/or device 110, thereby revoking all authorizations for the SCM 120 originating from the owner account and/or device 110 and then create an owner authorization for the target account and/or device 110, respectively. In one embodiment, the owner account and/or device 110 may be configured so that the owner account and/or device 110 must approve all authorization changes for a given SCM 120. The user 10 may or may not need to be involved, depending upon the types of changes. In one embodiment, any owner account and/or device 110 may approve authorization changes. When the owner authorization of the account and/or device 110 is revoked, all authorizations originating from the account and/or device 110 may also be revoked.

In an alternative embodiment, when the owner authorization of the account and/or device 110 is revoked, all authorizations originating from that account and/or device 110 may be moved to another owner account and/or device 110 or a guest-admin account and/or device 110 for the SCM 120.

As discussed herein, an authorization may be associated with one or more access attributes including whether the authorization includes an owner authorization type. Modifications that limit or change an access attribute to an issued authorization may be applied to all of issued authorizations including the access attribute (including all authorizations that may have issued based on the access attribute being limited or changes). For instance, if the owner authorization type or access attribute is changed, any authorizations issued from this owner authorization type may be modified in a similar manner. In an alternative embodiment, modifications that limit access attributes (e.g., changes to the start/end date) to an issuing authorization may not affect any of the issued authorizations based on the access attributes of the issuing authorization.

In one embodiment, all or a subset of the SCMs 120 in the system 100 may be configured so that each of the SCMs 120 has at least one owner account and/or device 110, except when in the factory-reset state, in which case, the SCM 120 is in a transient state while awaiting assignment of its first owner account and/or device 110. It should be understood that not all embodiments may be configured in this manner. After at least one owner account and/or device 110 is associated with a given SCM 120, the at least one owner account and/or device 110 may remain associated with the given SCM 120. As an example, the last owner authorization for the given SCM 120 may not be revoked, unless the given SCM 120 is being transferred to a new owner account and/or device 110. In an alternative embodiment, the last owner authorization for an SCM 120 may be revoked, and when the last owner authorization is revoked, the SCM 120 enters the factory-reset mode.

In one embodiment, once an owner authorization is created, the owner authorization cannot be changed to another authorization type. In an alternative embodiment, the owner authorization may be changed to any other authorization type. Changes to another authorization type may result in authorizations that were previously issued but are now no longer allowed. These authorizations may be either automatically or manually moved to an alternate account and/or device 110 with an applicable authorization, or revoked.

B. Guest-Admin

The guest-admin authorization type may be associated with an account and/or device 110 with nearly full authority over a given SCM 120. A device 110 with a guest-admin authorization may be known as guest-admin devices (or just guest devices when there is no behavioral difference with regard to the guest authorization type). A user account with a guest-admin authorization type may be known as a guest-admin account (or just a guest account when there is no behavioral difference with regard to the guest authorization type). Each account and/or device 110 may have up to one guest-admin authorization for a given SCM 120; however, the SCM 120 may have multiple guest-admin accounts and/or devices. A guest-admin account and/or device 110 for a given SCM 120 may not have other active authorizations for the same SCM 120. In one embodiment, if an account and/or device 110 is issued a guest-admin authorization after other authorizations have already been issued, then all other authorizations may be revoked, such as in accordance with the authorization issuance method described herein at least at Section VIII.

In an alternative embodiment, each account and/or device 110 may have zero or more guest-admin authorizations for a given SCM 120. In another alternative embodiment, each account and/or device 110 may be issued zero or more other allowable authorizations for the same SCM 120. In still another alternative embodiment, the account and/or device 110 may not be issued a guest-admin authorization if other authorizations have already been issued. In yet still another alternative embodiment, if an account and/or device 110 is issued a guest-admin authorization after other authorizations have already been issued, redundant or unallowable authorizations may be revoked, such as in accordance with the authorization issuance method described herein at least at Section VIII.

In the illustrated embodiment of FIG. 1, guest-admin accounts and/or devices 110 may issue (create) non-owner authorizations, but may only view, modify, and revoke (remove) authorizations they issued (or were issued) for a given SCM 120. Guest-admin accounts and/or devices 110 may be issued authorizations with limited access attributes. For instance, the guest-admin account and/or device 110 may be issued an authorization with limited validity dates.

The guest-admin account and/or device 110 may not issue an authorization with more expansive access attributes than the authorizations of the guest-admin account and/or device 110. To provide an example, the guest-admin account and/or device 110 may not issue an authorization with validity dates outside the validity dates associated with the guest-admin authorization type.

When the authorization access attributes of the guest-admin account and/or device 110 are modified to be further limited, authorizations issued by the guest-admin account and/or device 110 may be correspondingly modified to remain allowable or may be revoked. In one embodiment, when guest-admin authorization for the account and/or device 110 is revoked, all authorizations originating from the guest-admin authorization from the account and/or device 110 are also revoked. The guest-admin account and/or device 110 for the SCM 120 may not issue an authorization to itself (i.e., to the same account and/or device 110) for the same SCM 120.

In an alternative embodiment, the guest-admin account and/or device 110 for the SCM 120 may issue an authorization to itself (i.e., to the same account and/or device 110) for the same SCM 120. In one embodiment, the guest-admin authorization may not have limited access attributes. In one embodiment, guest-admin accounts and/or devices 110 issued authorizations from an issuing account and/or device 110 (e.g., an owner account and/or device 110) may view authorizations issued to other accounts and/or devices 110 that are issued authorizations from the issuing account and/or device 110, including or excluding the issuing account and/or device 110, for a given SCM 120, at the discretion of the issuing account and/or device 110. In an alternative embodiment, when a guest-admin authorization of the account and/or device 110 is revoked, all authorizations originating from the guest-admin authorization of the account and/or device 110 may be moved to another owner account and/or device 110 or guest-admin account and/or device 110 for the SCM 120.

In one embodiment, the guest-admin account and/or device 110 may submit authorization modification requests for approval by the issuing account and/or device 110 (e.g., the owner account and/or device 110).

In one embodiment, once a guest-admin authorization is created, the guest-admin authorization cannot be changed to another authorization type. In one embodiment, the guest-admin authorization may be changed to any other authorization type, potentially resulting in one or more authorizations issued from the guest-admin authorization that would no longer be allowed. Such authorizations may be either automatically or manually moved to an alternate account and/or device 110 with an applicable authorization, or revoked.

C. Guest

The guest authorization type may be associated with an account and/or device 110 with limited authority over a given SCM 120. A device 110 with a guest authorization may be known as a guest device 110. A user account with a guest authorization type may be known as a guest account. Each account and/or device 110 may have zero or more guest authorizations for a given SCM 120, whereas an SCM 120 may have multiple guest accounts and/or devices 110. A guest account and/or device 110 for a given SCM 120 may not have active owner or guest-admin authorizations for the same SCM 120. If an account and/or device 110 is issued a guest authorization after other authorizations have already been issued, redundant or unallowable authorizations may be revoked, such as in accordance with the authorization issuance method described herein at least at Section VIII.

In an alternative embodiment, each account and/or device 110 may have up to one guest authorization for a given SCM 120. In another alternative embodiment, if an account and/or device 110 is issued a guest authorization after other authorizations have already been issued, all other authorizations may be revoked, such as in accordance with the authorization issuance method described herein at least at Section VIII. In still another alternative embodiment, each account and/or device 110 may be issued zero or more other allowable authorizations for the same SCM 120. In yet still another alternative embodiment, an account and/or device 110 may not be issued a guest authorization if other authorizations have already been issued. In further still another alternative embodiment, if an account and/or device 110 is issued a guest authorization after other authorizations have already been issued, redundant or unallowable authorizations may be revoked, such as in accordance with the authorization issuance method described herein at least at Section VIII.

In the illustrated embodiment of FIG. 1, the guest account and/or device 110 may issue (create) valet authorizations, but may only view and revoke (remove) authorizations the guest account and/or device 110 was issued for a given SCM 120. The guest account and/or device 110 may be issued one or more authorizations with limited access attributes. For instance, the guest account and/or device 110 may be issued an authorization with limited validity dates.

The guest account and/or device 110 may not issue an authorization with more expansive access attributes than the authorizations of the guest account and/or device 110. To provide an example, the guest account and/or device 110 may not issue an authorization with validity dates outside the validity dates associated with the guest authorization type provided to the guest account and/or device 110.

When the authorization access attributes of the guest account and/or device 110 are modified to be further limited, authorizations issued by the guest account and/or device 110 may be correspondingly modified to remain allowable or may be revoked. When the guest authorization of the account and/or device 110 is revoked, all authorizations originating from the guest authorization may also be revoked.

In an alternative embodiment, the guest account and/or device 110 may not revoke its own guest authorization. The guest account and/or device 110 for the SCM 120 may not issue an authorization to itself (i.e., to the same account and/or device 110) for the same SCM 120.

In an alternative embodiment, the guest account and/or device 110, issued authorization from an issuing account and/or device 110 (e.g., an owner account and/or device 110) may view authorizations issued to other accounts and/or devices 110 that are issued authorizations from the issuing account and/or device 110, including or excluding the issuing account and/or device 110, for a given SCM 120, at the discretion of the issuing account and/or device 110. In an alternative embodiment, when the guest authorization of the account and/or device 110 is revoked, all authorizations originating from the guest authorization of the account and/or device 110 may be moved to another owner account and/or device 110, a guest-admin account and/or device 110, or guest account and/or device 110 for the SCM 120. In one embodiment, the guest account and/or device 110 may submit authorization modification requests for approval by the issuing account and/or device 110.

In the illustrated embodiment, after a guest authorization is created, the guest authorization may not be changed to another authorization type. In an alternative embodiment, the guest authorization may be changed to any other authorization type, potentially resulting in one or more authorizations issued from the guest authorization that would no longer be allowed. Such one or more authorizations may be either automatically or manually moved to an alternate account and/or device 110 with an applicable authorization, or revoked.

D. Valet

The valet authorization type may be considered a special-purpose authorization type for an account and/or device 110 with limited authority over a given SCM 120. A device 110 with a valet authorization may be known as a valet device. A user account with a valet authorization type may be known as a valet account. Each account and/or device 110 may have zero or more valet authorizations for a given SCM 120; however, an SCM 120 may have multiple valet accounts and/or devices 110. A valet account and/or device 110 for a given SCM 120 may not have an active owner authorization, a guest-admin authorization, or a guest authorization for the same SCM 120. If an account and/or device 110 is issued a valet authorization after other authorizations have already been issued, redundant or unallowable authorizations may be revoked, such as in accordance with the authorization issuance method described herein at least at Section VIII.

The valet account and/or device 110 may only view authorizations the valet account and/or device 110 was issued for a given SCM 120. The valet account and/or device 110 may be issued authorizations with limited access attributes—e.g., the valet account and/or device 110 may be issued an authorization with limited validity dates.

In an alternative embodiment, no valet authorizations may exist. In another alternative embodiment, a limited number of valet authorizations may be provided to an account and/or device 110 for a given SCM 120. The number may be a fixed number (e.g., one). In still another alternative embodiment, valet authorizations may be transferred to another account and/or device 110 that belongs to or is associated with the same entity as the valet account and/or device 110 (e.g., a valet service organization).

In one embodiment, a valet authorization may be automatically revoked when some event occurs (e.g., a non-valet account and/or device 110 has connected to the SCM 120 or the equipment component 140 indicates the SCM 120 has traveled beyond some reasonable threshold).

In the illustrated embodiment, after a valet authorization is created, the valet authorization may not be changed to another authorization type. Alternatively, the valet authorization may be changed to any other authorization type, potentially resulting in one or more authorizations issued from the valet authorization that would no longer be allowed. Such authorizations may be either automatically or manually moved to an alternate account and/or device 110 with an applicable authorization, or revoked.

E. Organizations

In one embodiment, an organization authorization type may be provided with the ability for a set of accounts and/or devices 110 to grant to one or more other accounts and/or devices 110 owner authorizations for one or more SCMs 120 that are associated with the organization.

F. Transfer

In one embodiment, a transfer authorization type may be used during the SCM 120 ownership transfer process, as described herein. This authorization type is transient; it is used to signal that such a transfer is desired, so that the appropriate approvals and revocations may be performed, and upon approval, the owner authorization type may be applied to the target account (and its devices 110).

G. Other, Potentially Dynamic Types

In one embodiment, the authorization types available for use in the system 100 may be dynamic. The set of authorization types may vary at runtime, via configuration prior to runtime, or programmatically. For instance, a new type of authorization type not previously used in the system 100 may be introduced via the ACP 400 for the account and/or device 110 and the SCM 120.

H. Authorization Tree

In accordance with one or more embodiments described herein, particularly with respect to one or more authorization types, it should be understood that authorization types and associated access rights may be granted from a first account and/or device 110 to a second account and/or device 110, and so on depending on the rights granted to first and second account and/or devices 110. In this way, a tree of authorizations may be generated that can vary dynamically over time as new authorizations are granted and old authorizations are revoked or modified. An example of two types of such trees is shown in the illustrated embodiments of FIGS. 6 and 7.

Figure 6:
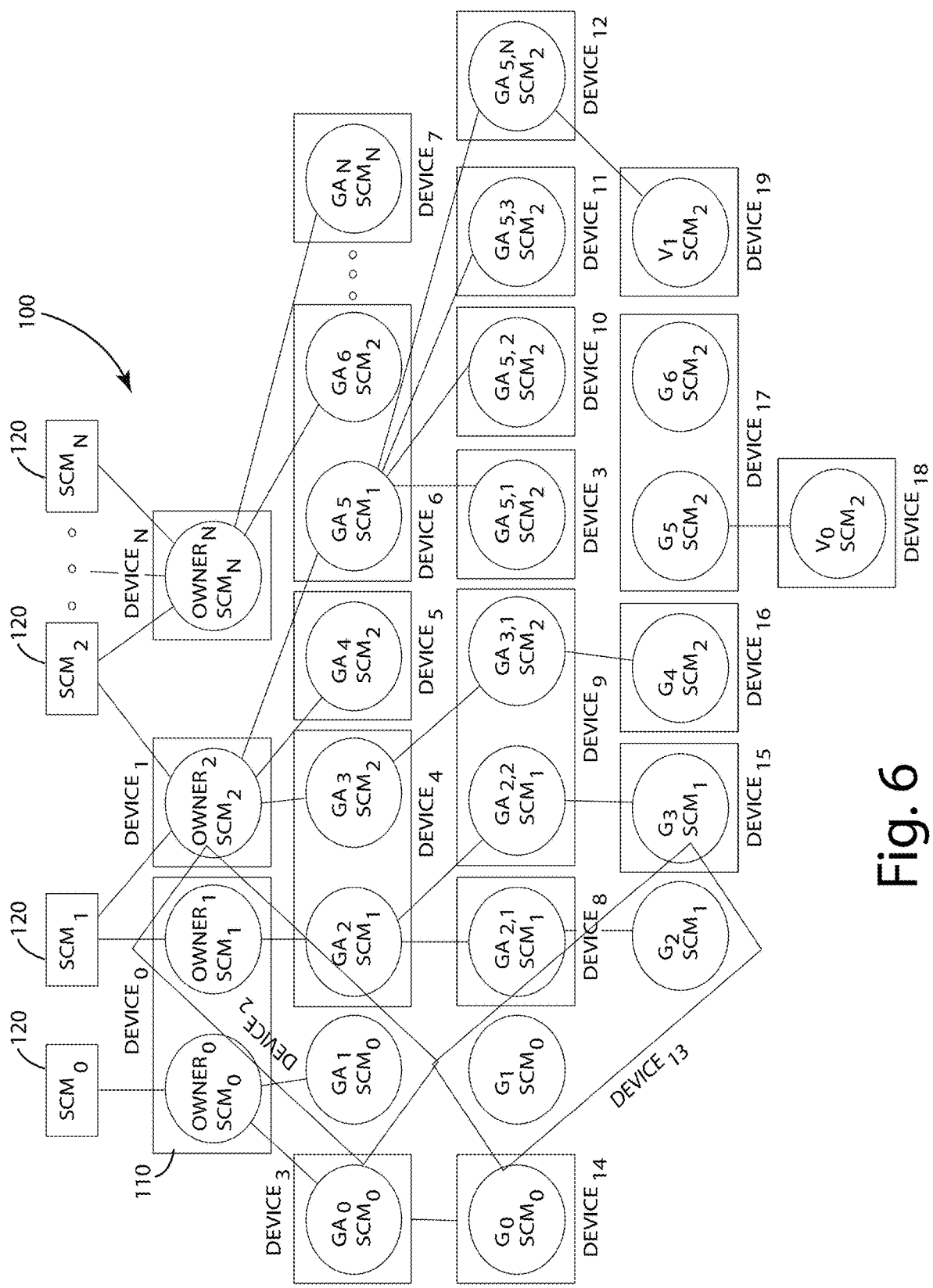
FIG. 6 depicts a tree of trust and authorizations in accordance with one embodiment.
Figure 7:
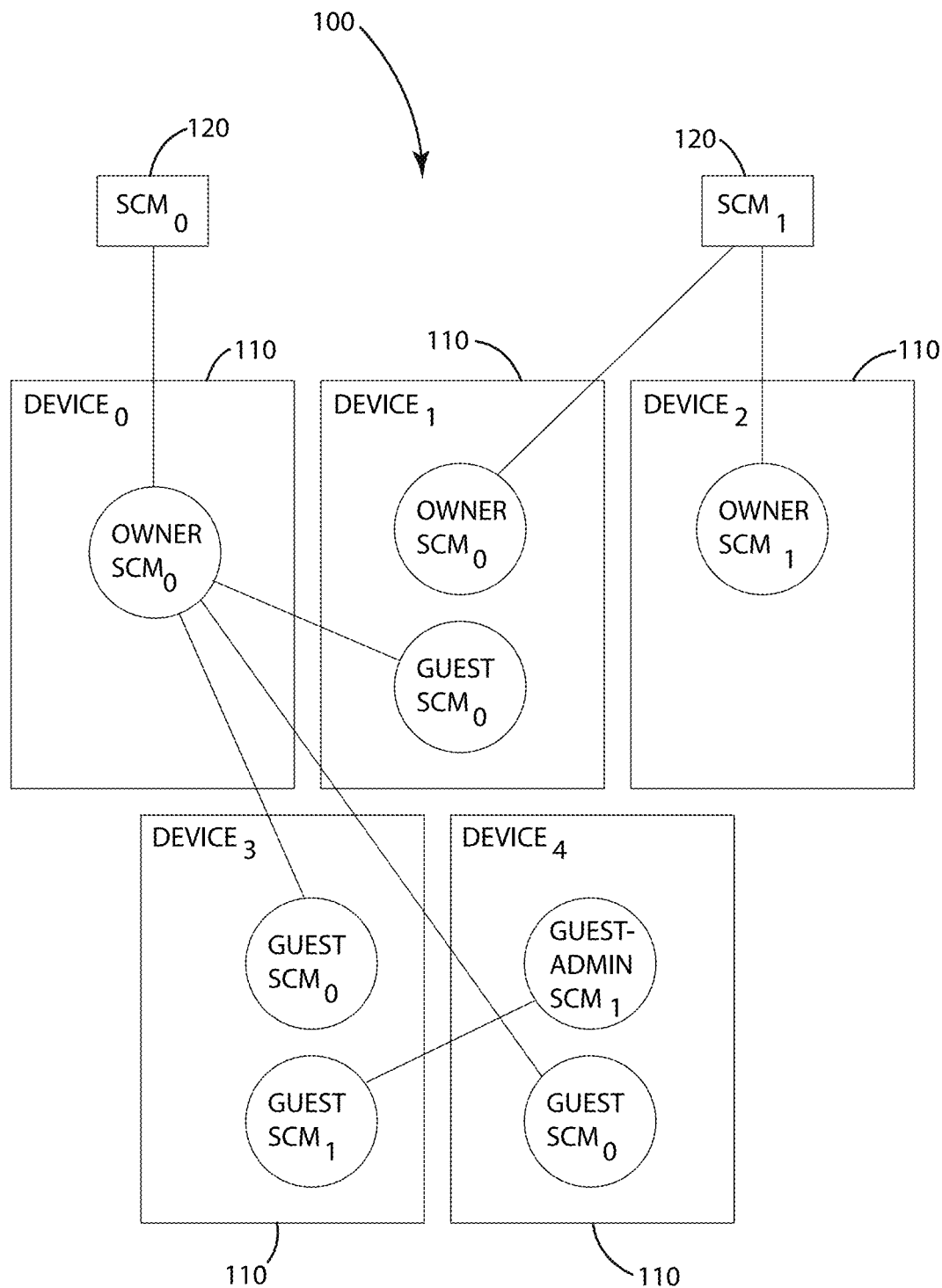
FIG. 7 shows another tree of trust and authorizations in accordance with one embodiment.

In the illustrated embodiments of FIGS. 6 and 7, there is a plurality of SCMs 120 in the system 100, each associated with one or more owner accounts and/or devices 110. The one or more owner accounts and/or devices 110 have provided, directly or indirectly, authorization for guest-admin accounts and/or devices 110, guest accounts and/or devices 110 and valet accounts and/or devices 110.

VIII. Authorization Issuance Sequence

In the illustrated embodiment of FIG. 1, users 10 may issue, modify, and revoke authorizations of various types for SCMs 120 to user accounts (and then, via a User Account Service, to devices 110) and/or devices 110. The security model may utilize the participation of multiple system components to issue an authorization, including users 10 (to accept both the authorization issue request and resultant ACP 400). Authorization modifications and revocations may not always require user participation.

Figure 8:
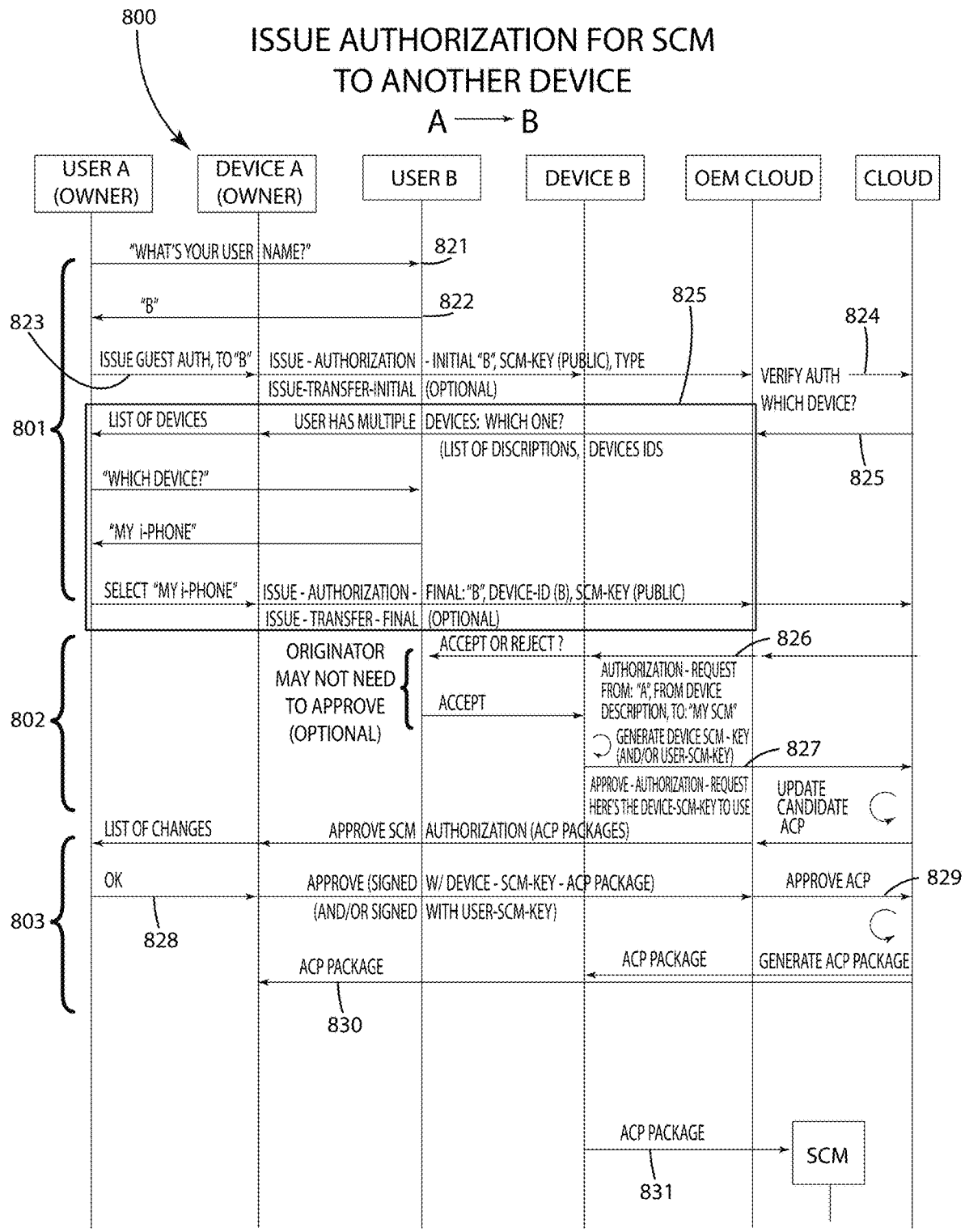
FIG. 8 depicts a method of issuing an authorization for an SCM in accordance with one embodiment.

A method of issuing one or more authorizations in accordance with one embodiment is depicted in FIG. 8 and generally designated 800. The method 800 includes a variety of steps, including Step 801) a user 10 with rights to issue an authorization sending an authorization issue request using a device 110 (with the rights) to a receiving user's account and/or device 110 for a particular SCM 120, Step 802) the receiving user accepting the authorization issue request using their device 110 (e.g., any device 110 associated with their user account, a specific device 110, and Step 803) an owner device 110 for the SCM 120 accepting the change to the ACP 400 resulting from the issued authorization.

In addition to the above, and as described herein, two-factor authentication (2FA) may be added as a system level requirement in one or more steps above; however, the 2FA messages are not shown on the above sequence diagram to facilitate understanding. It should be noted that two-factor authentication requests may be completed using any of the devices 110 associated with the applicable user's account.

In one embodiment, a communication path is provided for a first user 10 to send an authorization issue request to a second user 10 that does not have an existing user account and/or Original Equipment Manufacturer (OEM) cloud account. The communication path may be based at least in part on email and/or SMS communications. The message delivered to the second user 10 may request the second user 10 to obtain an application for a device 110 of the second user 10 (if appropriate), or to visit a website, to create a user account and/or OEM account, and to then accept the request.

As described herein in connection with one or more embodiments, ownership transfer requests may be considered a special case of the typical authorization issue process. This is because an ownership transfer request results in the issuance of an owner authorization along with the revocation of all other authorizations for a given SCM 120. In the illustrated embodiment of FIG. 8, both new and prior owners may be required to approve the ownership transfer request; however, due to the nature of the ownership transfer request, the Candidate ACP may not be modified until after the transfer request is approved.

In the illustrated embodiment, depicted at least at Step 803, the owner account and/or device 110 (and by proxy, its user 10) may approve changes to the ACP 400 initiated by any user 10 for an SCM 120. If an owner account and/or device 110 issues a non-owner authorization (e.g., guest), the issuing user 10 may not be required to participate in the approval process for the ACP 400. Even if participation of the user 10 is not required (e.g., no 2FA or no approval button press is required), an owner device 110 may still participate (e.g., by performing operations in the background without user intervention).

There may be other authorizations and/or authorization operations for which it may be desirable to not require user participation—any of the authorizations and/or authorization operations described herein may be adapted in this manner to not require user participation. It is desirable to improve the user experience, by not requiring a user 10 to participate in the approval of something they initiated. If a user 10 has multiple devices 110 associated with their user account, it may be desired to require approval from another of the user's devices 110, even if they initiated the change. In an alternative embodiment, the scope of changes to the ACP 400 may be limited so that a) a user 10 may be required to participate in approving for an SCM 120, or b) user 10 participation in the approval process for the SCM 120 may be required only when new owner authorizations are issued. When new owner authorizations are being issued, user participation may be required. If user participation is not required, such as in cases where no 2FA is enabled or no approval button press is enabled, an owner device 110 may still participate (e.g., by performing operations in the background without user intervention).

In an alternative embodiment, changes to the ACP 400 may be delegated. As discussed herein, an owner account and/or device 110 may be configured to approve of an ACP 400 for an SCM 120. The owner account and/or device 110 may also delegate approval authority of the ACP 400 to another account and/or device 110 attempting to issue an authorization. The approval authority may be limited to a subset of authorization types available to the owner account and/or device 110, or may include all of the authorization types available. For instance, if owner C has granted guest authorization for a guest A as well as authorization to delegate guest authorization, guest A may issue a guest authorization to guest B without involvement of owner C. In another example, approval authority may be delegated if no other changes to the ACP 400 are present. Otherwise, the owner account and/or device 110, or a non-owner issuing account and/or device 110 in the issuance chain, may approve the change to the ACP 400.

In the event that a system component, such as a device 110, is determined to have been jailbroken, the system component (or a system component that detected the anomaly) may alert the cloud 130. A jailbroken device 110, or other component, may be defined as a component having its operating system or its infrastructure software (e.g., standard libraries or applications) compromised. The cloud 130 may consider a jailbroken device 110 stolen and intended for malicious use, and thus revoke any authorizations issued to or by a jailbroken device 110. In one embodiment, the cloud 130 may revoke authorizations issued to or by user accounts that are associated with a jailbroken device 110.

The illustrated embodiment of FIG. 8 includes several steps as highlighted herein, including sending an authorization issue request, accepting the authorization issue request, and accepting a change to the ACP 400 resulting from the issued authorization. Steps 801, 802, 803. The illustrated embodiment highlights that one or more of these steps may involve one or more additional steps.

For instance, Step 801 directed to sending an authorization issue request may be defined by User A, who is currently classified as an owner, and device A of User A therefore being an owner device 110. User B and her device 110, labeled device B, may be the target for issuance of authorization. User A may request a username of User B, to which User B may respond (e.g., "B"). Steps 821, 822. User A may instruct her device A to issue a guest authorization to User B. The device 110 sends the request to the cloud 130. Step 823. The cloud 130 verifies that user A's device 110 is authorized to issue the authorization for the given SCM 120. Step 824. In one embodiment, the authorization applies to all of user B's devices 110. In another embodiment, if user B has multiple devices 110, user A may select to which of user B's devices 110 the authorization will be sent. Step 825. The cloud 130 requests one of user B's devices 110 to accept or reject the authorization. Step 826. If user B accepts the authorization, user B's device 110 generates a Device-SCM-Key key and sends the relevant portion (e.g., public key) to the cloud 130, which the cloud 130 uses to update the Candidate ACP. Step 827. The updated Candidate ACP's existence is communicated to user A (via their devices 110) and user A accepts the Candidate ACP changes. The device 110 used by user A to approve the changes, signs the approved Candidate ACP and sends it to the cloud 130. Step 828. This step of approval may be considered a requirement in one embodiment if the change is an ownership transfer, even if the originator is the owner device.

The cloud 130 verifies the signed Candidate ACP and generates the finalized ACP 400 and informs all applicable devices 110 of its existence. Step 829. Devices 110 obtain the updated ACP 400 (e.g., via an ACP Container 410, an ACP Container Collection 414, or other means). Step 830. User B's device 110 sends the updated ACP 400 (e.g., via an ACP Container 410 or any other means) to the SCM 120. Step 831.

IX. User Account Model and Device Registration

In one embodiment, the system 100 may take advantage of a user's familiarity with accessing services via an account model, such as a user name and password based account model. Additionally, or alternatively, the system 100 may utilize a key-based identification system (i.e., cryptographic identity) based on an identity of the device 110. The key-based identification (i.e., cryptographic identity) may provide a degree of anonymity to the users and facilitate tracking changes or transactions to the ACP 400 in accordance with a blockchain ledger. Similar to and based at least in part on cryptocurrency systems in which users are identified and authenticated using anonymous public keys, as part of asymmetric encryption/cryptographic identities, and a blockchain ledger that tracks transactions, the system 100 may utilize a device identity as a key in the authorization issuance sequence. The device identity may be dynamic or fixed based on one or more properties of the device, and potentially avoid identifying, tracking, and authenticating users 10 by account and password. The system 100 may substantially equate the physicality of the device 110 to that of a mechanical key and the identity of the device 110 as a proxy for the user 10.

The device identity utilized in the system 100 may be defined to intentionally omit as much user and equipment identifying information as possible from various system components, to both protect the identity of users 10 and equipment 140, as well as to substantially prevent hackers from obtaining such information in the event of a security breach. However, to facilitate the business and user experience to aggregate devices 110 by user 10, each device 110 may be provided a Cloud User Identifier (Cloud-User-ID) by the cloud 130 (User Account Service) when the device 110 is registered.

The Cloud-User-ID may be the same for each device associated with the same OEM User Identifier (OEM-ID). As a result, it may be possible to determine the set of devices 110 associated with a particular Cloud-User-ID. The User Account Service of the cloud 130 may link OEM user accounts (via OEM User Identifiers) abstractly to Cloud-User-IDs using a secure database approach, wherein the services of the cloud 130 that store and perform this mapping (the User Account Service) may be isolated or separated from other services of the cloud 130 and the OEM cloud, allowing user-identifiable information to remain in the external OEM cloud. This approach may prevent unauthorized access to a hacker unless the hacker infiltrates three separate system components (at least two of which are in separate management infrastructures, domains, or spheres of control) to piece together personally identifiable information (PII), such as the mapping of users 10 to OEM user accounts to devices 110 to SCMs 120 or equipment 140.

In an alternative embodiment, the cloud 130 may not use the secure database approach, but may still provide a separate User Account Service that is integrated with other services of the cloud 130. For instance, the User Account Service may potentially operate on the same infrastructure, network, or via a virtual private network. In an alternative embodiment, the cloud 130 may not separate OEM account information from other user information. To provide an example, the cloud 130 may not use the secure database approach, and OEM User Identifiers and Cloud-User-IDs may not exist or may not be abstracted.

In the illustrated embodiment, the cloud 130 may not maintain account information that may be personally identifiable. As a result, the cloud 130 may not have a conventional concept of user accounts, and may lack non-OEM cloud login APIs to enable direct access. The devices 110 may be registered and associated with an OEM user account using the OEM cloud, which in turn may interacts with the cloud 130.

Figure 9:
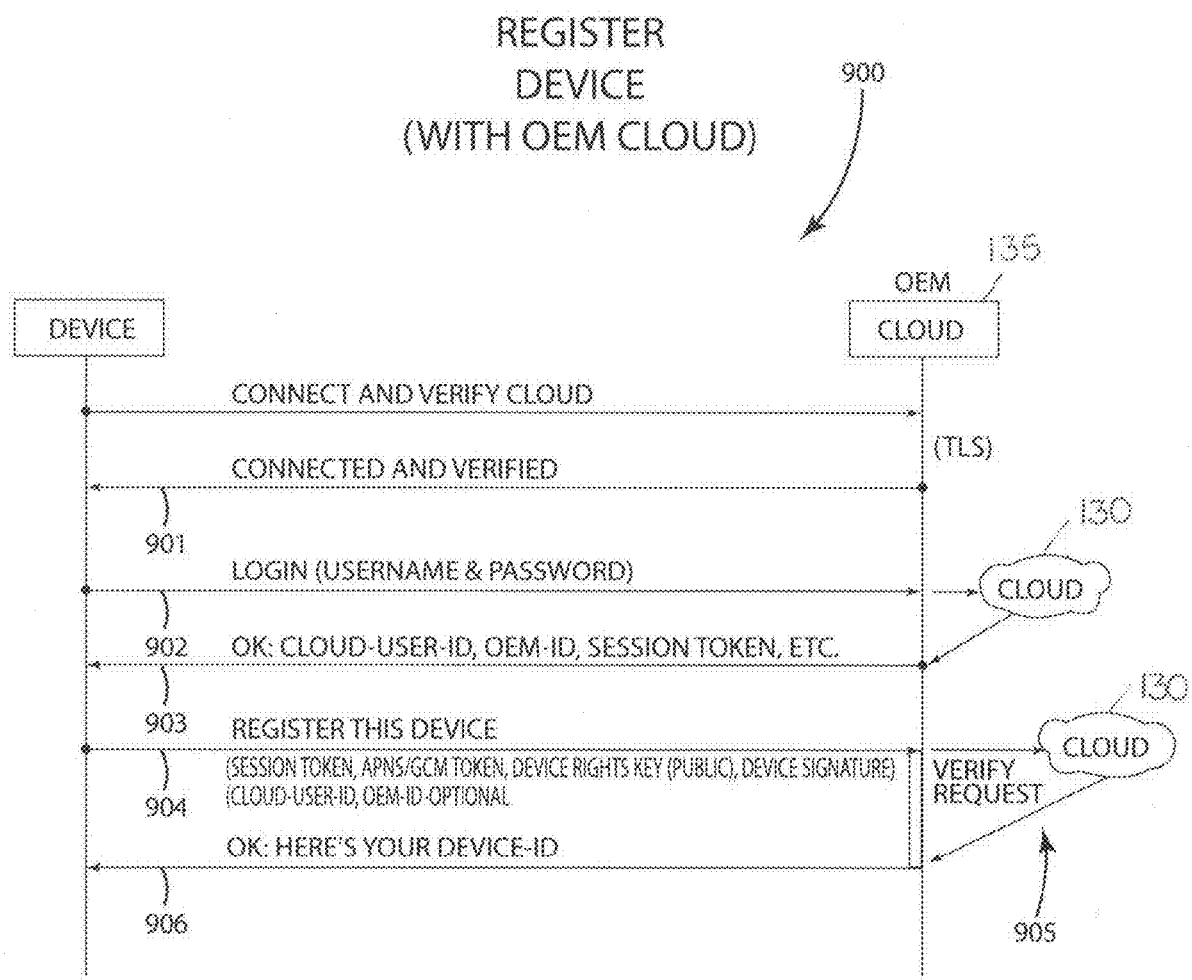
FIG. 9 shows a method of registering a device in accordance with one embodiment.

A method of registering a device in accordance with one embodiment is described in the illustrated embodiment of FIG. 9, and generally designated 900. The device 110 connects securely with the OEM cloud (e.g., via TLS). Step 901. The device 110, using input from the user 10, sends the OEM cloud the user's username and password. Step 902. If the username and password is verified (i.e., correct), the OEM cloud provides the device 110 with the Cloud-User-ID, OEM identifier, necessary tokens (e.g., Session Token and/or Cloud Token), and any other data necessary to successfully register a device. The OEM cloud may interact with other parts of the cloud 130. Step 903. The device 110 sends a registration request with the OEM cloud the Session Token (which may map to a specific Cloud-User-ID and OEM-ID, allowing the device 110 to not send them individually—or to require them separately as additional verification), any other necessary tokens (such as push notification service tokens), a device rights public key (if using a device rights service, like the blockfan system described herein), and a device-specific signature (e.g., obtained from the device operating system software). Step 904. In one embodiment, to substantially avoid or prevent a malicious device from registering the same device multiple times, a device-specific signature (e.g., an identifier or vendor application identifier) may be utilized in the registration process.

The OEM cloud in the method 900 may verify the registration request. Step 905. If the registration request was successful, the OEM cloud provides the registered device 110 with a Device-ID. Step 906.

To help protect against accidental duplicate registration of the same device 110, a device-specific signature is provided as part of the device registration request. The device signature may not be a signature in the cryptographic sense, nor does it need to be truly device-specific (e.g., it may be application-install specific). Rather, the device signature may be an identifier that can be used to attempt to uniquely identify a particular device (e.g., a serial number or an application instance number, such as a randomly generated number or a number provided by the operating system). The device registration process, when successful, may provide the generated Device-ID to the device 110 for use in later operations, such as issuing an authorization.

In an alternative embodiment, the OEM cloud may not be utilized. The cloud 130 may allow a device 110 to be registered with a randomly generated (likely unique) Cloud-User-ID. The Cloud-User-ID in this case may include a specific globally defined or configurable OEM Identifier—and, the device 110 may be responsible for maintaining or providing device aggregation information and all facilities utilized to obtain information to perform desired cross-device operations.

In many cases, the OEM provides the user interface for their equipment components 140, such as, but not limited to, branded websites and mobile applications. The OEM may therefore manage the corresponding system components necessary to deliver the equipment components 140, which may include OEM-branded user accounts and device association services that are provided by an OEM cloud.

Figure 10:
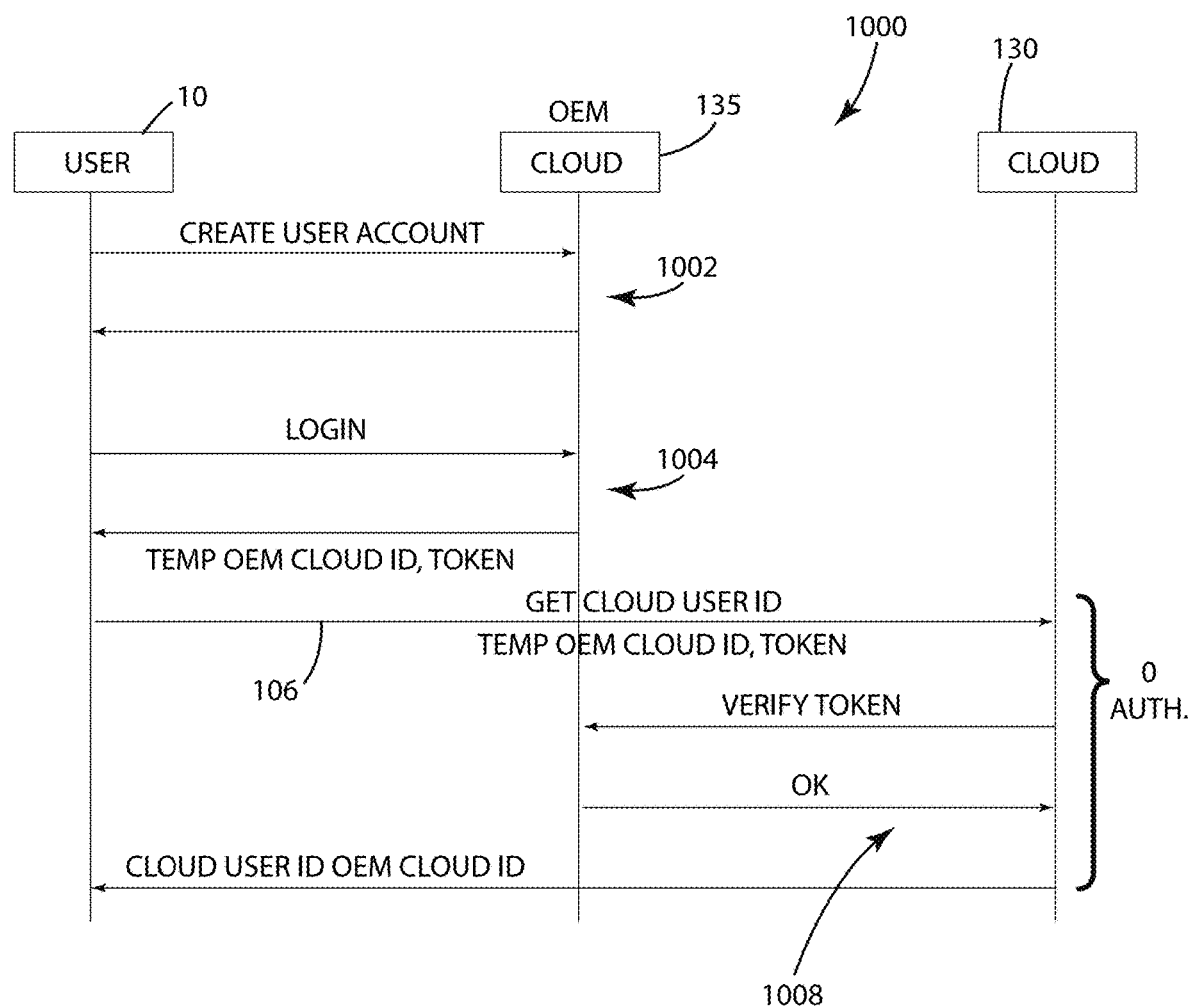
FIG. 10 shows a method of generating a user account in accordance with one embodiment.

Through a set of Application Programmer Interfaces (APIs), using appropriate privacy and trust (encryption, authentication, and authorization), the OEM cloud may be able to obtain, from the cloud 130, which devices 110 are associated with a particular user, manage authorizations, and perform any device ownership adjustments that may be necessary over the life of the equipment components 140 of the OEM. Privacy and trust may be established in a variety of ways, including via TLS 1.2+ mutual authentication using X.509 certificates and OAuth2 or an alternate/custom challenge/response mechanism (OEM cloud). An example of an OAuth2 challenge/response flow or method 1000 for interaction between the OEM cloud, the user 10 and the cloud 130 is shown in the illustrated embodiment of FIG. 10.

In the illustrated embodiment, the user 10 may obtain a user account from the OEM cloud 135, which may be configured similarly to the cloud 130 described herein. Step 1002. The user 10 may then log in to the OEM cloud 135 to obtain a Temporary OEM Cloud Identifier and/or Cloud Token (e.g., for use in OAuth2 authentication operations). Step 1004. The user 10 may request a Cloud-User-ID from the cloud 130, providing the cloud 130 with the Temporary OEM Cloud Identifier and/or Cloud Token obtained earlier from the OEM cloud 135. Step 1006. The cloud 130 may verify, with the OEM cloud 135, the Cloud Token and/or Temporary OEM Cloud Identifier provided by the user 10. Step 1008. If the Cloud Token and/or Temporary OEM Cloud Identifier are verified, the cloud 130 may transmit a Cloud-User-ID to the user 10, potentially along with the OEM Cloud Identifier (OEM User Identifier) (which may be the Temporary OEM Cloud Identifier, but cleared of its temporary status); the Temporary OEM Cloud Identifier used above may simply be used as a means to further verify that the OEM Cloud 135 and cloud 130 are referring to the same user. The Temporary OEM Cloud Identifier may be used for other purposes, such as directing to which server to connect, or to allow the OEM cloud 135 to use a different OEM Cloud Identifier (Cloud-User-ID) than the cloud 130.

In an alternative embodiment, privacy and trust may be established via TLS 1.2+ server-side (cloud) authentication using X.509 certificates and OAuth2 or an alternate or custom challenge and response mechanism established with the OEM cloud 135. In another alternative embodiment, privacy and trust may be established using TLS 1.2+, or a custom or alternate encryption and authentication protocol with OAuth2 or an alternate or custom challenge and response mechanism.

As described herein, in one embodiment, the cloud 130 may not provide user account services allowing a user to create an account and then associate their devices 110 with the account using a web or mobile application. Instead, the OEM cloud may provide these services. The User Account Service provides, for use by an OEM cloud, the capabilities to identify devices 110 associated with OEM user accounts (via the OEM User Identifiers)—the User Account Service of the cloud 130 may provide anonymized user accounts. In one embodiment, the cloud 130 may provide conventional user account management and device 110 association services (e.g., via a User Account Management Service) that may be used by the OEM Cloud, other OEM services, applications, and system components, such as users 10, the devices 110, the SCMs 120, the equipment 140, and the cloud 130 itself, and so on. This embodiment may or may not use the secure database approach described herein, and may or may not expose a cloud-generated OEM User Identifier (or OEM Cloud Identifier) for use by the OEM in their systems. The user account management and device association services provided by the User Account Management Service of the cloud 130 may include (but is not limited to) the following:

1) Create and activate a user account (by name, email, phone number, and password) with two-factor authentication and email verification
2) Add or remove devices to or from, or both, the user account
3) View devices associated with the user account and authorizations associated with the devices In one embodiment, authorizations may be shared across all devices 110 associated with a user account of the user 10. Authorization changes may be approved by any device 110 associated with the user account associated with the owner device 110 of an SCM 120. Users 10 may or may not be able to configure how authorizations are shared amongst their devices 110. For example, a user 10 may or may not be able to configure which devices 110 receive authorizations for which SCM 120. The User Account Service may ensure these operations are performed on behalf of the user, per any configured preferences and system rules.

X. Monetization

The system 100 in one embodiment may be configured to require payment from users 10 for certain operations performed by the system 100. This way, the system 100 may monetize aspects or functionality provided by the system 100. Maintaining the technology and infrastructure for system components to operate and securely communicate may be a daunting and expensive process. Additionally, users 10 may expect technology advancements, improvements, compatibility with new products and technologies offered in the marketplace, and security patches or enhancements, all of which may require funding. There are a number of system operations described herein that are computationally expensive, but which users 10 have no direct or tangible involvement. There are a number of computationally expensive system operations (i.e., services) that do involve users 10, such as issuing, modifying, or revoking authorizations, device registration, transferring ownership of or factory-resetting SCMs 120, updating firmware, and so on. Payment for services may be remitted by users 10, OEMs, or other entities. The following actions may be monetized with regard to the operation of the security model/system described herein: issuing authorizations; registering devices 110; transferring ownership of an SCM 120; factory-resetting an SCM 120; and updating firmware. It should be understood that monetization is not limited to these events and that other events or circumstances may form the basis for monetization.

A. Issuing Authorizations

The OEM may be charged for each authorization successfully issued by their users 10, where invoices are generated for aggregated charges incurred during predefined intervals, such as daily, weekly, or monthly. Alternatively, the OEM may be charged for each authorization successfully issued in real-time. This real-time charge model may result in micro-payments.

The user 10 may be charged for each authorization successfully issued by the user 10, where invoices can be generated for aggregated charges incurred during predefined intervals, such as daily, weekly, or monthly. Alternatively, the user 10 may be charged for each authorization successfully issued by the user 10 in real-time to yield monetization based on micro-payments. With this embodiment, payment may be authorized by the user 10 indicating the user 10 consents to being charged. Consent may be obtained when the authorization request is sent, and the user may be charged either when the recipient accepts the authorization or when the resultant change to the ACP 400 is approved. Proof of consent can be supplied as part of the request, which may be rejected if proof of payment authorization is absent.

In an alternative embodiment, the user 10 may be charged immediately and the transaction canceled/refunded if the sequence of granting authorization is not successful.

In one embodiment, the user 10 may be charged for each authorization the cloud 130 successfully issues to the user 10, where invoices can be generated for aggregated charges incurred during predefined intervals, such as daily, weekly, or monthly. In one embodiment, the user 10 may be charged for each authorization successfully received by or ordered by the user 10 in real-time to yield a monetization system based on micro-payments. With this embodiment, payment may be authorized by the user 10 indicating the user consents to being charged. Consent may be obtained in conjunction with receipt of the authorization request. Proof of consent may be supplied as part of the request acceptance response, which may be rejected if proof of payment authorization is absent. The user 10 may be charged either when the request acceptance response is received by the cloud 130 or when the resultant change to the ACP 400 is approved. In an alternative embodiment, the user may be charged immediately and the transaction canceled or refunded if the sequence is not successful.

B. Registering Devices

The OEM may be charged for each device registered successfully by their users 10, where invoices can be generated for aggregated charges incurred during predefined intervals, such as daily, weekly, or monthly. In one embodiment, the OEM may be charged for each device 10 registered successfully in real-time, yielding a micro-payment type of system.

In one embodiment, the user 10 may be charged for each device 10 registered successfully by the user 10, where invoices can be generated for aggregated charges incurred during predefined intervals, such as daily, weekly or monthly. In one embodiment, the user 10 may be charged for each device 10 the user registers successfully in real-time, yielding a micro-payment type of system. With this arrangement, payment may be authorized by the user indicating the user consents to being charged. Consent may be obtained in conjunction with sending the device registration request and proof of consent may be supplied as part of the request. The request may be rejected, if proof of payment authorization is absent, and the user may be charged when the device registration is successfully processed. In an alternative embodiment, the user 10 may be charged immediately and the transaction canceled or refunded if the device registration sequence is not successful.

C. Transferring ownership of an SCM

The OEM in one embodiment may be charged for each successful ownership transfer for an SCM 120 by the users 10 of the OEM. Invoices may be generated for aggregated charges incurred during predefined intervals (e.g., daily, weekly, monthly, etc.). The OEM may be charged for each successful SCM ownership transfer in real-time, yielding a micro-payment based monetization system.

The user 10 in one embodiment may be charged for each successful transfer of ownership for an SCM 120. Invoices may be generated for aggregated charges incurred during predefined intervals, such as daily, weekly, or monthly. In one embodiment, the user 10 may be charged for each successful transfer of ownership for an SCM 120 in real-time, yielding a micro-payment based monetization system. With this arrangement, payment may be authorized by the user indicating the user consents to being charged. Consent may be obtained in conjunction with the sending of the device registration request, and proof of consent may be supplied as part of the request. The request may be rejected, if proof of payment authorization is absent, and the user may be charged when the device registration is successfully processed. In an alternative embodiment, the user 10 may be charged immediately and the transaction canceled or refunded if the device registration sequence is not successful.

D. Factory-Resetting an SCM.

The OEM may be charged for each successful factory-reset of an SCM 120 by users associated with the OEM. Invoices may be generated for aggregated charges incurred during predefined intervals, such as daily, weekly or monthly. In one embodiment, the OEM is charged for each successful SCM factory-reset in real-time, yielding a micro-payment based monetization system.

In one embodiment, the user 10 may be charged for each successful factory-reset of an SCM 120, where invoices can be generated for aggregated charges incurred during predefined intervals, such as daily, weekly, or monthly. In one embodiment, the user 10 may be charged for each successful factory-reset of an SCM 120 in real-time, yielding a micro-payment based monetization system. With this embodiment, payment may be authorized by the user 10 indicating the user 10 consents to being charged. Consent may be obtained when the new-owner-initiate request is sent, and proof of consent may be supplied as part of the request. The request may be rejected if proof of payment authorization is absent. The user 10 may be charged when the cloud 130 generates the resultant ACP 400. In an alternative embodiment, the user 10 may be charged immediately and the transaction canceled or refunded if the sequence is not successful.

E. Firmware Update.

The OEM may be charged for each successful firmware update by their users 10, where invoices can be generated for aggregated charges incurred during predefined intervals, such as daily, weekly, or monthly. The OEM in one embodiment may be charged for each successful firmware update in real-time, possibly yielding a micro-payment based monetization system.

The user 10 may be charged for each successful firmware update, where invoices are generated for aggregated charges incurred during predefined intervals, such as daily, weekly, or monthly. The user 10 in one embodiment may be charged for each successful firmware update in real-time (e.g., micro-payments). With this embodiment, payment may be authorized by the user 10 (indicating the user consents to being charged) when the firmware update is sent or begins. Proof of authorization may be supplied as part of the request, which would be rejected if proof of payment authorization is absent. The user 10 may be charged when a component of the system 100 detects that the firmware update was successful. In an alternative embodiment, the user 10 may be charged immediately and the transaction canceled or refunded if the sequence is not successful.

XI. Distributed Trust Model

The system 100 in accordance with one embodiment may utilize a distributed trust model. This distributed trust model may enable the device 110, the SCM 120, and the equipment system components 140 to be either online and/or offline while still being able to establish trust, communicate securely, and operate. For instance, the device 110, the SCM 120, and the equipment system components 140 may enable online and/or offline authentication of system components and authorization of actions.

A. Overview

The system 100 in one embodiment may incorporate the principle of least privilege to enhance confidentiality and privacy, isolate system components, and reduce attack surfaces. Communication between, and data storage within, system components may be accomplished securely and confidentially by uniquely combining security standards with process. Standards may include encryption, authentication, integrity verification, or security protocols, or a combination thereof, and process may involve protocols, workflow, or system state management or verification, or any combination thereof.

For the purposes of disclosure, a system component is online if the system component is able to communicate with services via the Internet, including, for example, if the system component is able to communication with a certificate authority.

Encryption in one sense may provide only a certain degree of confidentiality. An encrypted message or ciphertext may only be viewed or decrypted by an entity with the proper key. The key may be a shared secret or key, or the key may be part of an asymmetric pair defined by a public key and a private key.

To verify the integrity of a message, or that the message has not been altered, a secure (cryptographic) hash may be stored within the encrypted message. To verify the authenticity of a message, originator-identifying information may be stored within the encrypted message. Message integrity and authenticity may be simultaneously verified, by including in (or with) the encrypted message, with symmetric cryptography, a message authentication code (MAC), or with asymmetric cryptography (e.g., public-key cryptography), a digital signature.

With asymmetric cryptography, digital signatures may not by themselves guarantee that the author signed and encrypted the message. Such a guarantee can be described as cryptographic non-repudiation or proof of authorship and/or origin.

Traditional sign-then-encrypt (S-E) approaches are considered vulnerable to surreptitious forwarding—that is, anyone with the originator's public key may decrypt, and then re-sign and re-encrypt the message using an alternate private key. The encryption (-E) step may or may not occur at one or more steps in the encryption process. For instance, the encryption step may occur immediately as part of the message package, or the message may be a signed and encrypted configuration or command message. The encryption step may occur as part of the communications channel transport, such as TLS. The encryption step may be absent, such as in the case where confidentiality of the package is not required or is provided by some other means, such as a communications channel. A specific example of unneeded confidentiality may simply be a signed message.

If the public key were distributed with the message, the recipient may not be aware of an authorship change. Digital certificates (X.509), potentially managed by a Public Key Infrastructure (PKI), may provide evidence that a particular public key is a particular author's key and therefore that a particular digital signature was created by a particular author. In the absence of digital certificates, proof of authorship, and potentially, proof of intended destination, may be established by including the identity of the author, the identity of the destination, or both, as appropriate, in the encrypted message when using the S-E approach. The S-E approach may include both a) double or more signing of the message, such as signing the S-E message (S-S-E) and b) double or more encrypting the message, such as encrypting an encrypt-then-sign (E-S) message, which can be designed an E-E-S message.

Symmetric cryptography may not suffer from surreptitious forwarding. The receiver can be assured that the author is known and that the sender intended to send the message to the receiver. However, symmetric cryptography may not provide cryptographic non-repudiation, since both sides possess the shared secret. A system based on symmetric cryptography may consider and mitigate this issue via one or more layers of selected security protocols, message packaging or storing, and communication schemes.

Symmetric and/or asymmetric encryption using message integrity and authentication mechanisms, with and/or without digital certificates, are used throughout the system 100 to communicate between, and store data within, system components. Numerous examples are described herein. To substantially overcome the identified weaknesses of asymmetric encryption, and other known vulnerabilities or considerations not explicitly identified but generally known to the security community, wherever asymmetric encryption is implemented, one or more of the following features may be used in the system 100:

1. Digital Certificates

Digital certificates (X.509) may be used to verify the identity of system components that are always or substantially always online, such as the cloud 130. System components may implement one or more of a public certificate authority, a private cloud certificate authority, or a self-signed certificate.

2. Public Certificates and Keys

Public certificates and/or public keys that may be utilized to decrypt a message are most likely never delivered with the message. That is, the receiver in one embodiment must have previously received and authenticated the public certificates and/or public keys from a trusted source. Public keys and certificates may be targeted to specific relationships where practical or considered valuable, such as between a pair defined by the device 110 and the cloud 130 and a pair defined by the device 110 and the SCM 120, instead of per cloud 130 or per SCM 120. Public keys and certificates may be stored only by system components where utilized.

3. Signatures

Where digital certificates are not used, signatures may be used, and as appropriate to the functional and security requirements of the message content, the author identity and/or receiver identity may be included within the message.

The message may be encrypted or unencrypted, or the message may be double or more-signed and/or or double or more-encrypted.

4. Proof of Authorship

Due to the distributed trust nature of the system 100, the system 100 may be configured to substantially ensure that a particular message originated from a particular source. For instance, a message may be delivered by any source, so long as the author's identity is preserved, and the message can be authenticated as having originated from the particular source. Messages may be structured and delivered in such a way that the internals of a message intended for a particular system component may not be viewed by other components, but may still be verified by all or some components as being authored by a trusted component.

Symmetric and asymmetric keys, such as shared secrets and public/private keys, and certificates may be cycled or changed. This cycling or changing may be conducted either as part of a breach recovery procedure or via normal operation of the system 100. The system 100 may periodically cycle keys. System components and message definitions may support such actions, providing updated keys as part of a key cycle protocol among system components or system communications, including online system components, offline system components, and components that switch between offline and online. Example online system components or communications include the cloud 130 or the pairing between the cloud 130 and the device 110. Example offline system components or communications include the device 110, the paring between the device 110 and the SCM 120, the SCM 120, the pairing between the equipment 140 and the SCM 120, and the equipment 140. In one embodiment, key cycling instructions and one or more keys may be delivered within message content, such as the ACP 400.

System components or communications using digital certificates, such as the cloud 130 and communications between the cloud 130 and the device 110, may register revoked certificates with a certificate revocation list (CRL) of an appropriate certificate authority. Revoked certificates may be registered with the CRL in real-time. In an alternate embodiment, revoked certificates may be registered in batches at a pre-defined interval, such as hourly, every four hours, or daily. In an alternative embodiment, revoked certificates may not be registered with the CRL.

System components or communications using digital certificates, such as the cloud 130 and communications between the cloud 130 and the device 110, may verify during the authentication process that certificates have not expired and have not been revoked. Verification may be conducted using the CRL of the appropriate certificate authority. In an alternative embodiment, certificate revocation may not be checked. In another alternative embodiment, certificate expiry may not be checked.

In yet another alternative embodiment, an Online Certificate Status Protocol (OCSP) may be used instead of the CRL of the appropriate certificate authority. An OCSP responder may reside within the certificate authority, a third-party service, or the cloud 130.

In one embodiment, a system component may verify identity or authorship using symmetric and/or asymmetric cryptography with one or more of challenge/response security protocols, encrypted identity-containing messages, Enveloped Public Key Encryption (EPKE), and/or other means, such as process and/or two-factor authentication. Additionally, multiple hardware- or software-based security and authentication layers, with or without certificates, may be utilized. To provide an example, there may be one or more layers of security and authentication layers utilized for authentication and encryption of underlying communication channels, such as BLE authentication, DTLS, TLS, NFC, or RFID, or a combination thereof.

Identity changes and revocations (and identity verification or authentication changes) may be distributed from or to the cloud from or to all or some system components, such as via the ACP 400, the factory-reset procedure, or key cycling, or a combination thereof.

In one embodiment, certificates may be used for online system component identity verification, whereas "raw" asymmetric cryptography may be used for system components that may be offline. While certificates may seem useful, certificates often involve significant resources that may not be available for constrained devices, such as system components with little ROM, RAM, processing capabilities, or communications bandwidth/throughput.

In the system 100 in the illustrated embodiment, the SCM 120, the device 110, and the equipment 140 may be considered constrained devices. While one or two certificates may be feasible, the number of certificates that may be required to verify the authenticity of each authorization, as well as the identity of each connecting device 110, may not be feasible. Therefore, with such system components, "raw" asymmetric and/or symmetric cryptography may be used, because this type of cryptography may involve significantly less memory with correspondingly lower processing overhead. Less memory usage may also result in a reduction in the communications bandwidth to transport information.

In one embodiment, the device 110 may generate one or more self-signed digital certificates to establish the identity of the device 110, as opposed to just generating an asymmetric private/public key pair.

In an alternative embodiment, symmetric cryptography may be used wherever raw public-key cryptography is utilized—for example, non-certificate-based uses.

In one embodiment, P-256 (secp256r1) Elliptic Curve (ECC) (asymmetric) and AES-128 (symmetric) cryptography is used. One or more alternative embodiments may utilize one or more of the following types of cryptography: P-192 (secp192r1) Elliptic Curve (asymmetric) cryptography (ECC); P-384 (secp384r1) Elliptic Curve (asymmetric) cryptography (ECC); P-521 (secp521r1) Elliptic Curve (asymmetric) cryptography (ECC); RSA (asymmetric) cryptography; AES-192 (symmetric) cryptography; and AES-256 (symmetric) cryptography. It should be noted that the system is not limited to the above cryptographic algorithms.

B. Certificate Verification

In one embodiment, one or more certificates may be used to verify authenticity or authorship for all or a subset of (online and offline) system components, authorizations, and other significant data items and configurations. In an alternative embodiment, certificates may be chained (or where signatures are chained in a certificate) to verify that appropriate parties have approved a message, or delegated authentication or authority, for both online and offline system components, authorizations, and other significant data items and configurations.

In another alternative embodiment, system component identities and authorizations (and potentially other classes or subclasses) may be separate entities represented as certificates with each class and/or subclass (e.g., identity and authorization) having a different certificate authority. For instance, each entity may have separate authentication and authorization trees. In one embodiment, authentication and authorization certificate authorities may reside on different servers.

In an alternative embodiment, each class may use the same certificate authority. In another alternative embodiment, Attribute (Authorization) Certificates (RFC 5755) may be used to represent authorizations or other information, such as configuration parameters or identifiers.

XII. Distributed Key System

Figure 11A:
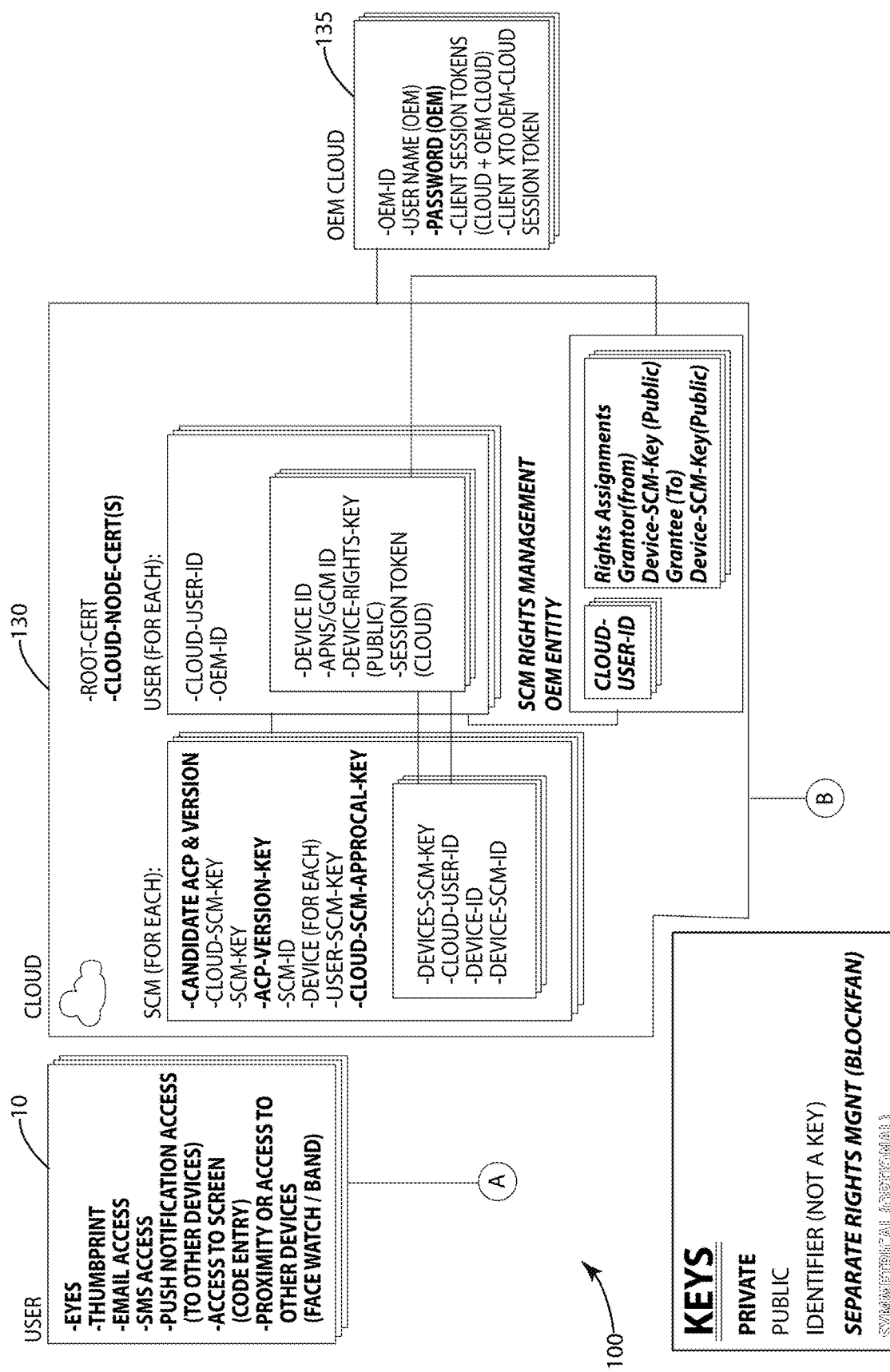
FIGS. 11A-B are a representative view of data distribution in accordance with one embodiment.
Figure 11B:
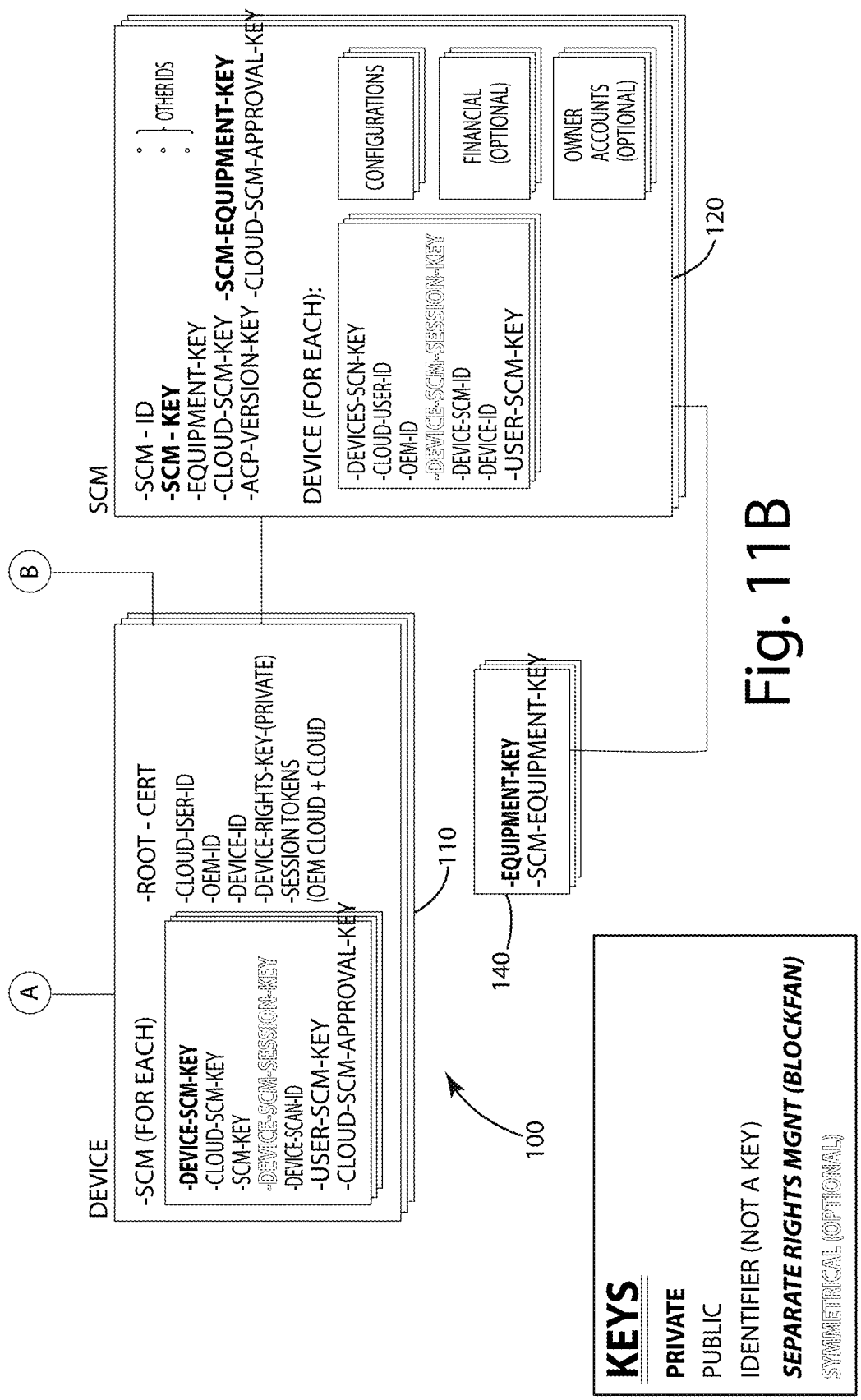

There are a number of encryption keys distributed across system components in the system 100 in a manner that may allow each system component to authenticate one another, and to deliver data confidentially and securely in a way that data may be accessible to components (possibly only to those components for which the data is considered necessary). The data may be communicated online and/or offline. The distribution of keys or identifiers in accordance with one embodiment is depicted in FIGS. 11A-B, including multiple system components and the encryption keys (and some identifiers) they possess. Additionally, the illustrated embodiment of FIG. 16 also depicts the system 100 with each system component and only the private/symmetric encryption keys they possess. Each of the encryption keys according to one or more embodiments is described in more detail below.

A. SCM-Key and SCM-ID

The SCM-Key key may uniquely identify a particular SCM 120. The SCM-Key key may be an asymmetric private/public key pair generated and stored only during the manufacturing process, either directly by the SCM 120 or by a manufacturing tool. The SCM-Key private key may be securely stored on the SCM 120 in secure memory 220 or a Secure Element, including a secure hardware module such as a Secure Enclave or Hardware Security Module (HSM).

The SCM-Key private key is not transmitted to other system components. On the other hand, the SCM-Key public key may be securely transmitted to and stored by system components that utilize the SCM-Key public key, such as the device 110 or the cloud 130. The SCM-Key private key may be used by the SCM 120 to encrypt and/or sign messages sent by the SCM 120 to other system components and may be used to decrypt and/or verify messages sent to the SCM 120 from other system components. The SCM-Key public key may be used by system components to decrypt and/or verify that a message originated from a particular SCM 120 and may be used to encrypt and/or sign messages intended for a particular SCM 120.

In one embodiment, the SCM-ID may serve a different, but related, purpose as compared to the SCM-Key key. The SCM-ID may be considered unique to a particular SCM 120; however, the SCM-ID may not participate directly in the security model of the system 100. The SCM-ID may be relatively small in size, as compared to the SCM-Key key, in terms of storage and/or representation (e.g., 32- or 64-bits versus 256-bits). The SCM-ID may be transported across the system 100 to, and used by, other system components to assist users 10 in identifying SCMs 120. As a result, the SCM-ID may be transported and stored in a secure manner. The SCM-ID may be stored (cached) on other system components, such as the device 110 and cloud 130, to further assist identification of the SCM 120 by users 10 or other system services.

Because the SCM-ID is not expected to change, system components may report to a user 10 a change as a security anomaly, such as an indication of tampering, a spoof attempt, or a protocol violation. The change may alternatively be reported as an indication of a product failure, such as memory corruption, to an owner 10 of the SCM 120.

The SCM-ID may be a randomly generated identifier used solely for identification of the SCM 120, or the SCM-ID may also serve other purposes. An example of such another purpose is to act as a communications protocol identifier, such as a media access control (MAC) address, and/or a globally/universally unique identifier (GUID/UUID) shared with other services, including for example Bluetooth Low Energy/BLE. Another example purpose of the SCM-ID is as a human/machine-readable identifier, such as a serial number, a manufacturer part number (MPN), a Universal Product Code (UPC), an International/European Article Number (EAN), a Vehicle Identification Number (VIN), or any other identifier that may be unique to a particular SCM 120.

In an alternative embodiment, the SCM-ID may not be unique to a particular SCM 120. Examples of non-unique types of SCM-IDs include an International Standard Book Number (ISBN), a USB device identifier, and a product model, class, or type.

In one embodiment, the SCM-ID may not be stored securely. For example, secure storage may not be used because the SCM-ID is used only for logging or reporting purposes or as an additional piece of identifying information not relied upon by any system component. In still another alternative embodiment, where the SCM-ID may not be present.

In one embodiment, multiple identifiers similar to the SCM-ID may exist, each of which may or may not be unique to a particular SCM 120. For instance, the SCM 120 may include a random and internal SCM-ID, an externally visible serial number, an Ethernet MAC, a BLE UUID, one or more cellular identifiers including an Electronic Serial Number (ESN), an International Mobile Station Equipment Identity (IMEI), and/or a Mobile Equipment Identifier (MEID).

In an alternative embodiment, the SCM-Key key may be shared across all SCMs 120 in use.

In one embodiment, the SCM-Key public key may not be securely transmitted to and/or stored by system components that utilize it.

In one embodiment, the SCM-Key private key is not stored in secure memory 220 or a Secure Element or equivalent hardware module, but is still securely stored. For instance, the SCM-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the SCM-Key private key is not securely stored.

In one embodiment, the SCM-Key public/private key may be changed and/or generated as a result of key cycling or a factory-reset.

One or more certificates may be used as the SCM-Key key in one embodiment. In an alternative embodiment, the SCM-Key key is a symmetric key. In another alternative embodiment, the SCM-Key key is an OAuth2 token. In yet another alternative embodiment, an alternate authentication key or token type and/or challenge/response mechanism may be used in place of the SCM-Key key.

In an alternative embodiment, one or more SCM-Key keys may be created and stored on the SCM 120 for use at a later time. This approach can be useful, if the SCM 120 does not have the capability to generate such keys during normal operation. In one embodiment, multiple keys may be utilized, such that the SCM 120 may support key cycling and/or a different key after factory-reset. In this embodiment, the SCM 120 may manage which SCM-Key keys are usable but not in-use, in-use, or disposed or retired. Alternatively, the SCM-Key keys may be generated by the cloud 130 (or another system component) and stored on the SCM 120 during normal operation, such as either on demand (one-at-a-time) or in batch (for use at a later time as described herein).

The SCM-Key key is absent in one embodiment, in which case, other means may be used for system components to communicate with and/or verify the authenticity of SCMs 120.

B. Equipment-Key

The Equipment-Key key may or may not be utilized; it is intended for equipment manufacturers (OEMs) that wish to generate their own key that is held by the SCM 120 to communicate with one or more equipment 140 systems; the SCM-Equipment-Key key is the reverse usage model (and possibly preferred).

The Equipment-Key key may uniquely identify a particular piece of equipment 140 to its attached SCM 120. The Equipment-Key key may be an asymmetric private/public key pair generated only during the equipment manufacturing process, either directly by the equipment 140 or by a manufacturing tool. The Equipment-Key private key may be securely stored on the equipment in the secure memory 220 or in a Secure Element or equivalent hardware module, such as a Secure Enclave or Hardware Security Module (HSM).

The Equipment-Key private key is not transmitted to other system components in the illustrated embodiment; the Equipment-Key public key may be securely transmitted to and stored by system components that utilize the Equipment-Key public key, such as the SCM 120. The Equipment-Key public key may be transmitted to SCMs 120 (or other equipment) during manufacture of the equipment 140 or SCM 120 by a manufacturing tool. The Equipment-Key public key may be transmitted to SCMs 120 (or other equipment) by the equipment 140 or other system components via communications link or physical media. The Equipment-Key private key may be used by a particular piece of equipment 140 to encrypt and/or sign messages the equipment 140 sends to other system components and may be used to decrypt and/or verify messages sent to the equipment 140 from other system components.

The Equipment-Key public key may be used by system components to decrypt and/or verify that a message originated from a particular piece of equipment 140 and may be used to encrypt and/or sign messages intended for a particular piece of equipment 140.

In an alternative embodiment, the Equipment-Key public key is not securely transmitted to and/or stored by system components that utilize the Equipment-Key public key.

The Equipment-Key public key in one embodiment may only be transmitted to (or may only be accepted by) a system component, such as the SCM 120, when that system component does not already have a stored Equipment-Key public key. This may occur following manufacturing or a factory-reset. Additionally, or alternatively, the Equipment-Key public key may only be transmitted to another system component by a manufacturing tool. In an alternative embodiment, the Equipment-Key public key may not be transmitted to another system component by a manufacturing tool.

In an alternative embodiment, the Equipment-Key key may be shared across all equipment 140 in use.

In one embodiment, the Equipment-Key public key may not be transmitted to and/or used by a system component without approval by one or more other system components. For instance, the SCM 120 may not communicate with a particular piece of equipment 140 without approval from a device 110, user 10, or cloud 130. Additionally or alternatively, the equipment 140 may not approve itself.

The Equipment-Key private key in one embodiment is not stored in secure memory 220 or a Secure Element or equivalent hardware module. However, the Equipment-Key private key may still be securely stored. For instance, the Equipment-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place and detection systems for detecting operating system root access or compromise may be implemented. In an alternative embodiment, the Equipment-Key private key is not securely stored.

In one embodiment, the Equipment-Key public/private key may be changed and/or generated as a result of key cycling or factory-reset.

One or more certificates may be used for the Equipment-Key key in one embodiment. In an alternative embodiment, the Equipment-Key key is a symmetric key. In another alternative embodiment, the Equipment-Key key is an OAuth2 token. In yet another alternative embodiment, an alternate authentication key or token type and/or challenge/response mechanism is used in place of the Equipment-Key key.

System components, including SCMs 120, may communicate with multiple pieces of equipment 140 in one embodiment, and as a result, the system components may possess multiple different Equipment-Key public keys.

The Equipment-Key key may be absent in one embodiment, in which case, other means may be used for SCMs to communicate with and/or verify the authenticity of equipment 140.

C. SCM-Equipment-Key

The SCM-Equipment-Key key may or may not be utilized; it is intended for equipment manufacturers that wish to use an externally generated key provided by the SCM 120 to communicate with one or more equipment 140 systems; the Equipment-Key key is the reverse usage model.

The SCM-Equipment-Key key may uniquely identify an SCM 120 to its attached equipment 140. The SCM-Equipment-Key key may be an asymmetric private/public key pair that may be generated and stored only during the manufacturing process, either directly by the SCM 120 or by a manufacturing tool.

The SCM-Equipment-Key key may be separated from the SCM-Key key to allow equipment manufacturers to use any security model that is considered desirable, including models where the equipment 140 may not be well secured, and thus, it is considered preferable not to expose even the SCM-Key public key.

The SCM-Equipment-Key private key may be securely stored on the SCM 120 in secure memory 220 or in a Secure Element or equivalent hardware module, such as a Secure Enclave or Hardware Security Module (HSM). The SCM-Equipment-Key private key is not transmitted to other system components in the illustrated embodiment of FIG. 11. Further, in the illustrated embodiment, the SCM-Equipment-Key public key may be transmitted to and stored in only the attached equipment 140 via a manufacturing tool, communications link, or physical media.

The SCM-Equipment-Key private key may be used by the SCM 120 to encrypt and/or sign messages the SCM 120 sends to the equipment 140 and to decrypt and verify messages sent to the SCM 120 from the equipment 140. The SCM-Equipment-Key public key may be used by the equipment 140 to decrypt and/or verify that a message originating from a particular SCM 120 and to encrypt and/or sign messages intended for a particular SCM 120.

In one embodiment, the SCM-Equipment-Key public key may be transmitted to and stored securely by system components other than the attached equipment 140, including, for example, the device 110, cloud 130, or SCM 120, or a combination thereof.

The SCM-Equipment-Key public key may not be securely transmitted to or stored by system components in one embodiment.

There may be one or more pieces of the equipment 140 attached to a particular SCM 120. This way, the system 100 may define a multi-equipment-per-SCM system. In a multi-equipment-per-SCM system, devices 110 may obtain status, issue commands to, and/or receive responses from individual equipment 140, or any combination thereof.

An SCM-Equipment-Key key that is shared across all or a subset of SCMs in use may be implemented in accordance with one embodiment.

The SCM-Equipment-Key public key, in one embodiment, may not be accepted by a system component (e.g., the equipment 140) when the system component already has a stored Equipment-Key public key.

The SCM-Equipment-Key public key may not be transmitted to and/or used by the equipment 140 without approval by one or more other system components in one embodiment. For instance, the equipment 140 may not communicate with a particular SCM 120 without approval from a device 110, user 10, or the cloud 130. Additionally or alternatively, the SCM 120 may not approve itself.

In one embodiment, where instead of using the SCM-Equipment-Key, the SCM-Key key may be utilized. In such a case, the various identified SCM-Equipment-Key operations may also be applied to the SCM-Key.

The SCM-Equipment-Key private key, in one embodiment, is not stored in the secure memory 220 or a Secure Element or equivalent hardware module. The SCM-Equipment-Key private key may still be securely stored. For instance, the SCM-Equipment-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the SCM-Equipment-Key private key is not securely stored.

In one embodiment, the SCM-Equipment-Key public key is not securely stored by system components that utilize the SCM-Equipment-Key public key.

The SCM-Equipment-Key public/private key may be changed and/or generated as a result of key cycling or factory-reset in accordance with one embodiment of the present disclosure.

Multiple system components (e.g., equipment 140) may communicate with a single SCM 120, and where multiple SCM-Equipment-Key public/private key pairs may be utilized.

One or more certificates may be used for the SCM-Equipment-Key key. Alternatively, the SCM-Equipment-Key key may be a symmetric key. In another alternative embodiment, the SCM-Equipment-Key key may be an OAuth2 token. In yet another alternative embodiment, an alternate authentication key or token type and/or challenge/response mechanism may be used in place of the SCM-Equipment-Key key.

In an alternate embodiment, one or more SCM-Equipment-Key keys may be created and stored on the SCM 120 for use at a later time. This approach can be useful, if the SCM 120 does not have the capability to generate such keys during normal operation. In one embodiment, multiple keys may be utilized, such that the SCM 120 may support key cycling and/or a different key after factory-reset. In this embodiment, the SCM 120 may manage which SCM-Equipment-Key keys are usable but not in-use, in-use, or disposed or retired. Alternatively, the SCM-Equipment-Key keys may be generated by the cloud 130 (or another system component) and stored on the SCM 120 during normal operation, such as either on demand (one-at-a-time), or in batch (for use at a later time as described herein).

In one embodiment, the SCM-Equipment-Key key is absent, in which case, other means may be used for equipment to communicate with and/or verify the authenticity of SCMs 120.

D. Device-SCM-Key, Device-ID, and Device-SCM-ID

The Device-SCM-Key key may uniquely identify a particular pairing between a device 110 and an SCM 120 (a device/SCM pair). The Device-SCM-Key key in the illustrated embodiment is an asymmetric private/public key pair generated and stored by a device 110. The Device-SCM-Key key may be generated when the cloud 130 requests to issue an authorization to the device 110 for a new SCM 120, such as an SCM 120 for which the device 110 has not been issued an authorization. The Device-SCM-Key key may also be generated when the device 110 is requesting to become the owner of a factory-reset SCM 120, such as during manufacturing, or when transferring ownership.

A substantially unique Device-SCM-Key key may be used for each device/SCM pair, because this approach may limit exposure for each breached Device-SCM-Key key to a single SCM 120. This is in contrast to exposure to all SCMs 120 associated with a particular device 110, as would be the case if a single key were used for all SCMs 120 associated with a particular device 110 (e.g., with a Device-Key).

The Device-SCM-Key private key in one embodiment may be securely stored on the device 110 in the secure memory 220 or a Secure Element or equivalent hardware module, such as a Secure Enclave or Hardware Security Module (HSM). The Device-SCM-Key private key may not be transmitted to other system components; the Device-SCM-Key public key, on the other hand, may be securely transmitted to and stored by system components that utilize the Device-SCM-Key public key, such as the cloud 130.

The Device-SCM-Key private key may be used by the device 110 to encrypt and/or sign messages for the associated SCM 120, and may be used to decrypt and/or verify messages sent to the device 110 from the associated SCM 120. The message may or may not be sent directly to the device 110, such as during the process to issue an authorization, or when an owner device 110 signs the ACP 400 for the associated SCM 120 and sends the signed ACP 400 to the cloud 130. The Device-SCM-Key public key may be used by the SCM 120 to decrypt and/or verify that a message originated from the associated device 110 and may be used to encrypt and/or sign messages intended for the associated device 110 from the SCM 120.

The Device-ID may serve a different, but related, purpose as compared to the Device-SCM-Key key. The Device-ID may be substantially unique to a particular device 110 (and not to a particular device/SCM pair) and may be generated by the cloud 130. The Device-ID may not participate directly in the security model of the system 100. The Device-ID may be relatively small in size, as compared to the Device-SCM-Key key, in terms of storage and/or representation (e.g., 32- or 64-bits versus 256-bits). The Device-ID may be transported across the system 100 to, and used by, other system components (such as the cloud 130, SCMs 120, and users 10) to assist in identifying devices 110 and enabling device-specific services. Examples of device-specific services include SMS and push notifications. As a result, efforts may be made to ensure the Device-ID is transported and stored securely.

Although the Device-ID is not expected to change, some system components may be able to report a change as a security anomaly or a product failure to a device owner 10. A security anomaly may be the result of tampering, a spoof attempt, or a protocol violation. A product failure can result from memory corruption as a given device 110 may cycle through a number of unique Device-IDs throughout its lifetime, as applications are removed and reinstalled, memory is erased, or are upgraded, even though it is the same physical device 110.

The Device-ID may be a randomly generated identifier used purely for device identification. Alternatively, the Device-ID may serve other purposes. An example of such another purpose is to act as a communications protocol identifier, such as a media access control (MAC) address, a globally/universally unique identifier (GUID/UUID) shared with other services, including for example Bluetooth Low Energy/BLE. Another example purpose of the Device-ID is as a human/machine-readable identifier, such as a serial number, a manufacturer part number (MPN), a Universal Product Code (UPC), an International/European Article Number (EAN), a Vehicle Identification Number (VIN), a user-defined string, or any other identifier that may be unique to a particular device 110.

In an alternative embodiment, the Device-ID may not be unique to a particular device 110. Examples of non-unique types of Device-IDs include an International Standard Book Number (ISBN), a USB device identifier, and a product model, class, or type.

The Device-ID may not be stored securely in one embodiment. For example, secure storage may not be utilized because the Device-ID is used only for logging or reporting purposes or as an additional piece of identifying information not relied upon by any system component.

It should be understood that in one or more embodiments, the Device-ID may not be present or utilized.

The Device-ID in an alternative embodiment may be generated by the device 110.

Multiple identifiers similar to the Device-ID may exist in one embodiment, where each identifier may or may not be unique to a particular device 110. For instance, a device 110 may include a random and internal Device-ID, an externally visible serial number, an Ethernet MAC, a BLE UUID, cellular identifiers including an Electronic Serial Number (ESN), an International Mobile Station Equipment Identity (IMEI), and/or a Mobile Equipment Identifier (MEID), a device name, or a user identifier, or any combination thereof.

The Device-SCM-ID may be similar to the Device-ID, but in the illustrated embodiment, the Device-SCM-ID is intended for use with constrained devices or constrained bandwidth interfaces, or both. The Device-SCM-ID, in one embodiment, may be substantially unique to a particular device/SCM pair, may be generated by the cloud 130, and does not participate directly in the security model of the system 100. The Device-SCM-ID may be relatively small in size, as compared to the Device-ID, in terms of storage and/or representation (e.g., 8- or 16-bits versus 32- or 64-bits).

The Device-SCM-ID may be transported across the system 100 to, and used by, other system components, such as the cloud 130, devices 110, and SCMs 120, to assist in establishing a secure communications channel between devices 110 and SCMs 120. In one embodiment, the Device-SCM-ID may be stored only in the cloud 130 so that it may be delivered in an ACP 400 and/or ACP Container 410. The Device-SCM-ID, in some cases, may not be transported or stored securely.

The Device-SCM-ID is not expected to change. As a result, some system components may be able to report a change as a security anomaly or a product failure to a device owner 10. A security anomaly may be the result of tampering, a spoof attempt, or a protocol violation. A product failure can result from memory corruption as a given device 110 may cycle through a number unique Device-SCM-IDs throughout its lifetime as applications are removed and reinstalled, memory is erased, or are upgraded, even though it is the same physical device 110.

In one embodiment, the Device-SCM-ID may be a small randomly generated identifier used purely for device identification, and may only to be unique within the context of a particular SCM 120. Alternatively, the Device-SCM-ID may not be present.

The Device-SCM-ID may be generated by the device 110 in one embodiment. Multiple identifiers similar to the Device-SCM-ID exist in some cases, where each of the identifiers may or may not be unique to a particular device 110. For instance, a device 110 may include other small random identifiers.

The Device-Key key, in one embodiment, may be specific only to a particular device 110 in use instead of a Device-SCM-Key key. In this embodiment, the Device-Key may be generated during the device 110 registration process. Alternatively, a Device-Key key may be shared across all devices 110 in use, instead of a Device-SCM-Key key.

In one embodiment, the Device-SCM-Key public key may not be securely transmitted to and/or stored by system components that utilize the Device-SCM-Key public key.

The Device-SCM-Key private key may not be stored in secure memory 220 or a Secure Element or equivalent hardware module. However, the Device-SCM-Key private key may still be stored securely. For instance, secure storage without use of the secure memory 220 may be achieved according to any one or more of the following: the Device-SCM-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the Device-SCM-Key private key is not securely stored.

The Device-SCM-Key public/private key, in one embodiment, may be changed or generated, or both, as a result of key cycling or factory-reset.

In one embodiment, one or more certificates may be used for the Device-SCM-Key key. Alternatively, the Device-SCM-Key key may be a symmetric key. In another alternative embodiment, the Device-SCM-Key key may be an OAuth2 token. In yet another alternative embodiment, an alternate authentication key or token type and/or challenge/response mechanism is used in place of the Device-SCM-Key key.

One or more Device-SCM-Key keys may be created and stored on the device 110 for use at a later time. This approach may be useful, if the device 110 does not have the capability to generate such keys during normal operation. In one embodiment, multiple keys may be utilized, such that the device 110 may support key cycling and/or a different key after factory-reset. In this embodiment, the device 110 may manage which Device-SCM-Key keys are usable but not in-use, in-use, or disposed or retired. Alternatively, the Device-SCM-Key keys may be generated by the cloud 130 (or another system component) and stored on the device 110 during normal operation, such as either on demand (one-at-a-time), or in batch (for use at a later time, as described herein).

In one embodiment, the Device-SCM-Key key may be absent, in which case, other means may be used for system components to communicate with and/or verify the authenticity of devices 110.

E. User-SCM-Key and User-SCM-ID

The User-SCM-Key key, in one embodiment, may uniquely identify a particular pairing between a user account and an SCM 120 (a user account/SCM pair). The User-SCM-Key key in the illustrated embodiment is an asymmetric private/public key pair generated and stored by the User Account Service in the cloud 130. The User-SCM-Key key may be generated when the cloud 130 requests to issue an authorization to a device 110 associated with the user's user account for a new SCM 120, such as an SCM 120 for which the user account has not been issued an authorization. The User-SCM-Key key may also be generated when a device 110 associated with the user's user account is requesting to become the owner of a factory-reset SCM 120, such as during manufacturing, or when transferring ownership. The User-SCM-Key is used at least by the User Account Service to sign ACPs 400 (and by SCMs 120 to decrypt and verify that ACP Containers 410 have been approved).

A substantially unique User-SCM-Key key may be used for each user account/SCM pair, because this approach may limit exposure for each breached User-SCM-Key key to a single SCM 120. This is in contrast to exposure to all SCMs 120 associated with a particular user account, as would be the case if a single key were used for all SCMs 120 associated with a particular user account (e.g., with a User-Key).

The User-SCM-Key private key in one embodiment may be securely stored by the User Account Service of the cloud 130. The User-SCM-Key private key may not be transmitted to other system components; the User-SCM-Key public key, on the other hand, may be securely transmitted to and stored by system components that utilize the User-SCM-Key public key, such as the SCM 120.

The User-SCM-Key private key may be used by the User Account Service to encrypt and/or sign messages for the associated SCM 120, and may be used to decrypt and/or verify messages sent to the User Account Service from the associated SCM 120. The User-SCM-Key public key may be used by the SCM 120 to decrypt and/or verify that a message originated from the User Account Service and may be used to encrypt and/or sign messages intended for the User Account Service from the SCM 120.

In one embodiment, the User-SCM-Key may be used in place of the Device-SCM-Key. In this embodiment, all devices 110 associated with a user account may use the same User-SCM-Key (instead of individual Device-SCM-Key keys).

In one embodiment, both User-SCM-Key keys and Device-SCM-Key keys are used. In this embodiment, for example, ACP Outer Layer 2 of ACPs 400 may be signed using User-SCM-Key keys, but devices 110 are individually authenticated using Device-SCM-Key keys.

The User-Key key, in one embodiment, may be specific only to a particular user account instead of a User-SCM-Key key. In this embodiment, the User-Key may be generated during the user account creation process. Alternatively, a User-Key key may be shared across all devices 110 associated with the user's user account, instead of a User-SCM-Key key.

In one embodiment, the User-SCM-Key public key may not be securely transmitted to and/or stored by system components that utilize the User-SCM-Key public key.

The User-SCM-Key private key may not be stored in secure memory 220 or a Secure Element, or equivalent hardware module. However, the User-SCM-Key private key may still be stored securely. For instance, secure storage without use of the secure memory 220 may be achieved according to any one or more of the following: the User-SCM-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the User-SCM-Key private key is not securely stored.

The User-SCM-Key public/private key, in one embodiment, may be changed or generated, or both, as a result of key cycling or factory-reset.

In one embodiment, one or more certificates may be used for the User-SCM-Key key. Alternatively, the User-SCM-Key key may be a symmetric key. In another alternative embodiment, the User-SCM-Key key may be an OAuth2 token. In yet another alternative embodiment, an alternate authentication key or token type and/or challenge/response mechanism is used in place of the User-SCM-Key key.

In one embodiment, one or more User-SCM-Key keys may be created and stored by the User Account Service in the cloud 130 for a particular SCM 120 (or for all SCMs 120, as a global key pool) for use at a later time. This approach may avoid having the User Account Service of the cloud 130 generate such keys during normal operation. Multiple keys may be utilized, such that the User Account Service of the cloud 130 may support key cycling and/or multiple SCMs 120. In this embodiment, the User Account Service of the cloud 130 may manage which User-SCM-Key keys are usable but not in-use, in-use, or disposed or retired.

In one embodiment, the User-SCM-Key key may be absent, in which case, other means may be used for system components to communicate with and/or verify the authenticity of the User Account Service.

In one embodiment, a User-SCM-ID may be used, similar to a Device-SCM-ID.

F. Cloud-SCM-Key and Cloud-SCM-Approval-Key

The Cloud-SCM-Key key may uniquely identify a particular pairing between an SCM 120 and the cloud 130 (or a cloud/SCM pair). The Cloud-SCM-Key in the illustrated embodiment may be an asymmetric private/public key pair generated and stored by the cloud 130. The Cloud-SCM-Key may be generated when the first owner device 110 is established for an SCM 120 after a factory-reset, such as during manufacturing, or when transferring ownership.

A substantially unique Cloud-SCM-Key key may be used for each cloud/SCM pair. This approach may substantially limit exposure for a breached Cloud-SCM-Key key to a single SCM 120, as opposed to all SCMs 120 associated with a particular cloud 130. This is in contrast to exposure to all SCMs 120 associated with a particular cloud 130, as would be the case if a single key were used for all SCMs 120 associated with a particular cloud 130 (e.g., with a Cloud-Key).

The Cloud-SCM-Key private key may be securely stored in the cloud 130 on secure memory 220 or in a Secure Element or equivalent hardware module, such as a Secure Enclave or Hardware Security Module (HSM). The Cloud-SCM-Key private key may not be transmitted to other system components; the Cloud-SCM-Key public key may be securely transmitted to and stored by system components that utilize the Cloud-SCM-Key public key, such as the cloud 130, device 110, or SCM 120. The Cloud-SCM-Key private key may be used by the cloud 130 to encrypt and/or sign messages for the associated SCM 120 and may be used to decrypt and/or verify messages sent to the cloud 130 from the associated SCM 120. The Cloud-SCM-Key public key may be used by the SCM 120 to decrypt and/or verify that a message originated from the cloud 130 and may be used to encrypt and/or sign messages intended for the cloud 130 from the SCM 120. A message may or may not be sent directly to the SCM 120. For instance, during the process to issue an authorization, a signed ACP 400 may be sent to an owner device 110 for approval. After approval, the cloud 130 may sign a completed ACP Container 410 (containing the previously signed ACP 400) that gets delivered to the SCM 120 via the device 110.

In one embodiment, multiple Cloud-SCM-Key keys, such as one or more Cloud-SCM-Key keys for different services within the cloud 130, may be utilized. For instance, there may be one Cloud-SCM-Key key for a Cloud Authorization Request service and another Cloud-SCM-Approval-Key key for a Cloud Authorization Approval service, as previously herein.

There may be a Cloud-ID (similar to a Device-ID) for each cloud 130 and/or cloud service, in one embodiment.

The Cloud-Key key, in one embodiment, may be specific only to a particular cloud 130 and/or cloud service instead of a Cloud-SCM-Key key. In this embodiment, the Cloud-Key may be generated during cloud 130 provisioning and/or initial setup.

In one embodiment, the Cloud-SCM-Key public key may not be securely transmitted to and/or stored by system components that utilize the Cloud-SCM-Key public key.

The Cloud-SCM-Key private key may not be stored in the secure memory 220 or a Secure Element or equivalent hardware module. However, the Cloud-SCM-Key private key may still be securely stored. For instance, secure storage without use of the secure memory 220 may be achieved according to any one or more of the following: the Cloud-SCM-Key private key may be encrypted at rest, software-based mitigations and/or hardware-based mitigations may be implemented to prevent access to such data, and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the Cloud-SCM-Key private key is not securely stored.

In one embodiment, the Cloud-SCM-Key public/private key may be changed or generated, or both, as a result of key cycling. The Cloud-SCM-Key public/private key may not be changed as a result of a factory-reset.

One or more certificates may be used for the Cloud-SCM-Key key in one embodiment. Alternatively, the Cloud-SCM-Key key may be a symmetric key. In another alternative embodiment, the Cloud-SCM-Key key is an OAuth2 token. In yet another alternative embodiment, an alternate authentication key or token type and/or challenge/response mechanism may be used in place of the Cloud-SCM-Key key.

In one embodiment, one or more Cloud-SCM-Key keys may be created and stored in the cloud 130 for a particular SCM 120 (or for all SCMs 120, as a global key pool) for use at a later time. This approach may avoid having the cloud 130 generate such keys during normal operation. Multiple keys may be utilized, such that the cloud 130 may support key cycling and/or multiple SCMs 120. In this embodiment, the cloud 130 may manage which Cloud-SCM-Key keys are usable but not in-use, in-use, or disposed or retired.

The Cloud-SCM-Key key may be absent in one embodiment, in which case, other means may be used for system components to communicate with and/or verify the authenticity of the cloud 130.

G. Root-Cert

The Root-Cert may be the root certificate for the system 100 in accordance with one embodiment. The Root-Cert may be a self-signed certificate that establishes the root of trust for the system 100. The private Root-Cert may be stored securely on a server that is offline or generally inaccessible to the cloud 130 or other system components. The public Root-Cert may be distributed to the cloud 130 and to each system component that may communicate with the cloud 130, such as a device 110 or the OEM cloud 135.

In one embodiment, the Root-Cert may be signed by a certificate authority.

There may be multiple Root-Certs in one embodiment. For instance, there may be a Root-Cert for different instances of the system 100, clouds 130, cloud services, or devices 110, and OEM clouds 135, or any combination thereof. Each of the multiple Root-Certs may be self-signed or signed by a certificate authority. In one example, a system 100 may be configured with one root of trust for online verification and another for offline verification.

It is not strictly necessary to store the Root-Cert offline in some cases, and so the Root-Cert may be stored on a server that is online, in one embodiment.

The content and/or creation process for the Root-Cert may vary from application to application. In one embodiment, the Root-Cert may be an asymmetric public/private key pair, or the Root-Cert may be a symmetric key.

H. Cloud-Node-Cert

The Cloud-Node-Cert in the illustrated embodiment is a certificate that has been signed by a private Root-Cert of the corresponding system 100. Accordingly, each Cloud-Node-Cert may form part of a chain of trust to verify the identity of a particular cloud server 130. The private Cloud-Node- Cert may be stored securely on each cloud server 130. The public Cloud-Node-Cert may be distributed to the cloud 130 and to each system component that may communicate with the cloud 130, including for instance the device 110 and the OEM cloud 135. In the event that any of the other encryption keys are embodied as certificates instead of encryption keys, those certificates may be signed by either a Root-Cert or a Cloud-Node-Cert, or an alternative root certificate of trust.

In one embodiment, there may be multiple layers of Cloud-Node-Certs, such as a layer for different instances and/or clusters of the system 100, clouds 130, cloud services, devices 110, or OEM clouds 135, or any combination thereof. Each child (or lower level) Cloud-Node-Cert may be signed by its the private Cloud-Node-Cert of the parent or upper level, thereby forming a longer chain of trust.

The Cloud-Node-Cert may be signed in a variety of ways. For instance, the Cloud-Node-Cert may be self-signed in one embodiment, or the Cloud-Node-Cert may be signed by a non-parent certificate or asymmetric private/public key.

In one embodiment, the Cloud-Node-Cert is an asymmetric public/private key pair. Alternatively, the Cloud-Node-Cert may be a symmetric key.

I. Device-Rights-Key

The Device-Rights-Key key may uniquely identify a particular device 110 to a rights management system of the cloud 130. The Device-Rights-Key key may be an asymmetric private/public key pair generated and stored by the device 110 at some point prior to when the device 110 is first registered with the cloud 130. The Device-Rights-Key private key may be securely stored in the secure memory 220 in the device 110 or in a Secure Element or equivalent hardware module, such as a Secure Enclave or Hardware Security Module (HSM). The Device-Rights-Key private key may not be transmitted to other system components; on the other hand, the Device-Rights-Key public key may be securely transmitted to and stored by system components that utilize the Device-Rights-Key public key, such as the cloud 130.

The Device-Rights-Key private key may be used by the device 110 to encrypt and/or sign messages the device 110 sends to the rights management system of the cloud 130 and may be used to decrypt and/or verify messages sent to the device from the rights management system of the cloud 130. The Device-Rights-Key public key may be used by the rights management system of the cloud 130 to decrypt and/or verify that a message originated from a particular device 110 and may be used to encrypt and/or sign messages intended for a particular device 110.

The Device-Rights-Key key, in one embodiment, may not be substantially unique per device 110. Examples of such a configuration include the Device-Rights-Key key being substantially unique per account, being used for certain devices 110 within an account, or being globally the same for all devices 110 or specific only to a particular rights management system of the cloud 130. An additional example of the Device-Rights-Key key not being substantially unique per device is the Device-Rights-Key key being used for all devices 110 owned by a particular organization.

In one embodiment, the Device-Rights-Key key may be generated by the cloud 130 and delivered to the device 110 as part of a device 110 registration process.

A Device-Rights-ID (similar to a Device-ID), in one embodiment, may be associated with each device 110 for use with the rights management system of the cloud 130.

In one embodiment, the Device-Rights-Key public key is not securely transmitted to and/or stored by system components that utilize the Device-Rights-Key public key.

The Device-Rights-Key private key may not be stored in secure memory 220 or a Secure Element or equivalent hardware module. However, the Device-Rights-Key private key may still be stored securely. For instance, secure storage without use of the secure memory 220 may be achieved according to any one or more of the following: the Device-Rights-Key private key may be encrypted at rest; software-based mitigations and/or hardware-based mitigations may be implemented to prevent access to such data; and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the Device-Rights-Key private key is not securely stored.

In one embodiment, the Device-Rights-Key public/private key may be changed or generated, or both, as a result of key cycling. The Device-Rights-Key public/private key in one embodiment may not be changed as a result of a factory-reset.

One or more certificates may be used for the Device-Rights-Key key in one embodiment. Alternatively, the Device-Rights-Key key may be a symmetric key. In another alternative embodiment, the Device-Rights-Key key may be an OAuth2 token. In yet another alternative embodiment, an alternate authentication key or token type and/or challenge/response mechanism may be used in place of the Device-Rights-Key key.

One or more Device-Rights-Key keys may be created and stored on the device 110 for use at a later time. This approach may be useful, if the device 110 does not have the capability to generate such keys during normal operation. In one embodiment, multiple keys may be utilized, such that the device 110 may support key cycling and/or a different key after factory-reset. In this embodiment, the device 110 may manage which Device-Rights-Key keys are usable but not in-use, in-use, or disposed or retired. Alternatively, the Device-Rights-Key keys may be generated by the cloud 130 (or another system component) and stored on the device 110 during normal operation, such as either on demand (one-at-a-time), or in batch (for use at a later time as described herein).

In one embodiment, the Device-Rights-Key key may be absent, in which case, authorization types or some other means may be used to establish device rights, or some other means may be used for devices 110 to communicate with and/or verify the authenticity of the rights management system of the cloud 130.

J. ACP-Version-Key

The ACP-Version-Key key may be used within the context of the ACP Container Version Package 412 (a secure package containing ACP version information) and may uniquely identify a particular pairing between the cloud 130 and the SCM 120 (or cloud/SCM pair). The ACP-Version-Key key in the illustrated embodiment is an asymmetric private/public key pair generated and stored by the cloud 130, when the first owner device 110 is established for an SCM 120 after a factory-reset, such as during manufacturing or when transferring ownership. In the illustrated embodiment, the ACP-Version-Key public key may not be provided to devices 110.

A potentially unique ACP-Version-Key key may be used for each cloud/SCM pair. This approach may substantially limit exposure for each breached ACP-Version-Key key to a single SCM 120, as opposed to all SCMs 120 associated with a particular cloud 130. This is in contrast to exposure to all SCMs 120 associated with a particular cloud 130, as would be the case, if a single key were used for all SCMs associated with a particular cloud 130 (e.g., with an ACP-Key).

The ACP-Version-Key private key may be securely stored in the cloud 130 on the secure memory 220 in a Secure Element or equivalent hardware module, such as a Secure Enclave or Hardware Security Module (HSM). The ACP-Version-Key private key may not be transmitted to other system components; on the other hand, the ACP-Version-Key public key may be securely transmitted to and stored by system components that utilize the ACP-Version-Key public key, such as the SCM 120. The ACP-Version-Key private key may be used by the cloud 130 to encrypt and/or sign messages for the associated SCM 120 and may be used to decrypt and/or verify messages sent to the cloud 130 from the associated SCM 120. The ACP-Version-Key public key may be used by the SCM 120 to decrypt and/or verify that a message originated from the cloud and may be used to encrypt and/or sign messages intended for the cloud 130 from the SCM 120.

In one embodiment, the Cloud-SCM-Key key may be used for the ACP-Version-Key key.

In one embodiment, the ACP-Version-Key private key may be generated and managed in a similar way as the SCM-Key. For instance, the ACP-Version-Key private key may reside on the SCM 120, and the public key may reside in the cloud 130.

In an alternative embodiment, an ACP-Key key that is specific only to a particular cloud 130 may be implemented instead of the ACP-Version-Key key.

In one embodiment, the ACP-Version-Key public key may not be securely transmitted to and/or stored by system components that utilize the ACP-Version-Key public key.

In one embodiment, the ACP-Version-Key private key may not be stored in the secure memory 220 or a Secure Element or equivalent hardware module. However, the ACP-Version-Key private key may still be securely stored. For instance, secure storage without use of the secure memory 220 may be achieved according to any one or more of the following: the ACP-Version-Key private key may be encrypted at rest; software-based mitigations and/or hardware-based mitigations may be implemented to prevent access to such data; and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the ACP-Version-Key private key is not securely stored.

In one embodiment, the ACP-Version-Key public/private key may be changed or generated, or both, as a result of key cycling.

The ACP-Version-Key public/private key may not be changed as a result of a factory-reset in one embodiment.

One or more certificates may be used for the ACP-Version-Key key. Alternatively, the ACP-Version-Key key may be a symmetric key. In another alternative embodiment, the ACP-Version-Key key may be an OAuth2 token. In yet another alternative embodiment, an alternate authentication key or token type and/or challenge/response mechanism may be used in place of the ACP-Version-Key key.

One or more ACP-Version-Key keys, in one embodiment, may be created and stored in the cloud 130 for a particular SCM 120 (or for all SCMs 120 as a global key pool) for use at a later time. This approach may avoid having the cloud 130 generate such keys during normal operation. Multiple keys may be utilized such that the cloud 130 may support key cycling and/or multiple SCMs 120. In this embodiment, the cloud 130 may manage which ACP-Version-Key keys are usable but not in-use, in-use, or disposed or retired.

The ACP-Version-Key key may be absent in one embodiment, in which case other means may be used for system components to communicate with and/or verify the authenticity of the ACP Container Version Package 412. In one embodiment, a system component may not verify authenticity at all of the ACP Container Version Package 412.

In one embodiment, there may be multiple ACP-Version-Key keys. For example, a system where each SCM 120 may store and use more than one ACP 400, and as such, it may be considered necessary for a given SCM to receive multiple ACP Containers 410 and/or multiple ACP Container Version Packages 412 and/or multiple ACP Container Collections 414 using multiple ACP-Version-Key keys.

K. Device-SCM-Session-Key

The Device-SCM-Session-Key key may be a symmetric key used to secure communications between a pairing defined between a particular device 110 and an SCM 120 (or a device/SCM pair) after at least one of the pair has been authenticated, such being authenticated in a manner similar to a TLS master secret. To enhance system performance and responsiveness with constrained system components, the Device-SCM-Session-Key key may survive connections (such as in a manner similar to TLS session resumption) and may be cycled periodically as described herein.

The Device-SCM-ID of the device in the device/SCM pair may be used to identify and/or select the appropriate Device-SCM-Session-Key key when establishing and/or resuming a connection.

In one embodiment, a Device-SCM-Session-ID (similar to a Device-SCM-ID) may be provided for each device/SCM pair, used to identify and/or select the appropriate Device-SCM-Session-Key key when establishing and/or resuming a connection. This may be conducted in a manner similar to a TLS Session ID or Session Ticket.

The Device-SCM-Session-Key key is an asymmetric key pair in one embodiment. Alternatively, the Device-SCM-Session-Key key may be an OAuth2 token. In another alternative embodiment, an alternate authentication key or token type and/or challenge/response mechanism may be used in place of the Device-SCM-Session-Key key.

The Device-SCM-Session-Key key may be absent in one embodiment, in which case other means may be used for devices 110 and SCMs 120 to securely communicate and/or devices 110 and SCMs 120 may not communicate securely.

L. Session Tokens

System components (such as devices 110) that communicate with the cloud 130 and/or the OEM cloud 135 may obtain an OEM Cloud Session Token and/or a Cloud Session Token during the OEM cloud login process to use as an additional security measure. The OEM Cloud Session Token may accompany all OEM cloud 135 messages as well as any internal mapping to other data items managed by the OEM cloud 135. The Cloud Session Token may accompany all cloud 130 messages, which may map to a particular Cloud-User-ID and OEM-ID, and which may allow the cloud 130 to limit accesses to data associated with a particular Cloud-User-ID and OEM-ID. The OEM cloud 135 may communicate with the cloud 130 using a Cloud-to-OEM-Cloud Session Token. The Cloud-to-OEM-Cloud Session Token may be similar to the Cloud Session Token, except that the Cloud-to-OEM-Cloud Session Token may only limit access to data associated with a particular OEM-ID.

The cloud 130 and OEM cloud 135 may cycle session tokens periodically such that the tokens expire. Cycling may occur under a variety of circumstances or in response to an event, such as at each login, or when suspicious activity occurs or validation of a message fails.

The OEM Cloud Session Token and Cloud Session Token may be the same in one embodiment. Alternatively, the OEM Cloud Session Token may not be used. In an alternative embodiment, the Cloud Session Token may not be used. Additionally, or alternatively, the Cloud-to-OEM-Cloud Session Token may not be used.

M. Other Keys

Other keys may exist in the system 100 that are dedicated for a purpose and/or transient. An example dedicated purpose is a key that is utilized within a particular message set or internally to a particular system component. Transient examples include session keys utilized between other system components that operate within the context of a standard security protocol, such as TLS or DTLS.

N. User

In one embodiment, the user 10 may play a role in the system that is similar to an encryption key. The user 10 has the following potentially unique characteristics/features that may be incorporated as an encryption key, used for authentication (or two-factor or multi-factor authentication) mechanism, or in connection with an approval gate by a system component in the system 100:

1) Eye and/or Face (e.g., retina/facial key/signature, visual confirmation of receipt)
2) Fingerprint (e.g., fingerprint key/signature, confirmation such as Apple Touch ID)
3) Email Access (e.g., demonstrated access to an email account)
4) SMS Access (e.g., demonstrated access to an SMS message)
5) Push Notification Access (e.g., demonstrated access to a push notification)
6) Screen Access or Code Entry (e.g., demonstrated access to the device screen)
7) Proximity (e.g., proximity to a system component, such as proximity based on microlocation, or proximity based on IR detection)
8) Access (e.g., demonstrated physical access to a system component, such as a button push)
9) Proximity or Access to Other Devices (e.g., other user devices, such as a watch or band)

XIII. Key Cycling

Key cycling, also known as key rotation or rekeying, in accordance with one embodiment is a process by which a key is changed for an existing object without directly informing users of the change or requiring user interaction. A key may be changed for an object, including, for example, an authorization, a device 110, an SCM 120, a cloud 130, an equipment component 130, and an OEM cloud 135.

Keys may be cycled periodically, such as every few hours, daily, weekly, monthly, every 6 months, or yearly or when a breach or anomaly is detected. The change may occur automatically or manually, such as through an administrative action or an operations action.

Properly supporting key cycling may be an intensive task for the system 100. One issue lies in system components that may be offline, where a key change request may not be delivered to the target system component prior to yet another key change request. For instance, back-to-back key cycle operations may result in non-delivery or delayed delivery of a key change. Any configuration change that relies on the key (e.g., the ACP 400) may also result in non-delivery or delayed delivery due to a system component being offline. For many system components, this is unlikely to occur, as key changes may be delivered quickly; however, it is possible for an SCM 120 to remain unused for several days, months, or years, and thus miss several key cycle events, after which the prior owner may be unable to transfer the SCM 120 to a new owner using the system 100. More specifically, in this case, the SCM 120 may be unable to decrypt an updated ACP 400 or an updated ACP Container 410, and/or authenticate a cycled device 110. In this case, it may be acceptable to factory-reset the SCM 120. In a different scenario, where over a several hour period, multiple key cycle events occurred that rendered an SCM 120 unusable (by owners or guests), would likely be unacceptable from a user experience or usability perspective.

Key cycle events that impact multiple keys may also be possible. Multiple keys may be affected under a variety of circumstances, such as system-wide key cycling, in a device 110 that manages multiple SCMs 120, or an SCM 120 with multiple authorized accounts and/or devices 110. An example sequence is shown below.

Figure 12:
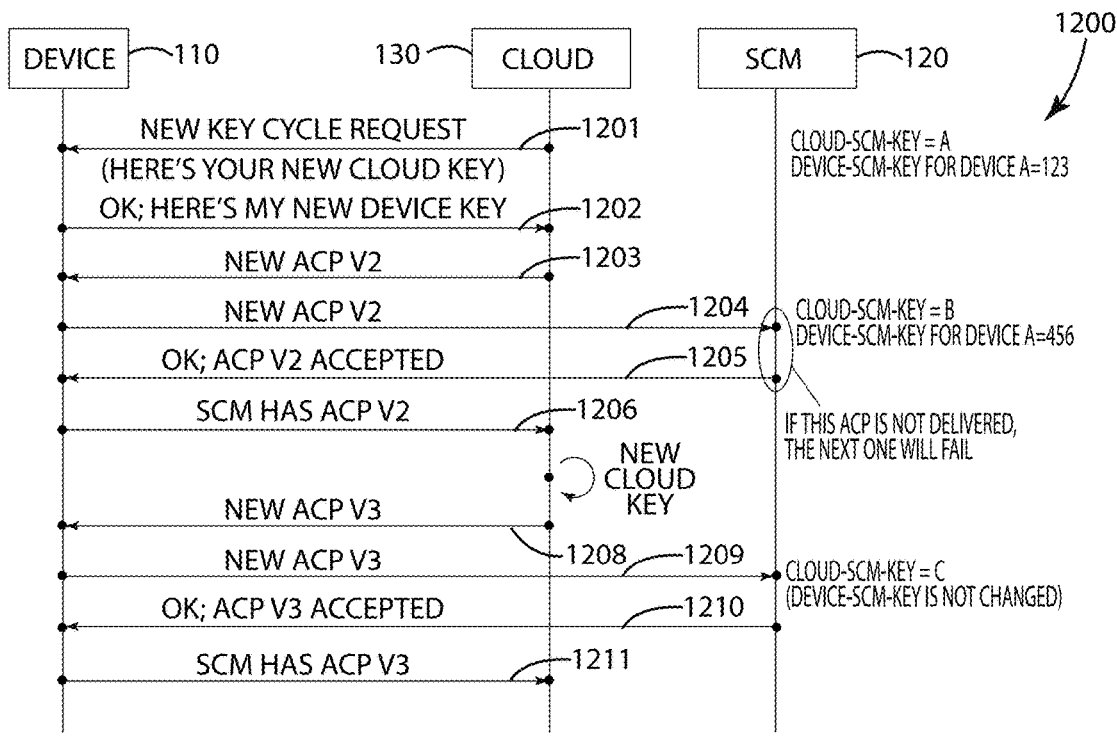
FIG. 12 is a method of cycling a key in accordance with one embodiment.

A method of cycling a key in accordance with one embodiment is depicted in FIG. 12 and generally designated 1200. The cloud 130 requests a device 110 to cycle its keys for a given SCM 120, providing the device 110 with a new Cloud-SCM-Key key and other cloud-generated keys (e.g., User-SCM-Key) and/or keys necessary to communicate with the cloud (tokens, etc.). Step 1201. The device 110 generates a new Device-SCM-Key key and sends it to the cloud 130 in response to the key cycle request. Step 1202.

At some point, after the cloud 130 receives updated Device-SCM-Keys (and any other input keys required) from all devices 110 associated with the SCM 120, the cloud 130 sends the device 110 an updated ACP 400 ("version 2") to deliver to the SCM 120 (e.g., via an ACP Container 410). Step 1203. The device 110 delivers the updated ACP 400 to the SCM 120, which contains all necessary updated keys. Step 1204. The SCM 120 informs the device 110 that the ACP 400 update was successful. Step 1205. The device 110 informs the cloud 130 that the SCM 120 has applied "version 2" of the ACP 400. This allows the cloud 130 to maintain appropriate key sets for appropriate versions of ACPs 400 for each SCM 120, so that in the event that an SCM 120 or device 110 (or other system component) miss a key update, prior updates may be delivered in sequence, or the most recent update delivered using prior keys, for recovery. Step 1206.

Steps 1207-1211 depict a second key cycle event. At some point, the cloud 130 cycles one of the cloud-generated keys for SCM 120 and delivers an updated ACP 400 ("version 3") to device 110 to deliver to the SCM 120 (e.g., via an ACP Container 410). Step 1207 and 1208. Steps 1209-1211 are similar to Steps 1204-1206, resulting in the cloud 130 being informed that the SCM 120 has applied "version 3" of the ACP 400).

To cycle keys on an SCM 120, both "new keys" and "old keys" (previously known keys) may be included in the ACP 400 for a target SCM 120. Receipt acknowledgements can be sent back to the cloud 130 at some point via online system components, such as a device 110, each time an ACP 400 is accepted by an SCM 120. By keeping track of which ACP version a particular SCM 120 last accepted, the cloud 130 may prevent the creation of subsequent ACP Containers 410 for that SCM 120 that contain a key change until the in-flight ACP 400 has been accepted by the SCM 120, where the "old key" field may be different from the in-flight (prior/unaccepted) ACP 400.

In an alternative embodiment, regardless of which ACPs 400 have been accepted by an SCM 120, the cloud 130 may send subsequent ACP Container 410 as normal for that SCM 120. In this embodiment, a Minimum-Prior-Version may be added to the ACP Container Version Package 412, ACP Container 410, the ACP 400, and/or in a cloud API response.

If the SCM 120 has detected that its current ACP version was not at or above the Minimum-Prior-Version (i.e., the last version where the current set of keys in the SCM 120 were valid), the SCM 120 may reject the ACP update and request the Minimum-Prior-Version. This may result in a series of backtracks of older ACP Containers 410, and then updated packages being sent in sequence or performed by the sending system component (e.g., the device 110). Rejection of the ACP update may also involve the cloud 130 maintaining copies of prior finalized ACP Containers 410 for each SCM 120, or at least for SCMs 120 that have not received the latest ACP.

Additionally, or alternatively, the Minimum-Prior-Version may only be communicated via response to the cloud API to the receiving system component, which may then request appropriate ACP Containers 410. Additionally, or alternatively, the cloud 130 may provide only viable ACP Containers 410 to SCMs 120 in sequence—that is, the cloud may not do any sequencing.

In one embodiment, if the in-flight ACP 400 may have not yet been accepted by a particular SCM 120, the cloud 130 may not send a subsequent ACP Container 410 for that SCM until it has accepted the in-flight ACP 400.

In one embodiment, if the in-flight ACP 400 may have not yet been accepted by a particular SCM 120, the cloud 130 may merge the in-flight key changes into new ACP versions. In other words, the cloud 130 may maintain one or more prior keys for each system component, and then use the appropriate one based upon the last known state of the target SCM 120.

In the illustrated embodiment, because the ACP Container 410 is targeted for a specific SCM 120 and has been signed by one or more system components or services, keys outside of those contained within the ACP 400, such as the SCM-Key and the Cloud-SCM-Key, as well as other non-key attributes including identifiers may also be simultaneously updated.

In one embodiment where authorizations are not issued to accounts (e.g., the authorizations are instead issued to specific devices 110), for an ACP Container 410 containing only cycled keys, an owner 10 may not be required to approve the updated ACP 400, and thus an owner device 110 may not encrypt and sign the ACP Outer Layer 2. Instead, the owner device identifier may be set to a value that indicates that the owner device identifier is a key cycle ACP 400, and then ACP Outer Layer 2 may be encrypted with a key used by another layer (e.g., ACP Outer Layer 1 or ACP Outer Layer 3). Additionally, or alternatively, the key cycle ACP 400 may not be encrypted, in which case signature and key fields may be used for further verification.

In one embodiment, where authorizations may be issued to accounts, for an ACP Container 410 containing only cycled keys, an owner 10 may not be required to approve the updated ACP 400, but the User Account Service may still encrypt and sign the ACP Outer Layer 2 as normal.

The ACP 400 may have a Key-Cycle attribute that may be set to further verify that the package is legitimate. Legitimacy may indicate that the encryption of ACP Outer Layer 2, or lack-thereof, was intentional. During verification of the ACP Container 410, the SCM 120 may verify that the current keys of the SCM 120 (i.e., the keys identified in the prior ACP 400 received by the SCM 120) match the "old keys" in the new ACP. If any keys mismatch, the ACP 400 may be rejected.

In an alternative embodiment, for a key cycle ACP 400, the SCM 120 may verify that no authorizations have been updated (apart from keys associated with the authorizations). In another alternative embodiment, for a key cycle ACP 400, only keys may be updated.

In an alternative embodiment, an owner device 110 may be configured to approve and possibly sign the key change ACP 400, with or without user intervention. The owner device 110 may just automatically sign the ACP 400 in this circumstance. In an alternative embodiment, an owner device may be configured to approve and possibly sign the key change ACP 400, with user intervention. The user 10 may be required to approve the ACP 400 as if the ACP 400 were any other authorization change.

When cycling keys, a system component may keep zero or more prior keys for some time to assist in the accommodation of missed key cycle ACPs 400. The system component may attempt to use prior keys, if a more recent key fails. The system component may persist prior keys until some point at which it is determined it is no longer necessary to do so, such as until after another configuration arrives without new keys, using the most recent keys, or until some period of time has elapsed.

In one embodiment, when keys are cycled, connections to entities that utilize the keys may be re-established, or at minimum, re-verified. Examples of such connections include the device/SCM pair, cloud/device pair, and equipment/SCM pair. Key cycling may be considered a security measure and is not meant to be a nuisance, although key cycling may be a nuisance in some regard, if the user experience is diminished due to poor implementation. In one embodiment, it may be the case that keys are being cycled to prevent a breach from using a hacked device, and thus being used to cause a system component, such as the SCM 120, to disconnect in order to force a reconnection. In the case of a hacked device, the attempted reconnection is likely to fail.

In an alternative embodiment, key changes for the SCM 120 may be delivered similar to how they might be delivered within the ACP Container 410, but instead within a separate package, such as a Key Change Package (KCP), with or without a separate KCP version tracked by the cloud 130 for each SCM 120. In the event such an approach is used, and a KCP version is not used, the KCP version may be merged with the ACP version.

In one embodiment, the SCM is not the only system component that may utilize key cycling—the devices 110, the cloud servers 130, the equipment component 140, the OEM cloud 135, and others (if present) may also be configured for keys to be updated in response to a breach.

Key cycle requests may originate from the cloud 130, and thus, each system component may verify that a request to cycle a key is authentic. As described herein, each system component may possess a number of keys—zero or more of which may be generated by that system component, and zero or more of which may be obtained from other system components. Because each system component may generate at least one of those keys, a key cycling operation may involve the cooperation, coordination, and sequencing of multiple system components.

The SCM 120 may not generate its own keys, and thus the SCM 120 may not be requested to cycle keys. In this case, the SCM 120 is a recipient of a key cycling process. Keys not generated by the SCM 120 include at least one of the SCM-Key and the SCM-Equipment-Key.

If the SCM does not generate its own keys, the cloud 130 may issue a request for a particular key to be cycled, when the key is not under control of the cloud 130. For instance, the cloud 130 may issue a request to a device 110 to generate a new Device-SCM-Key for a particular SCM 120. If configured, the updated key (authenticated to be from the requested device 110) may then be included in an ACP 400 and delivered to the device 110 or devices 110 associated with a particular SCM 120. The device or devices 110 may deliver the ACP 400 to the SCM 120.

In an alternative embodiment, the SCM 120 may generate its own keys, and therefore the SCM 120 may be requested to cycle keys. In an alternative embodiment, a system component may cycle a particular key, or initiate a key cycle, and issue the new key to the cloud 130 for distribution.

In an alternative embodiment, instead of delivering updated keys to an SCM 120 via the ACP Container 410, individual key cycle requests (obtained from the cloud 130 individually or in bulk) may be issued to the SCM 120, and the status may be reported back to the cloud 130. In one configuration of this embodiment, only when all requests have been processed is the key cycle operation considered complete.

In another alternative embodiment, the system 100 may not directly support key cycling, and instead utilizes operations in the system 100 to conduct one or more of the following: remove and re-issue authorizations; factory-reset SCMs 120; factory-reset devices 110 and/or erase or reinstall applications; and start new cloud servers.

XIV. Secure Connection Establishment

Figure 14:
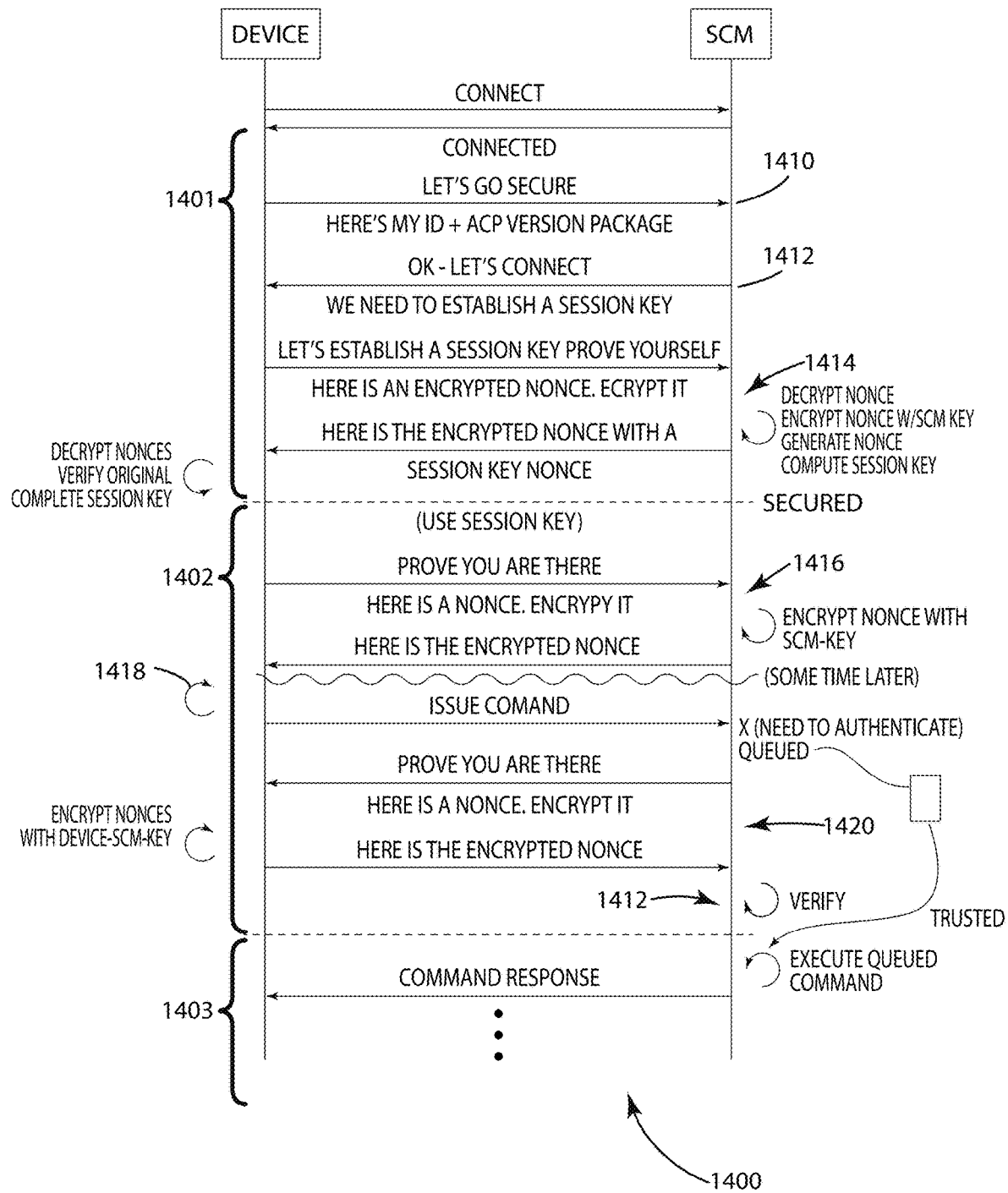
FIG. 14 shows a method of establishing a secure and trusted communication link in accordance with one embodiment.

In the illustrated embodiment of FIG. 14, the device/SCM communications channel may employ a graduated, lazy authentication process or method, both to improve the user experience (responsiveness) as well as to enable communication with a device 110 never seen by the SCM 120. The secure connection process may occur over any communications link, but configured for relatively low-speed, unsecured wireless communications links between constrained hardware, such as a Bluetooth Low Energy (BLE) communications link.

In the illustrated embodiment, the secure connection establishment process or method 1400 may include three (3) distinct phases: (1) unknown—Step 1401; (2) secured—Step 1402; and (3) trusted—Step 1403. The resultant secure connection may be utilized atop whatever the underlying communications link may be, regardless of whether the underlying communications layer is secure or insecure. This underlying communications link may be described as the pre-unknown communications link; in situations where it is known that the pre-unknown communications link is secure (e.g., a TLS or DTLS session has already been established), then an alternative embodiment may remove redundant phases (e.g., unknown and/or secured). The method 1400 may be similar in some respects to a TLS/DTLS connection establishment process.

A. Pre-Unknown Communications Link

The pre-unknown communications link initialization and connection sequence may vary based on the system configuration and underlying physical medium and protocol stack (e.g., Ethernet-IP-TCP, Ethernet-IP-UDP, Ethernet-IP-TCP-TLS, BLE, 802.15.4-IPv6 [6LoWPAN], etc.). As such, the actual messaging content, packetization/framing, and send/receive connect/connected protocol sequencing/operation might vary slightly for different underlying technologies. It is also possible that, due to variances in the underlying technology, it may be possible to combine one or more protocol steps into a single step (or conversely, that it may be useful or necessary to break a single step into many smaller steps to overcome very small packet/message restrictions). However, the high-level protocol steps may remain the same. In the illustrated embodiment, the connection establishment process is conducted over Bluetooth Low Energy (BLE)—but it should be understood the present disclosure is not so limited.

Figure 13:
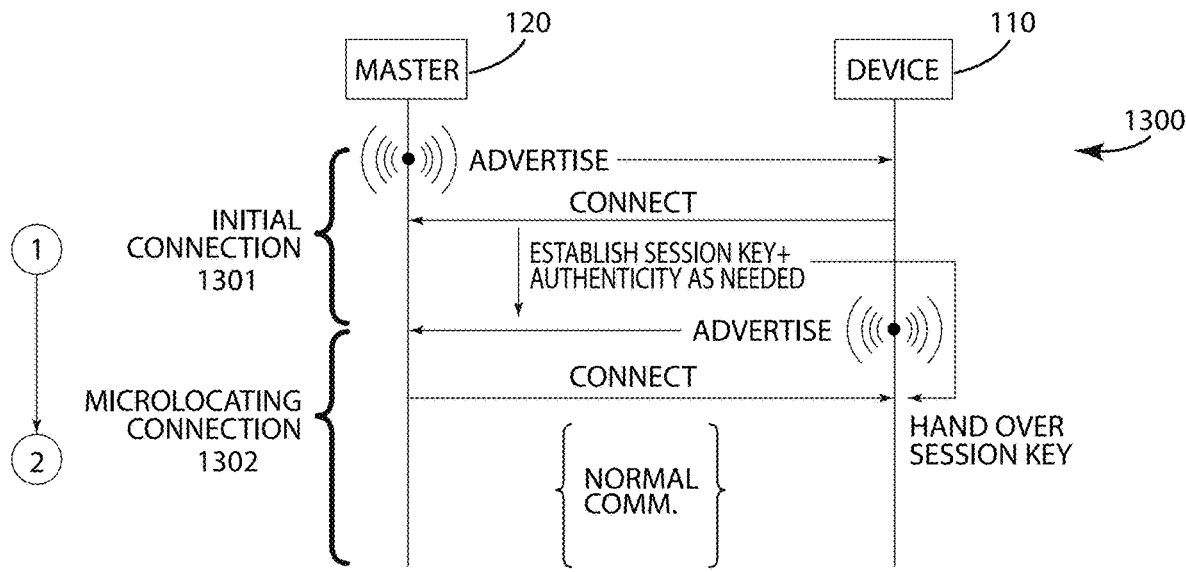
FIG. 13 shows a method of establishing a microlocation connection in accordance with one embodiment.

By the time the SCM 120 and device 110 have arrived at the start of the unknown phase—Step 1401, it is possible that a significant amount of effort may have been expended to setup the pre-unknown communications link. One such example of this is the application of this embodiment in conjunction with the systems described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE, and U.S. Nonprovisional application Ser. No. 15/488,136 to Raymond Michael Stitt, filed Apr. 14, 2017, and entitled SYSTEM AND METHOD FOR ESTABLISHING REAL-TIME LOCATION—the disclosures of which are incorporated herein by reference in their entirety, including a microlocation system using BLE. A method according to this system is shown in the illustrated embodiment of FIG. 13, and designated 1300. The method 1300 may use a connection strategy wherein a master device (SCM 120) starts as a peripheral and a portable device (device 110) as a central (initial connection). Step 1301. After agreeing to communicate with one another, the roles are switched, where the master device 110 becomes the central and the portable device 110 becomes the peripheral as part of a microlocating connection. Step 1302.

In embodiments where the herein described security model/system may be applied in connection with the systems described herein, and/or those described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE, and U.S. Nonprovisional application Ser. No. 15/488,136 to Raymond Michael Stitt, filed Apr. 14, 2017, and entitled SYSTEM AND METHOD FOR ESTABLISHING REAL-TIME LOCATION—the disclosures of which are incorporated herein by reference in their entirety.

1. Pre-Unknown Communications Link—Initial Connection

The pre-unknown communications link may be the initial connection, as related to the method 1300. In other words, the device 110 and SCM 120 have not yet swapped roles, and therefore, the first exchange in the sequence described herein with respect to the method 1300 is from the device 110→the SCM 120.

In this embodiment, the secure connection establishment process may complete through either the secured or trusted phase within the context of the initial connection. The process may complete through the secure or trusted phase depending upon whether or not mutual authentication is performed during the unknown or secured phase.

The session key, such as the Device-SCM-Session-Key, established during this process may be verified and/or authenticated prior to the switch to the microlocating connection (i.e., role-reversal). Regardless, the session key may be used within ("handed-over to") the microlocating connection to establish the secure communications channel. In the event that a phase downgrade is utilized, the microlocating connection may continue to be used. A phase downgrade may be utilized in a variety of circumstances, such as due to disconnect/reconnect, session key cycling, or failed authentication.

This approach may allow the SCM 120 to cleanly distribute device connections at the role-reversal boundary to alternate system components (e.g., SCMs 120 or similar modules).

2. Pre-Unknown Communications Link—Microlocating Connection

In one embodiment, the pre-unknown communications link may be the microlocating connection. In other words, the device 110 and SCM 120 may have already swapped roles, and therefore, the first exchange in the sequence described with respect to the method 1400 is reversed—the device 110←the SCM 120.

This is an alternative embodiment, where the unknown connection establishment phase at Step 1401 may not be completed during the initial connection in the method 1300. That is, the entire connection establishment process 1400 may be completed within the context of the microlocating connection established at Step 1320 of the method 1300.

3. Establishing a Pre-Unknown Communications Link

In the illustrated embodiment of FIG. 14, the beginning of the initial connection in the microlocation system is the point at which a device 110 has decided to connect to a particular SCM 120. To provide an example, the device 110 may decide to connect to the SCM 120 because the SCM 120 is recognized as a system component to which the device 110 believes a) the device 110 is configured to communicate, b) the device 110 would like to become an owner of the SCM 120, or c) the device 110 is a curious (or malicious) device connecting with the SCM 120.

The device 110 may use the initial connection established at Step 1301 in accordance with the method 1300 to interrogate the SCM 120, such as to determine if the SCM 120 is in factory-reset mode, to send an updated ACP or determine another configuration. The device 110 may perform a role-reversal, by switching to the microlocating connection in accordance with Step 1302, when the device 110 and/or SCM 120 begin the portion of the secure connection establishment process in which the session key (Device-SCM-Session-Key) is established. Step 1402. The secure connection establishment step may occur after the device 110 has shared the Device-SCM-ID of the device 110, and thus, the SCM 120 has some evidence, albeit possibly insecure, that the device 110 may be device 110 to which the SCM 120 should connect.

With this approach, a device 110 may not be able to authenticate an SCM 120, and/or an SCM 120 may not be able to authenticate a device 110, before deciding whether or not to switch to the microlocating connection and attempt to establish a secure communications channel with the device 110.

In the illustrated embodiment of FIG. 14, message timing information may be incorporated into the communications link challenge-response protocols to help protect against relay attacks. The application embodiment depicted in FIG. 14 is focused on the microlocation system discussed herein and incorporated herein by reference—but it should be understood that the present disclosure is not so limited and that the system 100 and communications methodologies described herein may facilitate communications in any type of system of devices or system components.

In one embodiment, because some device platforms/libraries do not allow BLE peripherals to advertise all desired information during background processing modes, the SCM 120 and/or device 110 may store BLE bonding information to complete the transition into the microlocating connection. In an alternative embodiment, BLE bonding may be completed during the initial connection phase on behalf of the user.

B. Secure Connection Establishment

The device 110 may initiate a connection with the SCM 120 in accordance with the illustrated embodiment of FIG. 14. The SCM 120 may accept the connection and begin the connection establishment process: Step 1401—the first (unknown) phase; Step 1402—the second (secured) phase; and Step 1403—the third (trusted) phase.

1. First (Unknown) Phase

In the illustrated embodiment, during the first (unknown) phase, it is unknown whether or not the communications link may be secure.

The underlying communications link may provide some level of encryption and/or end-node hardware authentication already, which may or may not actually be secure. For instance, the underlying communications link may suffer from known defects/vulnerabilities. As a result, it is assumed that during this phase the communications link is insecure.

In this phase or during Step 1401, the device 110 may send a request to the SCM 120 to switch to a secure communications channel. Step 1410. This request may elicit the device 110 to send its Device-SCM-ID and ACP Container Version Package 412 to the SCM 120. In an alternative embodiment, the Device-SCM-ID of the device 110 may be contained within the ACP Container Version Package 412. The Device-SCM-ID may be used by the SCM 120 to determine which set of encryption keys to use for subsequent messages, such as the Device-SCM-Key, ACP-Version-Key, or Device-SCM-Session-Key, or a combination thereof.

As described at least at the ACP Container 410 section (Section III), the SCM 120 may not allow a transition to the secure communications channel if the ACP 400 is to be updated. If it is determined the ACP 400 of the SCM 120 should be updated, the SCM 120 may send a request back to the device 110 to send the updated ACP 400.

If the ACP 400 of the SCM 120 does not need to be updated, the SCM 120 may send a message back to the device 110 indicating that the device 110 may proceed, and further, whether or not to use a previously stored session key (Device-SCM-Session-Key). Step 1412. If the SCM 120 indicates that the device 110 should use an already established session key (the session key itself may not be disclosed), and the device 110 possesses a session key (Device-SCM-Session-Key), the device 110 and SCM 120 may immediately transition into the secured phase. If not, the SCM 120 and device 110 may begin to establish a new session key (Device-SCM-Session-Key). The Device-SCM-Session-Key session key may be established during attempts of the device 110 to achieve challenge-response authentication of the SCM 120 in accordance with one or more of the following steps:

1) The device 110 may generate a cryptographic nonce (N).
2) The device 110 may encrypt N with the Device-SCM-Key (private) key, creating ND.
3) The device 110 may send ND to the SCM 120.
4) The SCM 120 may decrypt ND using the Device-SCM-Key (public) key, creating NDS.

5) The SCM 120 may generate a cryptographic nonce (M).
6) The SCM 120 may calculate its copy of the session key, Device-SCM-Session-Key, using, for example, a cryptographic hash of NDS concatenated with M. The session sequence number (stored with the session key) may be set to 0 or a random number.
7) The SCM 120 may encrypt NDS and M with the SCM-Key (private) key, creating NM.
8) The SCM 120 may send NM to the device 110.
9) The device 110 may decrypt NM using the SCM-Key (public) key, creating NDSD and MD.
10) The device may verify that N equals NDSD. If there is no match, the SCM 120 cannot be authenticated and the device 110 disconnects. The SCM 120 and device 110 may discard any previously computed session keys. The challenge-response authentication process may be aborted at this stage.
11) The device 110 may calculate its copy of the session key, Device-SCM-Session-Key, using, for example, a cryptographic hash of N concatenated with MD). The session sequence number, stored with the session key, may be set to 0.

At this point, both the device 110 and the SCM 120 have calculated a new session key, but neither has verified they are able to successfully communicate, which may be considered yet another measure of authenticity of the SCM 120. If the challenge-response authentication process is completed successfully, the device and SCM may immediately transition into the secured phase at Step 1402.

In one embodiment, in addition to encrypting the messages in the challenge-response authentication process, the messages may be signed-then-encrypted. In alternative embodiment, the cryptographic nonce (N), generated by the device 110, may be encrypted by the SCM-Key (public) key instead of the Device-SCM-Key (private) key. In another alternative embodiment, the cryptographic nonce (N), generated by the device 110, may not be encrypted. In still another alternative embodiment, the cryptographic nonce (M), generated by the SCM 120, may be sent with the "proceed" message (sent prior to the challenge-response authentication process), when a session key has not yet been established.

In further still another alternative embodiment, the session key (Device-SCM-Session-Key) may be computed by another method. In yet still another alternative embodiment, an alternate challenge-response authentication algorithm may be utilized. In further yet still another embodiment, the Device-ID may be used as the Device-SCM-ID. In one embodiment, session sequence numbers are not utilized.

In one embodiment, the device 110 may send a "session key established" message to the SCM 120, when the challenge-response authentication process is successful (i.e., the device generates its session key). In one embodiment, the device 110 may send an "authentication failed" message to the SCM when the challenge-response authentication process is aborted.

In one embodiment, the SCM 120 may verify the authenticity of the device 110 (instead of the device 110 verifying the authenticity of the SCM 120) during this phase or Step 1401. As a result, at a later stage, when commands are sent, the device 110 may verify the authenticity of the SCM 120.

In one embodiment, additional or alternative to one or more embodiments described herein, the device 110 and SCM 120 may mutually authenticate one another during Step 1401; in this case, if successful, the device 110 and SCM 120 may transition into the trusted phase.

The SCM 120 may be configured to disconnect from the device 110 after a predetermined period of inactivity. The SCM 120 may disconnect from the device 110 at any time or in response to any event. For instance, the SCM 120 may disconnect due to high system resource utilization on the SCM 120, due to not responding to requests within a predetermined period of time, or due to a connection duration that exceeds a predetermined maximum duration.

As described at the beginning of this Section XIV.B, the SCM 120 may request the device 110 to send the ACP Container 410 that accompanies the ACP Container Version Package 412. The device 110 may send the ACP Container 410 to the SCM 120 during this phase. In response to receipt of the ACP Container 410, the SCM 120 may provide a response with a status indication, indicating, possibly at minimum, whether the ACP Container 410 was accepted, not processed, or rejected. Acceptance may be indicative of the ACP Container 410 being processed and stored, and indicate that whatever changes contained in the ACP Container 410 were successfully applied. Being not processed may result from the ACP Container 410 being an older or equivalent version. Rejection may indicate verification failed. In an alternative embodiment, the SCM 120 may provide no status indication to the device 110 with regard to ACP Container 410 to update processing.

To support the factory-reset state, the device 110 may request the SCM-Key (public) key and/or SCM-ID identifier from the SCM 120 during Step 1401 via the new-owner-initiate request. In response to this request, if in factory-reset mode, the SCM 120 may provide a response containing the SCM-Key (public) key and/or SCM-ID identifier, thereby indicating that the SCM 120 is, in fact, in factory-reset mode.

The SCM 120 may log information about failed authentication attempts to the SCM System Log. Examples of failed authentication attempts include failures to enter, or remain within, the secured and/or trusted phases.

2. Second (Secured) Phase

During the second (secured) phase or Step 1402, both the device 110 and the SCM 120 may possess session keys (Device-SCM-Session-Key) that may be used to create a secure communications channel. That is, the session keys may enable the device 110 and the SCM 120 to conduct one or more of the following: encrypt data; increment sequence number(s); and generate message authentication codes.

Messages from the device 110 and the SCM 120 using a secure communications channel may be sent using the Device-SCM-Session-Key session key, along with incrementing sequence numbers, to encrypt-then-MAC (e.g., encrypt the message using the Device-SCM-Session-Key, then append the MAC [Message Authentication Code] computed from the encrypted message), allowing the device 110 and the SCM 120 to verify and authenticate sent/received messages. This mode of communication may be similar to some aspects of TLS/DTLS. It should be noted that approaches other than encrypt-then-MAC may be used (e.g., MAC-then-encrypt or encrypt-and-MAC); however, they may be less secure.

In the illustrated embodiment, the session key (Device-SCM-Session-Key) may survive connections; therefore, to limit the duration or persistence of the session key, the Device-SCM-Session-Key session key may be periodically, and/or at convenient times, cycled (in any phase) by the SCM 120. Convenient times may be during other events, where the user experience is already impacted, or other actions are occurring that result in a new session key anyway (key cycling or an ACP update). Convenient times may also take a more traditional meaning, where a convenient time is considered a time when the user experience is not impacted, or not noticeably impacted, such as while the user 10 is not actively using the SCM 120, but is within range of the SCM 120 or while the user entering/leaving range and enough time exists to complete the operation. Examples of being within range include sitting inside a car that is already started, sitting at a table, or inside a locked door.

The session key may be cycled by executing a session key rolling algorithm within the existing secure communications channel, and/or by computing a new session key using a challenge-response authentication process or another process similar in some respects to the process described herein with respect to the unknown phase and computation of the session key during the unknown phase. Additionally, or alternatively, the session key may be cycled by invalidating the stored session key and then disconnecting and re-establishing the session key during the unknown phase. In one embodiment, the device 110 may initiate session key cycling.

At the start of Step 1402, the device 110 may send either a request to the SCM 120 to verify that the session key (Device-SCM-Session-Key) is valid (verifying that the channel is operational) or to verify both the validity of the channel and authenticity of the SCM 120. Steps 1416, 1418. Validity and authenticity of the SCM 120 may be verified if an existing session key was used, e.g., the prior phase was not recently executed. Step 1418.

The device 110 may skip the verification Step 1418 of this channel, if it recently verified the operation of the channel or verified that the session key is valid. In an alternative embodiment, the device may not skip the verification Step 1418.

To complete the session key verification Step 1418, the device 110 and SCM 120 may execute a secured phase challenge-response protocol. The primary purpose for this protocol is for the device 110 to verify the operation of the channel when immediately entering the verification phase from the unknown phase, where the authenticity of the SCM 120 has already been established. However, the secured phase challenge-response protocol may be used periodically by either the device 110 or the SCM 120 as a channel keep-alive or for other purposes. An example (simple) challenge-response protocol is provided below:

1) The device 110 (or SCM 120) may generate a random number (N).
2) The device 110 may send N to the SCM.
3) The SCM 120 may compute N+1 (M).
4) The SCM 120 may send M to the device 110.
5) The device 110 may verify that N+1 equals M. If they do not match, verification has failed—possibly because the message was not communicated properly.

When the device 110 executes a secured phase challenge-response protocol, the device 110 may verify that the communications channel is operational. The device 110 at this stage may not have verified anything regarding the authenticity of the SCM 120, apart from that the SCM 120 possesses the correct session key. The role of the SCM 120 and the device 110 above may be reversed, as the SCM 120 may also initiate a secured phase challenge-response protocol to verify the secured communications channel. In an alternative embodiment, the secured phase challenge-response protocol may not be utilized. In this case, either the authentication protocol may be used always, or the authentication protocol is absent.

In one embodiment, the device 110 may use a secured phase challenge-response authentication protocol to verify the authenticity of the SCM 120. The secured phase challenge-response authentication protocol may be performed periodically when the secured phase is entered after a predefined period of time has elapsed, or when some other event occurs. Example events include the SCM 120 requesting the device 110 to conduct the secured phase challenge-response authentication protocol, and an updated ACP 400 being received by the device 110. The secured phase authentication protocol outlined below is similar in many respects to the unknown phase authentication protocol; however, the secured phase authentication protocol outlined herein may utilize significantly less computation, as fewer asymmetric encryption operations are utilized. An example secured phase authentication protocol can be conducted as follows (although alternate challenge-response authentication protocols may be used):

1) The device 110 may generate a cryptographic nonce (N).
2) The device 110 may send N to the SCM.
3) The SCM 120 may compute a cryptographic hash of N+1 (M).
4) The SCM 120 may encrypt M with the SCM-Key (private) key, creating MS.
5) The SCM 120 may send MS to the device 110.
6) The device 110 may decrypt MS using the SCM-Key (public) key, creating MSD.
7) The device 110 may compute a cryptographic hash of N+1 (MD).
8) The device 110 may verify that MD equals MSD. If they do not match, authentication has failed, possibly because the SCM 120 did not possess the appropriate encryption key to prove its authenticity.

In an alternative embodiment, instead of the SCM-Key (private) key, an alternate encryption key may be utilized such as the Device-SCM-Key (public) key. In an alternative embodiment, additional encryption keys may utilized such as the Device-SCM-Key key.

Similar to the described operation in the unknown phase, the device 110 may send an ACP Container Version Package 412 to the SCM 120 using the secure communications channel. As an example, the device 110 may send the ACP Container Version Package 412 in response to or based on device receipt of an updated ACP Container 410. If the SCM 120 determines a need or desire to receive the corresponding ACP Container 410, the SCM 120 may request the device 110 to send the ACP Container 410 that accompanies the ACP Container Version Package 412. The SCM 120 may also request the device 110 to send the most recent ACP Container Version Package 412 stored in the device 110 on a periodic basis or in response to occurrence of an event.

The device 110 may send the ACP Container 410 to the SCM 120 during this phase using the secure communications channel; in response, the SCM 120 may provide a response with a status indication, as described in the prior phase. In an alternative embodiment, the ACP Container 410 and/or ACP Container Version Package 412 may not be permitted to be sent to the SCM 120 during the secured phase. As described herein, there may be other configuration packages that use similar semantics/operation as the ACP Container 410, and thus, it should not be inferred that the ACP Container 410 is the only configuration package of the system 100 that may be delivered in this phase or other phases.

In one embodiment, a Firmware Update Package (FUP) may be delivered from the device 110 to the SCM 120 only via a secure communications channel, such as during secured or trusted phases. The device 110 may obtain the FUP from the cloud 130 or as part of executable/loadable images stored on the device 110. For instance, the FUP may be obtained as part of an app bundle, or as a separate image included in a larger device firmware image.

In one embodiment, the FUP may be delivered from a device 110 to an SCM 120 over any communications channel. In one embodiment, the FUP may be delivered from a device 110 to an SCM 120 only over a secure communications channel where the device 110 has been authenticated, such as during the trusted phase only. In one embodiment, the FUP may be delivered from a device 110 to an SCM 120 only by owner devices 110. In one embodiment, devices 110 may not deliver FUPs to SCMs 120. Additional or alternative firmware update configurations and embodiments are described at least at Section XV, which includes additional information regarding the Firmware Update Package itself.

The SCM 120 may send a Blacklist Package, discussed herein in further detail at least at Section XXI, to the device 110 using the secure communications channel. The device 110 may provide a response to the Blacklist Package with a status indication. In one embodiment, the device 110 may request the SCM 120 to send the device 110 the Blacklist Package. If there are no blacklisted items, the SCM 120 may do nothing, or the SCM 120 may send an indication of there being no blacklisted items.

The device 110 and the SCM 120 may perform various system-level operations in the background, communicating with one another via the secure communications channel. These operations may not be related to explicit execution of commands that utilize authentication and/or authorization to initiate or complete. For purposes of disclosure, any operation that is performed as a result of the communications, or absence of communications, between a device 110 and an SCM 120 is considered a command; therefore, such background operations are considered commands. Anything or action that may be performed may be considered a command. There may be some operations or actions that occur when there is nothing connected (e.g., turn off the lights), and there may be some operations or actions that occur when there is something connected (e.g., track the device, turn on the lights, etc.). The command may relate to an action or operation of the device 110 or the SCM 120, or any other system component.

Example background operations include microlocation services, GPS/INS services, status information, logging, background/maintenance processing, power mode changes, and configuration updates. Additionally, transitioning from one communications phase to another is considered a command (e.g., transitioning from unknown to secure, secure to trusted, trusted to unknown, to disconnected, etc.). For example, an authorization for a device 110 for a SCM 120 may be required to transition into the trusted communications phase (i.e., authorizations may contain both authentication information and authorization criteria).

It is also worth noting that, while in this phase—Step 1402, the SCM 120 may not have explicitly verified the authenticity of the device. Explicit verification may not have been conducted recently or initially. However, there may be enough evidence to have a high degree of confidence that the device 110 is authentic. At some point within this phase—Step 1402, the device 110 and/or the SCM 120 may cause, issue, or receive a command, which may encapsulate sending/receiving any one or more of the following commands:

1) Command (e.g., the device 110 may be instructing the SCM 120, or its equipment component 140, to do something)
2) Request (e.g., the device 110 may be requesting the SCM 120, or its equipment component 140, to send data)
3) Update (e.g., the SCM 120, or its equipment component 140, may be providing periodic/aperiodic data)
4) Response (e.g., the SCM 120, or its equipment component 140, may be providing a response to a request)

The SCM 120 may perform an operation, including any one of the listed commands, based upon the presence, location, authentication state, or authorization state, or any combination thereof, of a device 110. The device 110 may perform an operation, including any one of the listed commands, based upon the presence, location, authentication state, or authorization state, or any combination thereof, of an SCM 120.

It may be worth noting that the above description of the various types of commands, and what is considered a command, is not exhaustive or limited to the above list, nor is the list of commands limited to this phase of communication (e.g., a command is a command regardless of which phase of communication it was caused, issued, or received).

If an SCM 120 receives a command and the device 110 has not been authenticated, the command may be queued while the device 110 is authenticated. If the device 110 fails authentication, an appropriate error response may be provided for each rejected command.

In one embodiment, only up to one command may be queued while the device 110 is being authenticated. Additionally, or alternatively, a command may be rejected, if the device 110 has not already been authenticated.

In one embodiment, system-level background operations may not be permitted unless in the trusted phase—Step 1403.

The SCM 120 may (pre-emptively) authenticate the device 110, even if no command is being sent or received, to improve the user experience. In an alternative embodiment, the SCM 120 may not pre-emptively authenticate a device 110.

In one embodiment, for the device 110 to send or receive a command to the SCM 120, the SCM 120 may require authentication of the device 110 by the SCM 120. The SCM 120 may initiate a secured phase challenge-response authentication protocol to verify the authenticity of the device 110 prior to allowing the execution of a command. Steps 1420, 1422. An example of the a secured phase challenge-response authentication protocol may include one or more of the following steps:

1) The SCM 120 may generate a cryptographic nonce (N).
2) The SCM 120 may send N to the device.
3) The device 110 may compute a cryptographic hash of N+1 (M).
4) The device 110 may encrypt M with the Device-SCM-Key (private) key, creating MS.
5) The device 110 may send MS to the SCM.
6) The SCM 120 may decrypt MS using the Device-SCM-Key (public) key, creating MSD.
7) The SCM 120 may compute a cryptographic hash of N+1 (MD).
8) The SCM 120 may verify that MD equals MSD. If MD and MSD do not match, authentication has failed. In other words, if MD and MSD do not match the device 110 did not possess the appropriate encryption key to prove authenticity of the device 110.

Once the device 110 has been authenticated, the device 110 may not be authenticated again for a predetermined period of time and/or until a predetermined event occurs, such as occurrence of a connection disconnect, an update to the ACP Container 410, and an authentication request from the equipment component 140, or any combination thereof.

In one embodiment, the authenticity of the device 110 may only be performed once per session key cycle, as described herein. In one embodiment, if the SCM verification of the authenticity of the device 110 fails, the device 110 and SCM 120 may remain in the secured phase—Step 1402.

In one embodiment, the authentication of the device 110 may be performed by the SCM 120 with every command issued from and sent to by a device 110. In one embodiment, the authentication of the device 110 may be performed with every command issued from the device 110. In one embodiment, the authentication of the SCM 120 may be performed with every command issued from the SCM 120.

If a challenge-response process or a challenge-response authentication process fails, the device 110 and the SCM 120 may immediately disconnect and/or transition back to the unknown phase at Step 1401.

After the SCM 120 has verified the authenticity of the device 10, the device 110 and SCM 120 may transition into the trusted phase.

3. Third (Trusted) Phase

During the third (trusted) phase, both the device 110 and the SCM 120 may possess session keys (Device-SCM-Session-Key) that have been verified, and both the device 110 and the SCM 120 have been determined to be authentic. Step 1403.

During this phase—Step 1403, all or subset of the actions—and consequences—of prior phases may be conducted over the secure communications channel, including, for example, an update to the ACP Container 410, firmware updates, background/other operations, and device 110 and SCM 120 challenge-response authentication protocols. If a failure in authentication over the secure communication channel occurs, the device 110 and the SCM 120 may immediately disconnect and/or transition back to a prior phase (e.g., the unknown phase).

During the trusted phase, periodic authentication of both the SCM 120 and the device 110 may be utilized, and may even be considered necessary. Periodic authentication may be accomplished by routine execution of commands, by periodic and/or triggered separate verification of authenticity with respect to the SCM 120 and the device 110 (via appropriate challenge-response authentication protocols), or by periodic and/or triggered mutual authentication challenge-response authentication protocols. In an alternative embodiment, periodic authentication of both the SCM 120 and the device 110 may not be necessary or considered necessary.

In one embodiment, mutual authentication challenge-response protocols may be implemented that are similar to the above described challenge-response protocols, but with one or more exceptions. One difference may be that both the SCM 120 and the device 110 are authenticated in one sequence. This single sequence authentication may incorporate one or more aspects of TLS/DTLS mutual authentication. If a challenge-response authentication process fails, the device 110 and the SCM 120 may immediately disconnect and/or transition back to the unknown phase.

During the trusted phase—Step 1403, an Opaque Data Channel (ODC) may be made available between the SCM 120 and the device 110 for use to transfer abstract, user-defined commands and/or data back-and-forth. The ODC may enable the SCM 120 to securely pass commands and/or data from one system component (e.g., a device 110) to/from another (e.g., the equipment component 140), while ensuring that the device 110 is authorized to do so, but possibly without utilizing knowledge of the specifics of the API or data of the device 110. One or more of authorization, verification, and validation of commands and/or data used within the ODC may not be performed by the SCM 120. The ACP 400 may also contain additional information that may be useful in conjunction with the ODC, such as Additional Authentication Types and Identifiers.

XV. Firmware Upgrade

In one embodiment, the system 100 may be configured to ensure that system components are able to upgrade firmware securely and robustly. The capability to upgrade firmware may enable security vulnerabilities and firmware defects to be patched. Firmware updates may be distributed to the SCM 120 via a Firmware Update Package (FUP) as discussed herein.

The FUP may be received using a FUP Version Package (similar in many respects to the ACP Container Version Package 412 but adapted to facilitate transferring the FUP instead of the ACP 400. The FUP (and FUP Version Package, which may be provided together) may be delivered to a system component, such as the equipment component 140, via the cloud 130 and can then be distributed to the SCM 120 in a manner similar to ACP Container 410.

As described herein in accordance with one embodiment, a firmware update may be delivered to the SCM 120 via a secure communications channel. Different system instantiations may have different allowable firmware update distributors. For instance, one system may allow firmware to be delivered via a device 110 or directly from the cloud 130, whereas another system may expect an update to occur only through the equipment component 140 or physical media on an SCM 120.

The FUP is similar to the design of the ACP Container 410 and other secure firmware image/delivery approaches described herein, in that the FUP may be delivered, stored, and distributed to a particular SCM 120 from any system component. However, in one embodiment, the system 100 may be configured such that delivery is only enabled for one or more particular system component. In another embodiment, a firmware update may be delivered to the SCM 120 via any type of communications channel.

The FUP and FUP Version Package may be signed and/or encrypted for the target SCM 120 and then signed and/or encrypted by the cloud 120, similar to the ACP Container 410, such that the FUP and FUP Version Package may be verified to have originated from the proper cloud 130 and that only the target SCM 120 may decrypt the contents of the FUP and FUP Version Package.

If a FUP is specific to a target SCM 120, the target SCM 120 may be identified within the package. The identity of the cloud 130 may be provided within the FUP and FUP Version Package.

In one embodiment, the FUP and the FUP Version Package may be encrypted and/or signed only by the cloud 130. The FUP and FUP Version Package may be visible to and/or applicable to many SCMs 120, or only applicable to one SCM 120 but the content of the FUP and FUP Version Package may be visible to all the many SCMs 120. In one embodiment, the FUP Version Package may be encrypted and/or signed using the ACP-Package-Version key.

In one embodiment, the FUP and FUP Version Package may not be encrypted. In another embodiment, the FUP may be signed and/or encrypted additionally with a manufacturer-provided encryption key (e.g., a Firmware-Key) that may or may not be specific to a particular industry, customer, product line, and/or number of targets (including specific to a single target), among other options. In one embodiment, additional layers of signature and/or encryption may be utilized for the FUP and/or FUP Version Package, making the FUP Version Package more similar to the configuration of the ACP Container 410.

The FUP may be securely stored on one or more system components (e.g., the device 110 or cloud 130) in the secure memory 220 or in a Secure Element or equivalent hardware module, such as a Secure Enclave or Hardware Security Module (HSM).

In one embodiment, the FUP may not be stored in a Secure Element (or equivalent hardware module). However, the FUP may still be securely stored. For instance, secure storage without use of the secure memory 220 may be achieved according to any one or more of the following: the FUP may be encrypted at rest; software-based mitigations and/or hardware-based mitigations may be implemented to prevent access to such data; and hardware and/or physical obstructions or shields may be implemented. JTAG and other ports may be disabled. Hardened software interfaces may be implemented to eliminate attack vectors. Trusted execution environments, hardware or software, may be put in place, and detection systems for detecting operating system root access or compromise may be implemented. In an alternative embodiment, the FUP is not securely stored.

The SCM 120 and subcomponents of the SCM 120 may continue to operate normally while receiving a firmware update image. The SCM 120 and subcomponents of the SCM 120 may apply updates immediately and/or when not in use and/or during a predetermined period of time, such as a time of day or a day of week. In one embodiment, the SCM 120 and subcomponents of the SCM 120 may enter an update mode that disrupts or disables normal operation while firmware is updated.

The SCM 120 may rollback to a prior version of its own firmware and of all SCM subcomponents, if the currently operating firmware of the SCM 120 is corrupted or is not operating within expected or required constraints. For instance, the SCM 120 may initiate a rollback procedure if too many exceptions occur within a unit of time, if the SCM 120 is unable to run continuously for long enough to perform another firmware update, if the SCM 120 unable to establish a connection with another system component (such as a device 110, the cloud 130, or the equipment 140 component), or image hash/CRC verification fails at load time, or any combination thereof. The constraints for operation may be hard-coded within a boot selector, boot loader, firmware/application, or other loadable item.

In one embodiment, constraints for operation may be configurable at runtime. Statistical and/or other information useful to assess constraints for operation may be stored in a memory region that survives reset and/or power loss. In one embodiment, constraints for operation may include runtime behavioral or statistical analysis, runtime performance (e.g., timing or throughput) analysis, classification using machine learning, or other dynamic analyzers to determine whether or not the firmware is operating properly, or any combination thereof. In one embodiment, when a firmware rollback occurs, subcomponents of the SCM 120 may be notified, and may choose to or not to rollback. In one embodiment, SCMs 120 and subcomponents of SCMs 120 may not rollback for a variety of reasons, including, for example, because one or more of these components cannot execute a rollback, or because one or more of these components do not track sufficient statistics to determine whether or not to downgrade.

In one embodiment, prior to requesting the FUP, the firmware version, timestamps, minimum compatible versions, and other versioning information and constraints for all or a subset of firmware images within the FUP, as identified by the FUP Version Package, or any combination of this information, may be verified for applicability.

If the FUP is determined to be applicable, the FUP may be requested from the target. A particular firmware update image may be determined as applicable based on one or more criteria, such as if the version of the firmware update image is newer than the current firmware (or is equivalent and its timestamp is newer), the minimum compatible versions of the various configurations are compatible with the new firmware, and all other constraints are satisfied. Once a complete firmware image is obtained (and possibly again when written to ROM), the image may be verified by the target. Verification may involve conducting integrity hashes, signatures, and analysis of any other attributes that may be verified, or any combination thereof.

In one embodiment, the firmware image may be delivered to the target system component in smaller chunks (to enable processing by constrained components), through which the smaller chunks may be independently verified.

The SCM 120 may authenticate, additionally encrypt and/or sign, or leave unchanged, or any combination thereof, firmware updates for subcomponents of the SCM 120 and distribute them to those subcomponents. Subcomponents of the SCM 120 may be other hardware modules on an SCM 120 and/or other sensors on the SCM 120 that collectively represent an SCM 120 from the perspective of other system components.

In one embodiment, delivery of firmware updates to subcomponents of the SCM 120 may be synchronized and/or sequenced across subcomponents. The SCM 120 may update all subcomponents before updating itself, verifying that each subcomponent is successfully updated by verifying the version(s) of loaded items. In one embodiment, the SCM 120 may update its firmware before that of subcomponents. In one embodiment, the system 100 may be configurable, based upon data within the FUP, whether the SCM 120 first updates subcomponents, the SCM 120 is updated first, or another ordering constraint to be satisfied.

The SCM 120 may broadcast firmware updates to all SCM subcomponents or the SCM may send a targeted firmware update to a particular SCM subcomponent.

In one embodiment, delta updates may be used to send the FUP to the SCM 120. Compression may be used to send the FUP to the SCM 120.

In one embodiment, the cloud 130 may provide firmware update packages to system components other than SCMs 120, such as the device 110 and the equipment component 140, using either the FUP format or an alternate format for different system components. In one embodiment, system components may support the distribution (and/or routing) of firmware updates for other system components. For instance, the device 110 may distribute an equipment firmware update through the SCM 120.

In one embodiment, a system component may authenticate, additionally encrypt/sign, or leave unchanged, or any combination thereof, firmware updates and distribute them to other components. As an example, the device 110 may deliver a firmware update package to the SCM 120, which may sign and deliver the firmware update package to another SCM 120 or attached equipment component 140.

After initial manufacturing, or in response to being commanded to factory-reset, the SCM 120 may enter a factory-reset mode. In response to being commanded to factory-reset, the SCM 120 may discard its ACP 400, other configuration records, and encryption keys, to return to factory (initial manufacturing) condition. Zero or more of the following identifiers and encryption keys may not be reset as a result of a factory-reset:

1) SCM-ID identifier.
2) SCM-Key key.
3) Equipment-Key keys.
4) SCM-Equipment-Key key.

In one embodiment, the SCM-Key key may be cycled by the SCM 120 as a result of a factory-reset. Changing the SCM-Key key may cause the SCM 120 to be presented to the system 100 as a new SCM 120, rendering any system components with the old SCM-Key incapable of encrypting or decrypting messages from the SCM 120. Although the SCM 120 may appear to be new, the SCM 120 may still be identified as the same SCM 120, as long as its SCM-ID is not changed (or an alternate identifier may be used to identify the SCM 120 remains unchanged).

In one embodiment, if the SCM-Key is not cycled, and an attacker were able to successfully connect to and authenticate with the cloud 130 with a device 110 under control of the attacker, the attacker may be able to gather information to infiltrate parts of the system, and then submit a new-owner-register request. In this way, an attacker may be able to convince the cloud 130 to transfer ownership of the SCM 120 to the attacker's device 110. However, the SCM 120 would reject any message that must be signed by the cloud 130, including the ACP 400 that would authorize the attacker's device 110 to send and/or receive commands to and/or from the SCM 120. In this case, the attacker's actions may be clearly identifiable and reversible.

Changing the SCM-Key upon factory-reset may enable the cloud 130 to reject any request to become the first owner device 110 of an SCM 120 that has already been registered with the same SCM-Key, providing an additional mechanism to prevent an attacker from attempting to "take over" an SCM 120 using the new-owner-register request. In an alternative embodiment, the cloud 130 may generate a new SCM-Key key to be delivered to the SCM 120 as part of the new-owner-register request response.

In one embodiment, the SCM-ID identifier may be cycled by the SCM 120 as a result of a factory-reset. The SCM-ID identifier may be intended to be a permanent identifier; however, changing the SCM-ID identifier may render the system 100 unable to identify the SCM 120 as the same physical part, particularly if the SCM-Key is also changed. In one embodiment, the cloud 130 may generate a new SCM-ID identifier to be delivered to the SCM 120 as part of the new-owner-register request response. In one embodiment, the SCM-ID may be cycled, and the cloud 130 may keep a history of SCM-IDs for that SCM 120.

In one embodiment, the Equipment-Key keys may be cleared by the SCM 120 as a result of a factory-reset. The SCM-Equipment-Key key may be cycled by the SCM 120 as a result of a factory-reset in accordance with one embodiment. Clearing and/or changing the equipment keys may render the SCM 120 unable to communicate with the equipment component 140 coupled to, or possibly attached to, the SCM 120. In one embodiment, the cloud 130 may generate a new SCM-Equipment-Key key to be delivered to the SCM 120 as part of the new-owner-register request response.

One or more devices 110 associated with and having an authorization for an SCM 120 that has been factory-reset may not receive any notification that the SCM 120 has been factory-reset. If at least one of the SCM-ID identifier or SCM-Key key of the factory-reset SCM 120 is not changed, the cloud 130 may revoke authorizations for users 10 automatically in response to a new-owner-register request for the SCM 120.

The SCM 120 may complete its manufacturing process in the factory-reset mode—although the manufacturing process may load configurations specific to a particular destination, such as Equipment-Key keys or other configuration data. The SCM 120 may then be included in the manufacturing process for the equipment component 140 to which the SCM 120 is coupled. During the equipment manufacturing process, the SCM 120 may exit the factory-reset mode, where a manufacturing device may be registered as the owner device 110 for the SCM 120. At the end of the equipment manufacturing process, the ownership of the SCM 120 may be transferred to another device 110 or the SCM may be factory-reset. The other device 110 may be associated with the OEM, a reseller, or a rental agency.

At this stage of manufacture, the SCM 120 may be transferred to other devices 110 and/or factory-reset during the sales and delivery process. The SCM 120 may be commanded to factory-reset by the equipment component 140 to which it is coupled. The criteria by which the equipment component 140 may determine the appropriateness of factory-resetting the SCM 120 may be useful to the overall security of the OEM system. For instance, the equipment component 140 may verify that the user 10 requesting the factory-reset is authorized to do so. Authorization may be based on one or more factors, such as ownership of the equipment component 140 or physical possession of the equipment component 140.

In one embodiment, the SCM 120 may be commanded to factory-reset by the cloud 130, either directly or indirectly via one or more system components. A direct command to factory-reset may be received when the SCM 120 is connected to the cloud 130. An indirect command to factory-reset may be received similar to the ACP 400 via one or more system components, such as the cloud 130 to the device 110 to the SCM 120, or the cloud 130 to the equipment component 140 to the SCM 120.

In one embodiment, the owner device 110 may command the SCM 120 to factory-reset. Alternatively, any device 110 may command the SCM 120 to factory-reset. Additionally, or alternatively, any system component (including the SCM 120 itself) may command the SCM 120 to factory-reset, such as by the user pressing a button on the SCM 120.

When the SCM 120 is in the factory-reset mode, while no owner device 110 exists for the SCM 120, the SCM 120 may accept a new-owner-initiate request. The new-owner-initiate request may establish the first owner device 110 for the SCM 120, which can result in the generation and transfer of the first ACP 400 for the SCM 120, providing the SCM 120 with cloud keys (e.g., the Cloud-SCM-Key key, Cloud-SCM-Approval-Key, and the ACP-Version-Key key) and authorizations, as well as other configuration data. Registration of the SCM 120 and establishment of a new owner may be conducted in accordance with one or more of the following steps:

1) The device 110 may send the new-owner-initiate request to the SCM 120.
2) The SCM 120 may send its SCM-Key (public) key and SCM-ID identifier to the device 110.
3) The device 110 may generate a new Device-SCM-Key public/private key pair.
4) The device 110 may send the new-owner-register request to the cloud 130. The device 110 may, as part of the new-owner-register request, send to the cloud 130 some or all of the following:

Cloud-User-ID identifier
Device-SCM-Key (public) key
SCM-Key (public) key
SCM-ID identifier
Device-ID identifier
Device-SCM-ID identifier
Others (e.g., Ethernet MAC, BLE UUID, or APNS/GCM Token)
5) The cloud 130 may register the device 110, and generate one or more of the following:
Generate new Cloud-SCM-Key public/private keys (e.g., Cloud-SCM-Key and Cloud-SCM-Approval-Key)
Generate a new ACP-Version-Key public/private key
Generate a new User-SCM-Key public/private key
Generate owner device authorization
Generate the initial ACP 400 and deliver it
6) The cloud 130 may send the Cloud-SCM-Key (public) keys to the device 110.
7) The cloud 130 may send the ACP Container 410 (containing the initial ACP) to the device 110.
8) The device 110 may transfer the ACP 400 to the SCM 120.
9) The SCM 120 may accept the ACP 400 and exit the factory-reset mode.

After the SCM 120 has accepted its first ACP 400 and exited the factory-reset mode, authorizations for additional devices 110 may be added normally.

In one embodiment, the SCM-ID may not be obtained over an unsecure connection, and thus, the SCM-Key may be used to establish a secure connection. Establishment of a secure connection may be similar to the device/SCM connection establishment process, starting with the unknown phase, and then the device 110 may request the SCM-ID from the SCM using the secure connection.

XVI. Device/Cloud Communications—Server-Side Authentication

In one embodiment, the communications channel between the device 110 and the cloud 130 may be secured, such as by using TLS 1.2 or greater with server-side (cloud) authentication based on certificates and the Cloud Session Token.

The application layer and/or application programming interfaces in the system 100 may be based upon any combination of relevant standard technology, such as HTTPS, Google Protocol Buffers, AMQP, MQQT, CoAP, TCP, and UDP. In one embodiment, each device 110 may have its own unique client certificate and TLS mutual authentication may be performed based on this unique client certificate. In one embodiment, DTLS may be utilized instead of TLS. In one embodiment, raw asymmetric cryptography may be used instead of TLS. In one embodiment, symmetric cryptography may be used instead of TLS. In one embodiment, a secure communications channel is not used. Messages that the device 110 receives from the cloud 130 for a particular SCM may be signed by the SCM's corresponding Cloud-SCM-Key key.

XVII. Cloud/Cloud Communications—Mutual Authentication

In one embodiment, the communications channel utilized within the cloud 130 (intra-cloud) and/or between cloud systems may be secure, using TLS 1.2 or greater with mutual authentication using certificates.

The application layer and/or application programming interfaces may be based upon any combination of relevant standard technology, such as HTTPS, Google Protocol Buffers, AMQP, MQQT, CoAP, TCP, and UDP. In one embodiment, DTLS may be utilized instead of TLS. In one embodiment, raw asymmetric cryptography may be used instead of TLS. In one embodiment, symmetric cryptography may be used instead of TLS. In one embodiment, a secure communications channel is not used.

XVIII. Equipment/SCM Communications

The communications channel between the equipment component 140 and the SCM 120 may use raw asymmetric cryptography to secure communications. The asymmetric cryptography may be based on the SCM-Equipment-Key and/or the Equipment-Key.

The application layer and/or application programming interfaces may be based upon any combination of relevant standard technology, including, for example, Google Protocol Buffers, CoAP, TCP, UDP, CAN, UART (possibly custom), SPI, and I2C. In one embodiment, TLS may be used with mutual or server-side authentication with certificates or asymmetric cryptography. In one embodiment, DTLS may be used with certificates or asymmetric cryptography. In one embodiment, symmetric cryptography may be used. In one embodiment, a secure communications channel is not used.

As described herein, the SCM 120 may be equipment for another SCM 120, establishing one or more SCM-to-SCM communications channels per SCM 120. Such a configuration may facilitate one or more of the following: sharing connections; authorizations; and/or authentication activities between SCMs 120; load balancing (e.g., communications connections or computing resources); redundant/multi-factor verification/authentication of devices or other system components (e.g., other equipment); redundant/lock-step system execution and verification (e.g., cross-checking); and expanding system control capabilities (e.g., more input/output ports or improving communications range).

XIX. Time Distribution

One or more system components may utilize the current time to establish secure connections or verify information, or both. As such, the current time may be distributed or obtained securely and from a trusted source. In one embodiment, the SCM 120 may obtain the current time from the equipment component 140 to which the SCM 120 is coupled. In one embodiment, the SCM 120 may obtain the current time from the device 110 (potentially using a secure communications channel or not). In one embodiment, the SCM 120 may obtain the current time from the cloud 130. In one embodiment, the device 110 may obtain the current time from the cloud 130.

XX. Blockfan Rights Management

In one embodiment the system 100 may utilize a blockfan-based rights management system. Blockfan (or blockfan) is identified as a blockchain-based rights management system, where each node may "fan" into a tree, as opposed to a conventional blockchain (wherein each node may have up to one parent and up to one child). The tree structure of the blockfan may be used to manage and verify peer rights granted via a parent grant. For instance, the device 110 may be granted the right to access the SCM 120 (a parent grant), and under the context of that right, the right to issue a number of commands are granted (peer grants).

The chain structure in the blockfan may be utilized to sequence grants over time. In one embodiment, Merkle trees may be used to verify the hashes and/or signatures of the nodes of the blockfan (including the sibling nodes of grant nodes, to ensure that no token grant was multi-spent). Accordingly, Merkle trees may be used to verify the integrity, validity, and correctness of the entire rights management system. The blockfan-based rights management system may define a token grant, wherein a single-use right is granted for later use. For instance, at some point in the future a particular device 110 may want to take ownership of a particular SCM 120. The blockfan may form a ledger—in other words, rights are never deleted and all rights may be traced back to one or more root grants. In the event a right cannot be traced to a root grant, this is considered to indicate a verification failure.

Figure 15:
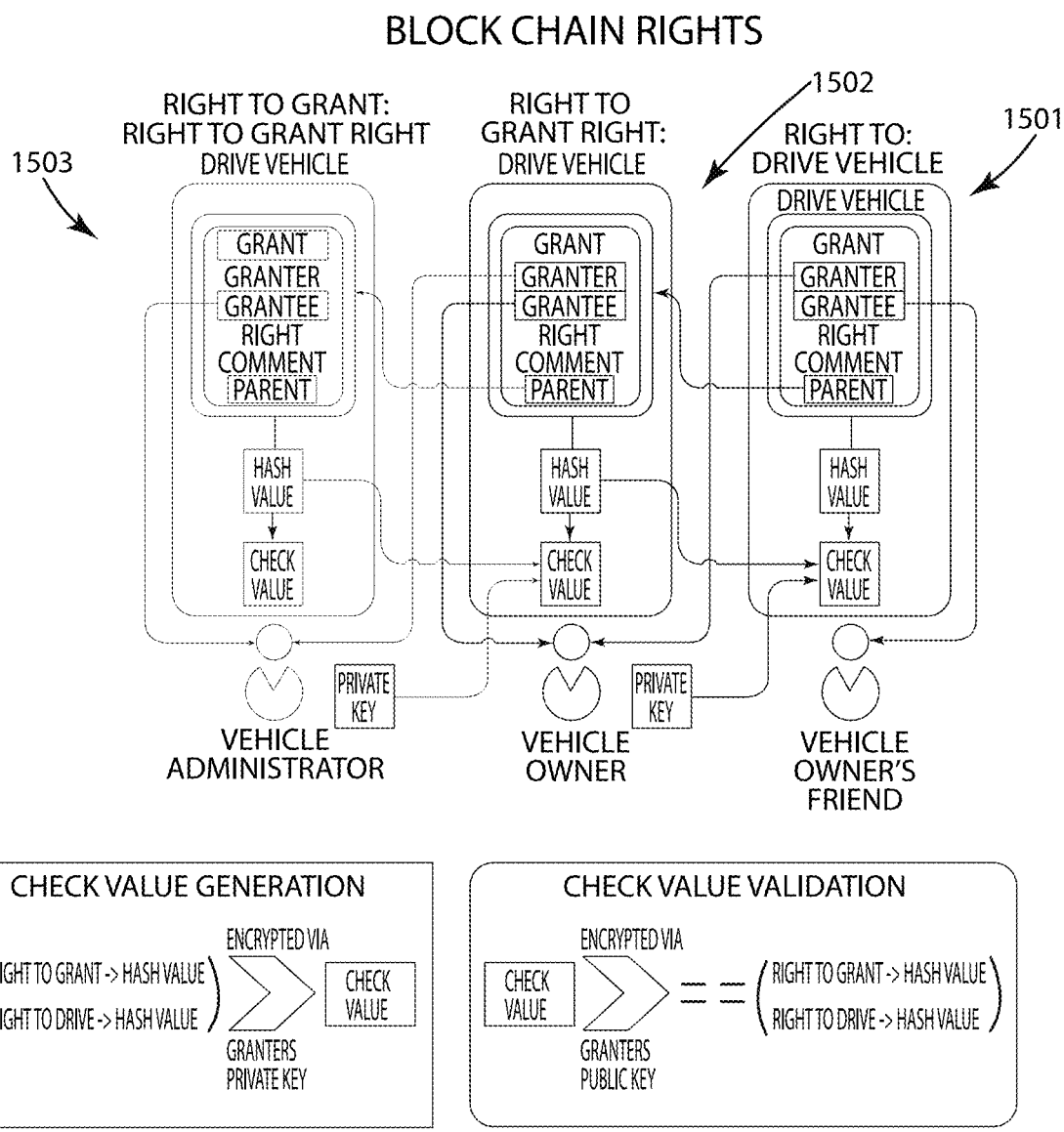
FIG. 15 shows a blockfan distribution scheme for granting rights in accordance with one embodiment.

Rights in the rights management system in accordance with the illustrated embodiment of FIG. 15 may be defined into three (3) components:
1) The right to do an action, designated 1501.
2) The right to grant the right to perform an action, designated 1502.
3) The right to grant the right to grant the right to perform an action, designated 1503.
   It is noted that, to have the right to grant a right, does not necessarily imply that the granter is able themselves to take the action.
   This right may imply the right to grant this right to someone else.

In one embodiment, a granter cannot assign rights to themselves, nor can a granter who has been granted the right to grant the right to grant grants for a right, grant that grant to themselves.

For example, the SCM 120 owner 10 may grant another user 10 the right to grant rights to issue a particular command. That other user 10 may now grant the right to other users 10 to issue a particular command, but that other user 10 cannot grant another user the right to grant other users 10 to issue a particular command. Only the SCM 120 owner may do that in the illustrated embodiment.

In one embodiment, all grants may include the following information:
Action
Context
Grantee
A copy of the Grantees Public key
Granted
Start Date
Expiration Date
Parent Grant ID
Check Value This collection of information may be encrypted with the private key of the granter and may include the ID of the granter, ID of the grantee, ID of parent grant, action, context, granted, start date, and end date. It should be understood that the present disclosure is not limited to a grant having all of the identified information—additional information may be included, and one or more pieces of information identified may be absent.

In one embodiment, via a join against a table of revoked rights, each right or grant may also include:
Revoked Parent ID.
Revoked Value.

This collection may be encrypted with the private key of the revoker and may include the ID of the revoker, ID of the revoked, ID of revoke grant, action, context, and revoked status.

By signing and dating the issuing of the grant, it becomes possible to trace the granting of every right back to the beginning of the system 100, enabling validation of the data in the system 100 in the process.

The right types listed below may be utilized in accordance with one embodiment of the present disclosure. It should be noted that grants, by action, may have different models.
Dependent. Dependent rights may expire when the granter's right to bestow the right expires. This type of right may be used largely for operational rights for the SCM 120, so that when the SCM 120 is transferred, or an SCM 120 owner is removed, all such dependent rights can be revoked.
Independent. Independent rights may not require that the granter's right to grant the grant be valid after the time of the granting. Tracing may still be enabled through the system 100 to ensure that at the time of the granting, the granter's rights were valid. This type of right may be useful within an organization for administrative tasks.
Token. Token grants may only be used once, in one embodiment. In one embodiment, token grants are the only rights within the system 100 that cannot be used without side effect. The use of a token right may invalidate the token's siblings. Token rights may be used for the transfer of an SCM 120.
Immortal. Immortal rights may be granted for the life of the SCM 120, and may transcend SCM 120 ownership. Immortal rights may only be granted to OEMs, if at all, and represent a right that can be included in every configuration that will ever be created for an SCM 120 referenced by the immortal right.

In one embodiment, the blockfan-based rights management system may be used to create a rights management service in the cloud 130 used within this system 100 and security model, where the Device-Rights-Key references the corresponding node in the blockfan.

XXI. The Blacklist

In one embodiment, the system 100 may be considered to suffer from a possible vulnerability: updates may not be delivered if there is no way to communicate them. The distributed nature of the system 100 may render the system 100 more tolerant to a lack of connectivity than other systems 100; however, the system 100 may not provide a substantially absolute solution to this issue, which no online system may likely provide.

Authorization and configuration updates may be delivered to SCMs 120 via other system components (e.g., devices 110). If a system component is unable to communicate with an SCM 120, or is unable to obtain updates due to its own lack of connectivity, the system component may not deliver updates to the SCM 120. The inability to receive an update in a timely manner due to an unintentional or intentional lack of connectivity is of particular concern with regard to authorization revocations.

Consider a scenario, where one User A revokes an authorization for an SCM 120 for the device 110 belonging to User B, but User B would like to continue to have access to the equipment component 140 to which the SCM 120 is attached (i.e., the "crazy ex" scenario). In this scenario, if User B disables the radios on their device 110, their device 110 may not deliver the updated ACP 400 that revokes their authorization to the SCM 120, and thus, User B may continue to use the equipment component 140 associated with the SCM 120. The distributed nature of the system 100 may help to avoid this sequence, as any device 110 with authorizations for the SCM 120 may deliver the updated ACP 400. However, in this scenario, User A has the only other nearby authorized device 110, and their device 110 is offline, but User A has access to the SCM 120 and the attached equipment component 140.

To provide a means for the equipment component 140 (and by proxy, users 10) to locally revoke authorizations, the SCM 120 may maintain an authorization blacklist (the SCM blacklist). Given that the equipment component 140 has a suitable user interface, the equipment component 140 may present User A with a list of active authorizations—using the user interface, User A may add User B's authorization to the blacklist of the SCM 120, at which point User B's authorization has been locally revoked and User B is unable to access the equipment component 140 using the device 110 associated with User B.

Each entry in the SCM 120 blacklist may be the pairing of an authorization and a unique Blacklist-Item-ID. In one embodiment, the Device-ID or Device-SCM-ID may be used as the Blacklist-Item-ID.

When a device 110 establishes a secure communications link with an SCM 120 (in at least the secured phase, per the device/SCM connection establishment process), the SCM 120 may send the Blacklist Package to the device 110. The SCM 120 may send the Blacklist Package to a device 110 after processing an updated ACP 400, at some point after a device 110 connects, or when the SCM 120 blacklist changes.

The Blacklist Package is similar to the ACP Container 410 in that the Blacklist Package may be a multi-layer encrypted package—the Blacklist Package may contain the SCM's 120 current ACP version, may be signed and encrypted with the SCM-Key (private) key, and then may be signed and encrypted with a Cloud-SCM-Key (public) key. In one embodiment, the SCM 120 may send the Blacklist Package to another SCM 120 or another system component via any communications link. In one embodiment, the Blacklist Package may also be signed and encrypted with the ACP-Package-Version (public) key. In one embodiment, a system component other than the equipment component 140 may receive a list of active authorizations and send blacklisted authorizations to an SCM 120.

When a device 110 receives a Blacklist Package, the device 110 may send the Blacklist Package to the cloud 130 without modification (the device 110 may be unable to decrypt the Blacklist Package). The cloud 130 may conduct one or more of the following: verify the Blacklist Package; apply the revocations represented in the Blacklist Package; and notify the owner device 110 of the SCM 120 that an updated ACP 400 is available for approval. The ACP 400 may contain the Blacklist-Item-IDs that have been processed since the cloud 130 last received confirmation that a configuration was delivered to the SCM 120. For instance, the ACP blacklist may grow until confirmation is received that the blacklist contents have been processed, at which point the blacklist may be reduced. If the updated ACP 400 is not acceptable to the owner 10, the owner 10 may revise the ACP 400 until the ACP 400 meets approval.

When a device 110 delivers the updated ACP 400 to the SCM 120, the SCM 120 may process the ACP 400 blacklist, removing Blacklist-Item-IDs that exist in both SCM 120 blacklists and ACP 400 blacklists. The presence of a Blacklist-Item-ID in the ACP 400 blacklist may represent the decision of an owner device 110 to include the Blacklist-Item-ID in the ACP 400 (whether or not the owner 10 decided to keep or revoke the corresponding authorization).

XXII. Central System Log

In one embodiment, to provide information that may assist in detecting and analyzing attacks against the system 100, or particular system components (including users 10), or in analysis of system performance and operation, the cloud 130 may maintain a secure, centralized system log defined as the Central System Log, that may store (i.e., log) information from events that have occurred across all or a subset of components of the system 100. Such events may include those that occur in the cloud 130, itself.

Each system component may maintain a system log that may store (i.e., log) information about local events that the system component has encountered. The information stored in a component's System Log, as well as where the System Log is stored, may be configurable (at build-time, configuration-time, or run-time) and may change due to system state. Changes may occur automatically and/or manually, such as if commanded to do so by another system component.

System components may log events to the Central System Log, or to RAM, ROM, other system components, or to one or more communications links, diagnostic/debug ports, and/or physical mediums, in real-time, in batch, or via distributable System Log Packages. System Log Packages may be distributed to other system components (e.g., devices 110, equipment 140, SCMs 120, etc.) to deliver to the cloud 130 (e.g., the SCM 120 may distribute the SCM 120 System Log Package to a device to deliver to the cloud). Alternatively, System Log Packages may be delivered to the cloud 130 directly, in a manner similar to the Blacklist Package. Due to the manner in which the System Log Packages are encrypted, System Log Packages may be distributed via any communications channel; real-time and batch logs in one embodiment may only be sent to the cloud 130 via secure communications link. In one embodiment, System Log Packages may be delivered only via secure communication channels.

In one embodiment, the Central System Log does not exist, and instead each system component may create and maintain its own system log.

XXIII. Example Use Cases

It should be understood that one or embodiments of the present disclosure may be implemented in connection with a variety of applications, and that the present disclosure is not limited to the specific applications described herein. For purposes of disclosure, several use cases or applications, including use cases that may be combined with a microlocation system, are identified as follows:

1) Automotive.
   Passenger/light truck.
   Bus.
   Long haul.
   Local delivery.
   Utility/specialized.
   RV.
   Ridesharing
   Rental
   Dealership
   Shared Access
2) Heavy Equipment (bulldozers)
3) Farm Equipment (John Deere, Kubota)
4) Motorcycles (and 4-wheelers and 3-wheelers and Snowmobiles)
5) Airplanes
   General Aviation
   Commercial
   Military
6) Ships
   Personal watercraft
   Boats (Residential)/Yachts
   Commercial
   Freighters
7) Door Locks
   Residential & Commercial
   Hotel/Rental
   Secure, Controlled Access
8) Office Equipment & Automation
   Conference room equipment
   Secure button (separate patent forthcoming)
   Automation 9) Office Furniture
   Space utilization
   Open-desking
   Space customization
   Equipment that moves
   Adjustable chairs
   Brody chairs
   Displays
10) Conferences/Events
    Admission to sessions (versus scanning a tag)
    Where is my seat/Am I in the right seat
11) Theme Parks (Disney, Six Flags)
12) Hospitals
    Room & Equipment access
    What room is someone in
    RTLS (Real-time location systems)—tracking things
13) Retail (stores)
14) Industrial Equipment/Manufacturing Automation (big expensive stuff)
15) Vending Machines
16) Restaurants
    Servers/Managers
    "Which table ordered which food?"
    Order from any table, get your stuff
17) Computer Monitors/Laptops One or more embodiments described herein provide several advantages over conventional systems.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for communicating from a first device to a vehicle device disposed on a vehicle, the system comprising:
   the first device configured to:
      communicate wirelessly with a second device,
      obtain authorization information from the second device that is at least one of encrypted by a trusted source and digitally signed by the trusted source, wherein the authorization information pertains to authorization for the first device with respect to one or more operations of the vehicle;
   the first device and the vehicle device being configured to establish a communication link for exchanging communications;
   the first device being configured to communicate, via the communication link, the authorization information to the vehicle device, wherein the vehicle device:
      determines the first device is authorized with respect to the vehicle device based on the authorization information being at least one of encrypted by the trusted source and digitally signed by the trusted source,
      authenticates the authorization information issued from the second device based at least in part on at least one of decryption and verification of data associated with the authorization information; and
   whereby the vehicle device is configured to determine authorization of the first device regardless of network connectivity to an external server.

2. The system of claim 1 wherein the second device is a network server, wherein the first device is configured to communicate wirelessly in an online mode with the network server, wherein the data associated with the authorization information is provided with the authorization information, and wherein the data includes a digital signature associated with the authorization information.

3. The system of claim 1 wherein:
   the vehicle device is configured to communicate wirelessly with the first device in an offline mode in which neither the first device nor the vehicle device is able to communicate effectively with the second device; and
   the vehicle device has received no information indicating the first device has obtained the authorization information pertaining to authorization of the first device with respect to one or more operations of the vehicle.

4. The system of claim 1 wherein the trusted source is a first trusted source, and wherein the authorization information is A) at least one of encrypted by the first trusted source and digitally signed by the first trusted source and B) at least one of encrypted by a second trusted source and digitally signed by the second trusted source.

5. The system of claim 1 wherein the vehicle device is configured to authenticate an identity of at least one of the first device and a user of the first device.

6. The system of claim 1 wherein the first device is configured to authenticate an identity of at least one of the vehicle device and a user of the first device.

7. The system of claim 1 wherein the authorization information includes authorization configuration information with respect to the vehicle device.

8. The system of claim 1 wherein the communication link established between the first device and the vehicle device involves a challenge-response authentication process in which the vehicle device authenticates an identity of the first device.

9. The system of claim 1 wherein prior to establishing the communication link, the vehicle device has received no information indicating the first device has obtained the authorization information.

10. The system of claim 1 wherein a private key and a public key are established, and wherein the public key is distributed to at least one of the first device and the vehicle device prior to communications between the first device and the vehicle device, and wherein the trusted source is trusted by at least one of the first device and the vehicle device based on the public key.

11. The system of claim 1 wherein a private key and a public key are established, and wherein the public key is distributed to the vehicle device, wherein the first device is configured to digitally sign information provided to a third device with the private key, and wherein the vehicle device is configured to determine authorization of the third device based on the digitally signed information provided to the third device from the first device.

12. The system of claim 1 wherein the authorization information includes a public key associated with the first device, wherein the first device stores a private key associated with the public key, wherein the vehicle device authenticates an identity of the first device based at least in part on at least one of decrypting and verifying data, received via said communication link, with the public key.

13. The system of claim 12 wherein the first device authenticates an identity of the vehicle device based on decrypting data received from the vehicle device via the communication link.

14. The system of claim 1 wherein the authorization information includes a symmetric key.

15. The system of claim 1 wherein the authorization information includes authorization data pertaining to one or more authorizations of the first device with respect to one or more commands for the vehicle device, wherein the authorization data is at least one of encrypted and digitally signed and the vehicle device is capable of at least one of decrypting and verifying the authorization data.

16. The system of claim 1 wherein the authorization information is a layered package having a plurality of layers, wherein each layer is at least one of encrypted and digitally signed in accordance with one key of an asymmetric key pair.

17. The system of claim 16 wherein the authorization information includes authentication information.

18. The system of claim 16 wherein a layer of the authorization information includes authorization data pertaining to one or more authorizations associated with at least one of communication and operation of the vehicle device.

19. The system of claim 18 wherein only the vehicle device is capable of at least one of decrypting and verifying all of the plurality of layers.

20. The system of claim 18 wherein an owner encrypted layer of the plurality of layers is at least one of encrypted and digitally signed by an owner device associated with the vehicle device that is established as an authority over operation of the vehicle device, and wherein at least one of encryption and digital signing of the owner encrypted layer is indicative of the owner device having authorized the authorization data included in the layer.

21. The system of claim 1 wherein the authorization information includes certificate information, and wherein the certificate information includes a certificate signed by a key associated with at least one of an owner device, the second device, and the vehicle device.

22. A control device for communicating with a vehicle component, the control device comprising:
   a communication interface configured to communicate wirelessly with a remote device;
   a memory configured to store trust information about one or more trusted sources and pertaining to authorization of one or more operations of the control unit;
   a vehicle interface operable configured to communicate with the vehicle component;
   a controller configured to establish a communication link with the remote device via the communication interface, the controller configured to receive authorization information from the remote device, wherein the authorization information is at least at least one of encrypted by a trusted source and digitally signed by the trusted source;
   wherein, based at least in part on at least one of the authorization information and a digital signature of the authorization information, the controller is configured determine if the remote device is authorized;
   wherein the controller authenticates the authorization information based at least in part on at least one of decryption and verification of data associated with the authorization information;
   wherein the controller is configured to establish an authority over an operation of the control unit based on a determination that the remote device is authorized; and
   whereby the controller is configured to determine authorization of the remote device regardless of network connectivity to an external server.

23. The control unit of claim 22 wherein the authorization information includes authorization configuration information.

24. The control unit of claim 22 wherein the controller is configured to determine an identity of at least one of the remote device and a user of the remote device.

25. The control unit of claim 22 wherein the remote device is configured to authenticate an identity of at least one of the control unit and a user of the remote device, wherein the data associated with the authorization information is provided with the authorization information, and wherein the data includes the digital signature of the authorization information.

26. A method of communicating between a first device and a vehicle device disposed on a vehicle, the method comprising:
   obtaining, in the first device, authorization information from another device, wherein the authorization information is at least one of encrypted by a trusted source and digitally signed by the trusted source;
   establishing a communication link for exchanging communications between the first device and the vehicle device, wherein prior to establishing the communication link, the vehicle device has received no information indicating the first device has obtained the authorization information;
   providing the authorization information to the vehicle device;
   determining that the authorization information corresponds to the trusted source by authenticating the authorization information based at least in part on at least one of decryption and verification of data associated with the authorization information;
   establishing authority of the first device with respect to an operation of the vehicle based on the authorization information corresponding to the trusted source;

determining the first device is authorized with respect to the operation of the vehicle based on the established authority of the first device; and whereby the vehicle device is configured to determine authorization of the first device regardless of network connectivity to an external server.

27. The method of claim 26 comprising the other device being a network server, wherein the data associated with the authorization information is provided with the authorization information, and wherein the data includes a digital signature associated with the authorization information.

28. The method of claim 26 comprising encrypting at least a portion of the authorization information with a key established between the vehicle device and the other device.

29. The method of claim 26 comprising at least one of encrypting and digitally signing at least a portion of the authorization information with a key established between the vehicle device and the first device.

30. The method of claim 26 comprising verifying that a digital signature corresponds to the authorization information provided to the vehicle device.

31. The method of claim 26 comprising determining an identity of at least one of the first device and a user of the first device.

* * * * *

UNITED STATES PATENT AND TRADEMARK OFFICE
CERTIFICATE OF CORRECTION

PATENT NO.         : 10,771,263 B2                               Page 1 of 1
APPLICATION NO.    : 16/395736
DATED              : September 8, 2020
INVENTOR(S)        : Eric John Smith et al.

It is certified that error appears in the above-identified patent and that said Letters Patent is hereby corrected as shown below:

Column 88, Line 8 Claim 22:
"a vehicle interface operable configured to communicate"
Should be:
--a vehicle interface configured to communicate--

Signed and Sealed this
Tenth Day of November, 2020

Andrei Iancu
*Director of the United States Patent and Trademark Office*